US009426305B2

(12) United States Patent
De Foy et al.

(10) Patent No.: US 9,426,305 B2
(45) Date of Patent: Aug. 23, 2016

(54) SPONSORING OF A MOBILE STATION SESSION BY ANOTHER MOBILE STATION IN A WIRELESS NETWORK

(71) Applicant: INTERDIGITAL PATENT HOLDINGS, INC., Wilmington, DE (US)

(72) Inventors: Xavier De Foy, Kirkland (CA); Ulises Olvera-Hernandez, Kirkland (CA); Dimitrios Karampatsis, Caversham (GB); Hang Liu, North Potomac, MD (US); Kamel M. Shaheen, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/385,625

(22) PCT Filed: Mar. 15, 2013

(86) PCT No.: PCT/US2013/032102
§ 371 (c)(1),
(2) Date: Sep. 16, 2014

(87) PCT Pub. No.: WO2013/142331
PCT Pub. Date: Sep. 26, 2013

(65) Prior Publication Data
US 2015/0044989 A1 Feb. 12, 2015

Related U.S. Application Data

(60) Provisional application No. 61/613,693, filed on Mar. 21, 2012, provisional application No. 61/726,919, filed on Nov. 15, 2012.

(51) Int. Cl.
*H04M 15/00* (2006.01)
*H04L 12/14* (2006.01)
(Continued)

(52) U.S. Cl.
CPC ........... *H04M 15/09* (2013.01); *H04L 12/1478* (2013.01); *H04L 67/306* (2013.01);
(Continued)

(58) Field of Classification Search
None
See application file for complete search history.

(56) References Cited

U.S. PATENT DOCUMENTS 6,892,064 B2 5/2005 Qi et al.
8,693,983 B2 4/2014 Liebsch et al.
(Continued)

FOREIGN PATENT DOCUMENTS

JP 2002-342592 A 11/2002
JP 2005-332196 A 12/2005
JP 2008-236102 A 10/2008

OTHER PUBLICATIONS

Interdigital Communications, "Addition of Service Sharing Requirements for Interworking between Mobile Operators using the Evolved Packet System and Data Application Providers," 3GPP TSG-SA WG1 #59, 3GPP TSG-SA WG1 #59, S1-122213 (Jul. 30-Aug. 3, 2012).

(Continued)

*Primary Examiner* — Leon-Viet Nguyen
(74) *Attorney, Agent, or Firm* — Volpe and Koenig, P.C.

(57) ABSTRACT

An apparatus and method are described for sponsoring service and preferential traffic handling, (i.e., data connectivity) by wireless transmit/receive units (WTRUs). A first WTRU may initiate user sponsoring of a second WTRU via an application server (AS). The first WTRU may receive a service trigger from the AS and forward the service trigger to the second WTRU. The second WTRU may then initiate a sponsored session with the AS using the service trigger in order to receive a service from the AS. The first WTRU may also request the AS to transfer a credit to the second WTRU. The AS may establish a direct communication link with a charging system including an online charging function (OCF) and a charging data function (CDF). The AS may send a request to a network to provide preferential traffic handling needed to deliver content to the second WTRU.

14 Claims, 33 Drawing Sheets

(51) Int. Cl.
*H04L 29/08* (2006.01)
*H04W 4/24* (2009.01)
*G06F 9/445* (2006.01)

(52) U.S. Cl.
CPC .............. *H04M 15/64* (2013.01); *H04W 4/24* (2013.01); *G06F 8/61* (2013.01); *H04M 2215/0192* (2013.01); *H04M 2215/32* (2013.01)

(56) References Cited

U.S. PATENT DOCUMENTS

| | | | | |
|---|---|---|---|---|
| 2003/0071115 | A1* | 4/2003 | Horn ..................... | G06Q 20/28 235/379 |
| 2007/0036312 | A1* | 2/2007 | Cai ...................... | H04M 15/00 379/126 |
| 2009/0116627 | A1 | 5/2009 | Ropolyi | |
| 2013/0031575 | A1* | 1/2013 | Gallant ............... | H04L 41/5038 725/20 |
| 2013/0066942 | A1* | 3/2013 | Massey ................. | G06F 15/16 709/203 |
| 2013/0260715 | A1* | 10/2013 | Li ...................... | H04L 12/1407 455/406 |
| 2013/0283262 | A1* | 10/2013 | Rehtijarvi ............... | G06F 8/60 717/178 |

OTHER PUBLICATIONS

Interdigital Communications, "Support for Service Sharing in MOSAP," 3GPP TSG-SA WG1 #59, 3GPP TSG-SA WG1 #59, S1-122356 (Jul. 30-Aug. 3, 2012).
Interdigital Communications, "Support for Service Sharing within the MOSAP WID," 3GPP TSG-SA WG1 #59, 3GPP TSG-SA WG1 #59, S1-122211 (Jul. 30-Aug. 3, 2012).
Third Generation Partnership Project, "Technical Specification Group Services and System Aspects; Service requirements for the Evolved Packet System (EPS) (Release 8)," 3GPP TS 22.278 V8.10.0 (Dec. 2009).
Third Generation Partnership Project, "Technical Specification Group Services and System Aspects; Service requirements for the Evolved Packet System (EPS) (Release 10)," 3GPP TS 22.278 V10.2.0 (Sep. 2010).
Third Generation Partnership Project, "Technical Specification Group Services and System Aspects; Service requirements for the Evolved Packet System (EPS) (Release 11)," 3GPP TS 22.278 V11.6.0 (Sep. 2012).
Third Generation Partnership Project, "Technical Specification Group Services and System Aspects; Service requirements for the Evolved Packet System (EPS) (Release 9)," 3GPP TS 22.278 V9.6.0 (Sep. 2010).
Third Generation Partnership Project, "Technical Specification Group Services and System Aspects; Policy and charging control architecture (Release 8)," 3GPP TS 23.203 V8.14.0 (Jun. 2012).
Third Generation Partnership Project, "Technical Specification Group Services and System Aspects; Policy and charging control architecture (Release 9)," 3GPP TS 23.203 V9.12.0 (Jun. 2012).
Third Generation Partnership Project, "Technical Specification Group Services and System Aspects; Policy and charging control architecture (Release 10)," 3GPP TS 23.203 V10.8.0 (Sep. 2012).
Third Generation Partnership Project, "Technical Specification Group Services and System Aspects; Policy and charging control architecture (Release 10)," 3GPP TS 23.203 V10.6.0 (Mar. 2012).
Third Generation Partnership Project, "Technical Specification Group Services and System Aspects; Policy and charging control architecture (Release 11)," 3GPP TS 23.203 V11.5.0 (Mar. 2012).
Third Generation Partnership Project, "Technical Specification Group Services and System Aspects; Policy and charging control architecture (Release 7)," 3GPP TS 23.203 V7.14.1 (Jul. 2012).
Third Generation Partnership Project, "Technical Specification Group Services and System Aspects; Policy and charging control architecture (Release 9)," 3GPP TS 23.203 V9.11.0 (Mar. 2012).
Third Generation Partnership Project, "Technical Specification Group Services and System Aspects; IP Multimedia Subsystem (IMS); Stage 2 (Release 11)," 3GPP TS 23.228 V11.4.0 (Mar. 2012).
Third Generation Partnership Project, "Technical Specification Group Services and System Aspects; IP Multimedia Subsystem (IMS); Stage 2 (Release 7)," 3GPP TS 23.228 V7.16.0 (Dec. 2009).
Third Generation Partnership Project, "Technical Specification Group Services and System Aspects; IP Multimedia Subsystem (IMS); Stage 2 (Release 9)," 3GPP TS 23.228 V9.4.0 (Sep. 2010).
Third Generation Partnership Project, "Technical Specification Group Services and System Aspects; IP Multimedia Subsystem (IMS); Stage 2 (Release 8)," 3GPP TS 23.228 V8.12.0 (Mar. 2010).
Third Generation Partnership Project, "Technical Specification Group Services and System Aspects; IP Multimedia Subsystem (IMS); Stage 2 (Release 6)," 3GPP TS 23.228 V6.16.0 (Mar. 2007).
Third Generation Partnership Project, "Technical Specification Group Services and System Aspects; IP Multimedia Subsystem (IMS); Stage 2 (Release 10)," 3GPP TS 23.228 V10.7.0 (Dec. 2011).
Third Generation Partnership Project, "Technical Specification Group Services and System Aspects; IP Multimedia Subsystem (IMS); Stage 2 (Release 5)," 3GPP TS 23.228 V5.15.0 (Jun. 2006).
Third Generation Partnership Project, "Technical Specification Group Services and System Aspects; IP Multimedia Subsystem (IMS); Stage 2 (Release 11)," 3GPP TS 23.228 V11.7.0 (Dec. 2012).
Third Generation Partnership Project, "Technical Specification Group Services and System Aspects; IP Multimedia Subsystem (IMS); Stage 2 (Release 12)," 3GPP TS 23.228 V12.0.0 (Mar. 2013).
Third Generation Partnership Project, "Technical Specification Group Services and System Aspects; EPC enhancements to Support Interworking with Data Application Providers (MOSAP); Stage 2 (Release 11)," 3GPP TR 23.862 V0.1.0 (Jul. 2011).
Third Generation Partnership Project, "Technical Specification Group Services and System Aspects; EPC enhancements to Support Interworking with Data Application Providers (MOSAP); Stage 2 (Release 12)," 3GPP TR 23.862 V1.0.0 (Nov. 2012).
Third Generation Partnership Project, "Technical Specification Group Core Network and Terminals; User Data Convergence (UDC); Technical realization and information flows; Stage 2 (Release 10)," 3GPP TS 23.335 V10.0.0 (Mar. 2011).
Third Generation Partnership Project, "Technical Specification Group Core Network and Terminals; User Data Convergence (UDC); Technical realization and information flows; Stage 2 (Release 11)," 3GPP TS 23.335 V11.0.0 (Sep. 2012).
Third Generation Partnership Project, "Technical Specification Group Core Network and Terminals; Policy and charging control signalling flows and Quality of Service (QoS) parameter mapping (Release 7)," 3GPP TS 29.213 V7.12.0 (Sep. 2011).
Third Generation Partnership Project, "Technical Specification Group Core Network and Terminals; Policy and Charging Control over Rx reference point (Release 7)," 3GPP TS 29.214 V7.11.0 (Dec. 2010).
Third Generation Partnership Project, "Technical Specification Group Core Network and Terminals; Policy and Charging Control over Rx reference point (Release 7)," 3GPP TS 29.214 V7.12.0 (Sep. 2012).
Third Generation Partnership Project, "Technical Specification Group Core Network and Terminals; Policy and Charging Control: Spending Limit Reporting over Sy reference point (Release 11)," 3GPP TS 29.219 V11.0.0 (Mar. 2012).
Third Generation Partnership Project, "Technical Specification Group Core Network and Terminals; Policy and Charging Control: Spending Limit Reporting over Sy reference point (Release 11)," 3GPP TS 29.219 V11.4.0 (Mar. 2013).
Third Generation Partnership Project, "Technical Specification Group Services and System Aspects; Service requirements for the Evolved Packet System (EPS) (Release 12)," 3GPP TS 22.278 V12.2.0 (Mar. 2013).
Third Generation Partnership Project, "Technical Specification Group Services and System Aspects; Service requirements for the Evolved Packet System (EPS) (Release 12)," 3GPP TS 22.278 V12.0.0 (Dec. 2011).

(56) References Cited

OTHER PUBLICATIONS

Third Generation Partnership Project, "Technical Specification Group Services and System Aspects; Service requirements for the Evolved Packet System (EPS) (Release 11)," 3GPP TS 22.278 V11.1.1 (Feb. 2011).
Third Generation Partnership Project, "Technical Specification Group Services and System Aspects; Policy and charging control architecture (Release 11)," 3GPP TS 23.203 V11.9.0 (Mar. 2013).
Third Generation Partnership Project, "Technical Specification Group Services and System Aspects; Policy and charging control architecture (Release 12)," 3GPP TS 23.203 V12.0.0 (Mar. 2013).
Third Generation Partnership Project, "Technical Specification Group Core Network and Terminals; Policy and Charging Control signalling flows and Quality of Service (QoS) parameter mapping (Release 8)," 3GPP TS 29.213 V8.16.0 (Mar. 2013).
Third Generation Partnership Project, "Technical Specification Group Core Network and Terminals; Policy and Charging Control signalling flows and Quality of Service (QoS) parameter mapping (Release 8)," 3GPP TS 29.213 V8.13.0 (Dec. 2011).
Third Generation Partnership Project, "Technical Specification Group Core Network and Terminals; Policy and Charging Control over Rx reference point (Release 11)," 3GPP TS 29.214 V11.8.0 (Mar. 2013).
Third Generation Partnership Project, "Technical Specification Group Core Network and Terminals; Policy and Charging Control over Rx reference point (Release 10)," 3GPP TS 29.214 V10.9.0 (Mar. 2013).
Third Generation Partnership Project, "Technical Specification Group Core Network and Terminals; Policy and Charging Control over Rx reference point (Release 10)," 3GPP TS 29.214 V10.6.0 Mar. 2012).
Third Generation Partnership Project, "Technical Specification Group Core Network and Terminals; Policy and Charging Control over Rx reference point (Release 9)," 3GPP TS 29.214 V9.12.0 (Mar. 2013).
Third Generation Partnership Project, "Technical Specification Group Core Network and Terminals; Policy and Charging Control over Rx reference point (Release 9)," 3GPP TS 29.214 V9.9.0 (Dec. 2011).
Third Generation Partnership Project, "Technical Specification Group Core Network and Terminals; Policy and Charging Control over Rx reference point (Release 11)," 3GPP TS 29.214 V11.4.0 (Mar. 2012).
Third Generation Partnership Project, "Technical Specification Group Core Network and Terminals; Policy and Charging Control over Rx reference point (Release 8)," 3GPP TS 29.214 V8.15.0 (Mar. 2013).
Third Generation Partnership Project, "Technical Specification Group Core Network and Terminals; Policy and Charging Control over Rx reference point (Release 8)," 3GPP TS 29.214 V8.12.0 (Dec. 2011).
Third Generation Partnership Project, "Technical Specification Group Core Network and Terminals; Policy and Charging Control signalling flows and Quality of Service (QoS) parameter mapping (Release 10)," 3GPP TS 29.213 V10.5.0 (Mar. 2012).
Third Generation Partnership Project, "Technical Specification Group Core Network and Terminals; Policy and Charging Control signalling flows and Quality of Service (QoS) parameter mapping (Release 9)," 3GPP TS 29.213 V9.8.0 (Dec. 2011).
Third Generation Partnership Project, "Technical Specification Group Core Network and Terminals; Policy and Charging Control signalling flows and Quality of Service (QoS) parameter mapping (Release 9)," 3GPP TS 29.213 V9.11.0 (Mar. 2013).
Third Generation Partnership Project, "Technical Specification Group Core Network and Terminals; Policy and Charging Control signalling flows and Quality of Service (QoS) parameter mapping (Release 11)," 3GPP TS 29.213 V11.2.0 (Mar. 2012).
Third Generation Partnership Project, "Technical Specification Group Core Network and Terminals; Policy and Charging Control signalling flows and Quality of Service (QoS) parameter mapping (Release 11)," 3GPP TS 29.213 V11.6.0 (Mar. 2013).
Third Generation Partnership Project, "Technical Specification Group Core Network and Terminals; Policy and Charging Control signalling flows and Quality of Service (QoS) parameter mapping (Release 10)," 3GPP TS 29.213 V10.9.0 (Mar. 2013).
Third Generation Partnership Project, "Technical Specification Group Services and System Aspects; Telecommunication management; Charging management; Charging architecture and principles (Release 8)," 3GPP TS 32.240 V8.6.0 (Jun. 2010).
Third Generation Partnership Project, "Technical Specification Group Services and System Aspects; Telecommunication management; Charging management; Charging architecture and principles (Release 10)," 3GPP TS 32.240 V10.1.0 (Mar. 2011).
Third Generation Partnership Project, "Technical Specification Group Services and System Aspects; Telecommunication management; Charging management; Charging architecture and principles (Release 12)," 3GPP TS 32.240 V12.0.0 (Mar. 2013).
Third Generation Partnership Project, "Technical Specification Group Services and System Aspects; Telecommunication management; Charging management; Charging architecture and principles (Release 9)," 3GPP TS 32.240 V9.2.0 (Mar. 2011).
Third Generation Partnership Project, "Technical Specification Group Services and System Aspects; Telecommunication management; Charging management; Charging architecture and principles (Release 6)," 3GPP TS 32.240 V6.4.0 (Sep. 2006).
Third Generation Partnership Project, "Technical Specification Group Services and System Aspects; Telecommunication management; Charging management; Charging architecture and principles (Release 11)," 3GPP TS 32.240 V11.6.0 (Mar. 2013).
Third Generation Partnership Project, "Technical Specification Group Services and System Aspects; Telecommunication management; Charging management; Charging architecture and principles (Release 11)," 3GPP TS 32.240 V11.3.0 (Mar. 2012).
Third Generation Partnership Project, Technical Specification Group Services and System Aspects; Telecommunication management; Charging management; Charging architecture and principles (Release 7), 3GPP TS 32.240 V7.2.0 (Mar. 2007).
Third Generation Partnership Project, "Technical Specification Group Services and System Aspects; Telecommunication management; Charging management; Packet Switched (PS) domain charging (Release 9)," 3GPP TS 32.251 V9.8.0 (Dec. 2011).
Third Generation Partnership Project, "Technical Specification Group Services and System Aspects; Telecommunication management; Charging management; Packet Switched (PS) domain charging (Release 11)," 3GPP TS 32.251 V11.6.0 (Mar. 2013).
Third Generation Partnership Project, "Technical Specification Group Services and System Aspects; Telecommunication management; Charging management; Packet Switched (PS) domain charging (Release 9)," 3GPP TS 32.251 V9.9.0 (Jun. 2012).
Third Generation Partnership Project, "Technical Specification Group Services and System Aspects; Telecommunication management; Charging management; Packet Switched (PS) domain charging (Release 12)," 3GPP TS 32.251 V12.1.0 (Mar. 2013).
Third Generation Partnership Project, "Technical Specification Group Services and System Aspects; Telecommunication management; Charging management; Packet Switched (PS) domain charging (Release 11)," 3GPP TS 32.251 V11.2.0 (Mar. 2012).
Third Generation Partnership Project, "Technical Specification Group Services and System Aspects; Telecommunication management; Charging management; Packet Switched (PS) domain charging (Release 10)," 3GPP TS 32.251 V10.8.0 (Mar. 2012).
Third Generation Partnership Project, "Technical Specification Group Services and System Aspects; Telecommunication management; Charging management; Packet Switched (PS) domain charging (Release 10)," 3GPP TS 32.251 V10.9.0 (Jun. 2012).
Third Generation Partnership Project, "Technical Specification Group Services and System Aspects; Telecommunication management; Charging management; Packet Switched (PS) domain charging (Release 6)," 3GPP TS 32.251 V6.10.0 (Jun. 2007).
Third Generation Partnership Project, "Technical Specification Group Services and System Aspects; Telecommunication manage-

(56) References Cited

OTHER PUBLICATIONS ment; Charging management; Packet Switched (PS) domain charging (Release 8)," 3GPP TS 32.251 V8.14.0 (Dec. 2011).

Third Generation Partnership Project, "Technical Specification Group Services and System Aspects; Telecommunication management; Charging management; Packet Switched (PS) domain charging (Release 7)," 3GPP TS 32.251 V7.8.0 (Oct. 2010).

Third Generation Partnership Project, "Technical Specification Group Services and System Aspects; Telecommunication management; Charging management; Diameter charging applications (Release 10)," 3GPP TS 32.299 V10.5.0 (Mar. 2012).

Third Generation Partnership Project, Technical Specification Group Services and System Aspects; Telecommunication management; Charging management; Diameter charging applications (Release 12), 3GPP TS 32.299 V12.0.0 (Mar. 2013).

Third Generation Partnership Project, "Technical Specification Group Services and System Aspects; Telecommunication management; Charging management; Diameter charging applications (Release 11)," 3GPP TS 32.299 V11.7.0 (Mar. 2013).

Third Generation Partnership Project, "Technical Specification Group Services and System Aspects; Telecommunication management; Charging management; Diameter charging applications (Release 11)," 3GPP TS 32.299 V11.3.0 (Mar. 2012).

Third Generation Partnership Project, "Technical Specification Group Service and System Aspects; Telecommunication management; Charging management; Diameter charging applications (Release 6)," 3GPP TS 32.299 V6.12.0 (Sep. 2007).

Third Generation Partnership Project, "Technical Specification Group Services and System Aspects; Telecommunication management; Charging management; Diameter charging applications (Release 10)," 3GPP TS 32.299 V10.9.0 (Mar. 2013).

Third Generation Partnership Project, "Technical Specification Group Services and System Aspects; Telecommunication management; Charging management; Diameter charging applications (Release 7)," 3GPP TS 32.299 V7.9.0 (Dec. 2010).

Third Generation Partnership Project, "Technical Specification Group Services and System Aspects; Telecommunication management; Charging management; Diameter charging applications (Release 8)," 3GPP TS 32.299 V8.16.0 (Dec. 2011).

Third Generation Partnership Project, "Technical Specification Group Services and System Aspects; Telecommunication management; Charging management; Diameter charging applications (Release 8)," 3GPP TS 32.299 V8.19.0 (Mar. 2013).

Third Generation Partnership Project, "Technical Specification Group Services and System Aspects; Telecommunication management; Charging management; Diameter charging applications (Release 9)," 3GPP TS 32.299 V9.10.0 (Dec. 2011).

Third Generation Partnership Project, "Technical Specification Group Services and System Aspects; Telecommunication management; Charging management; Diameter charging applications (Release 9)," 3GPP TS 32.299 V9.14.0 (Mar. 2013).

\* cited by examiner

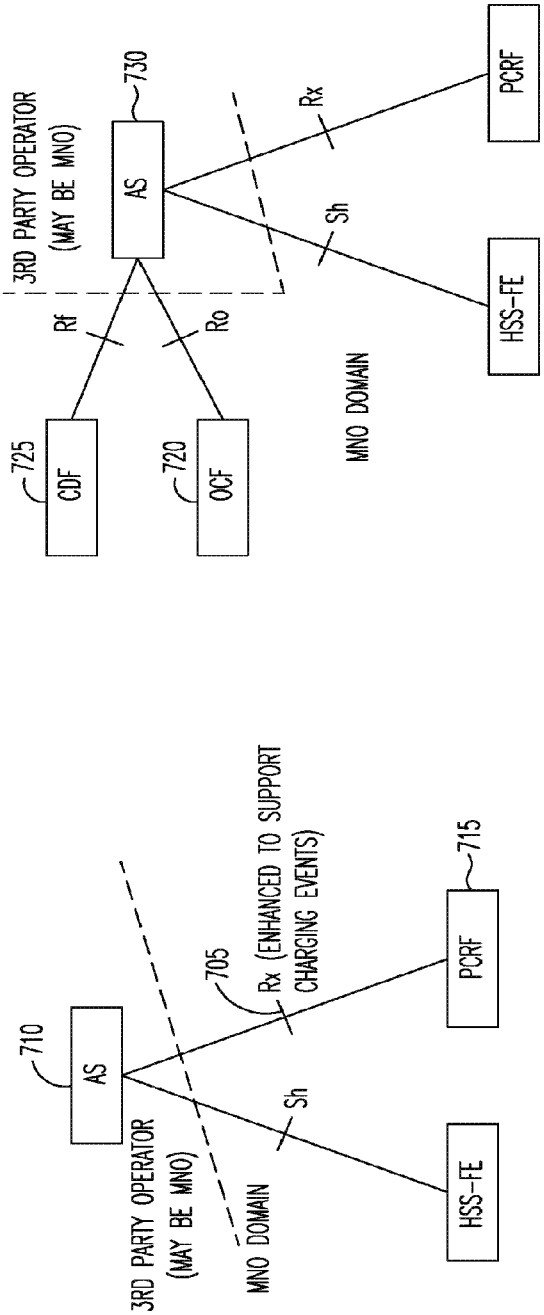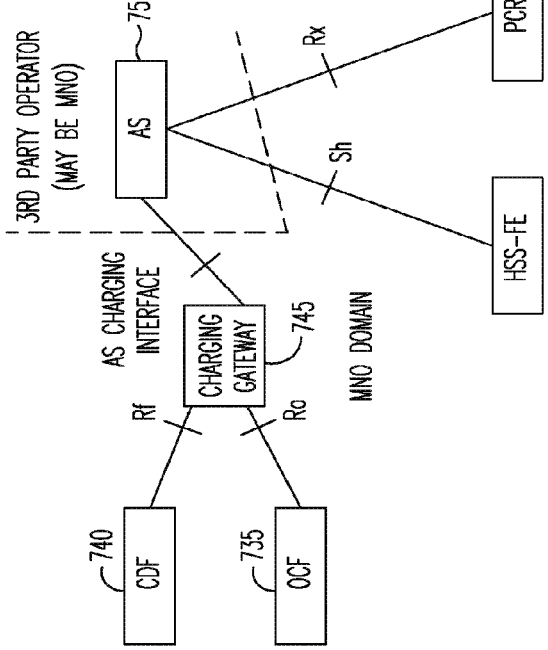
FIG. 7A
FIG. 7B
FIG. 7C

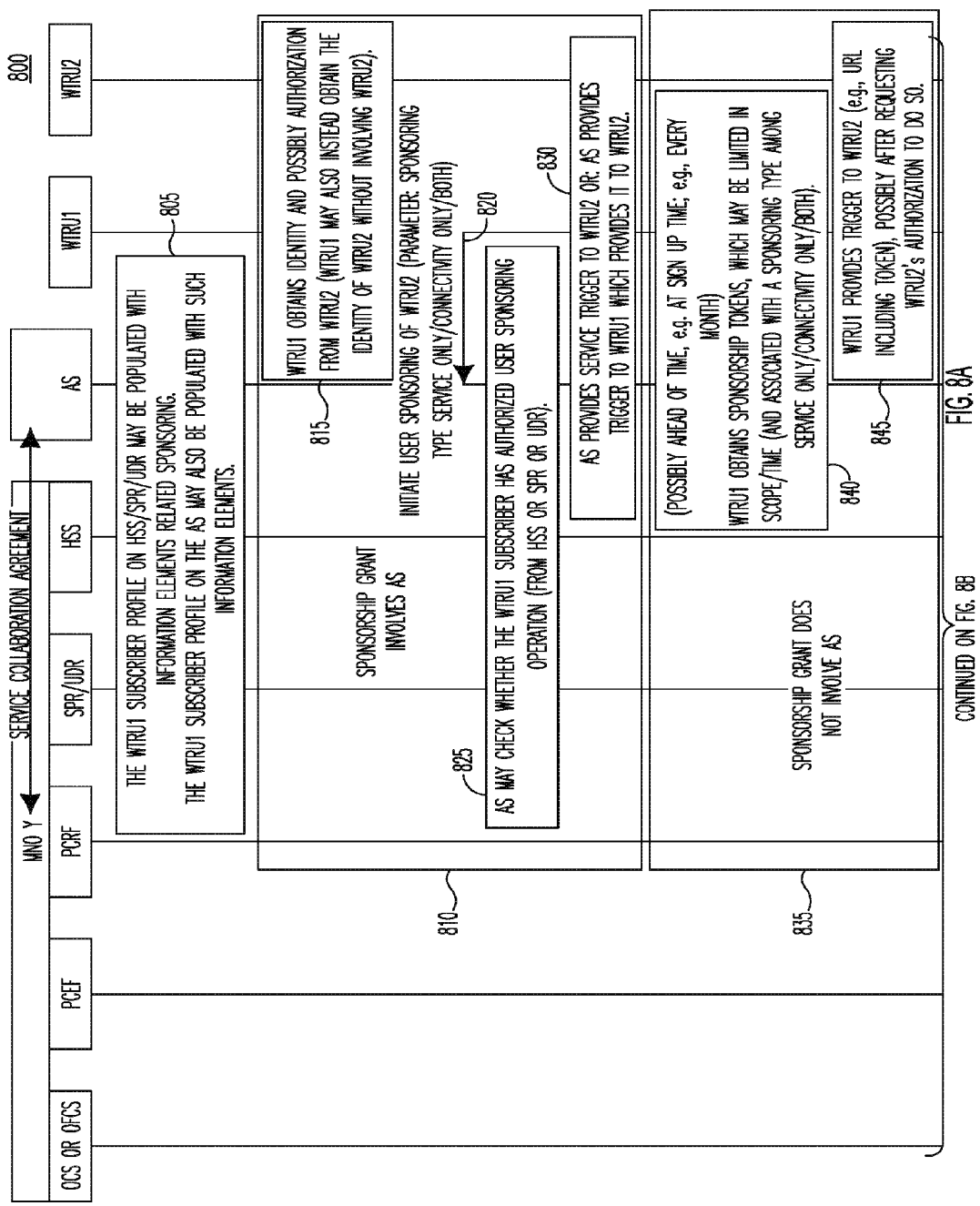

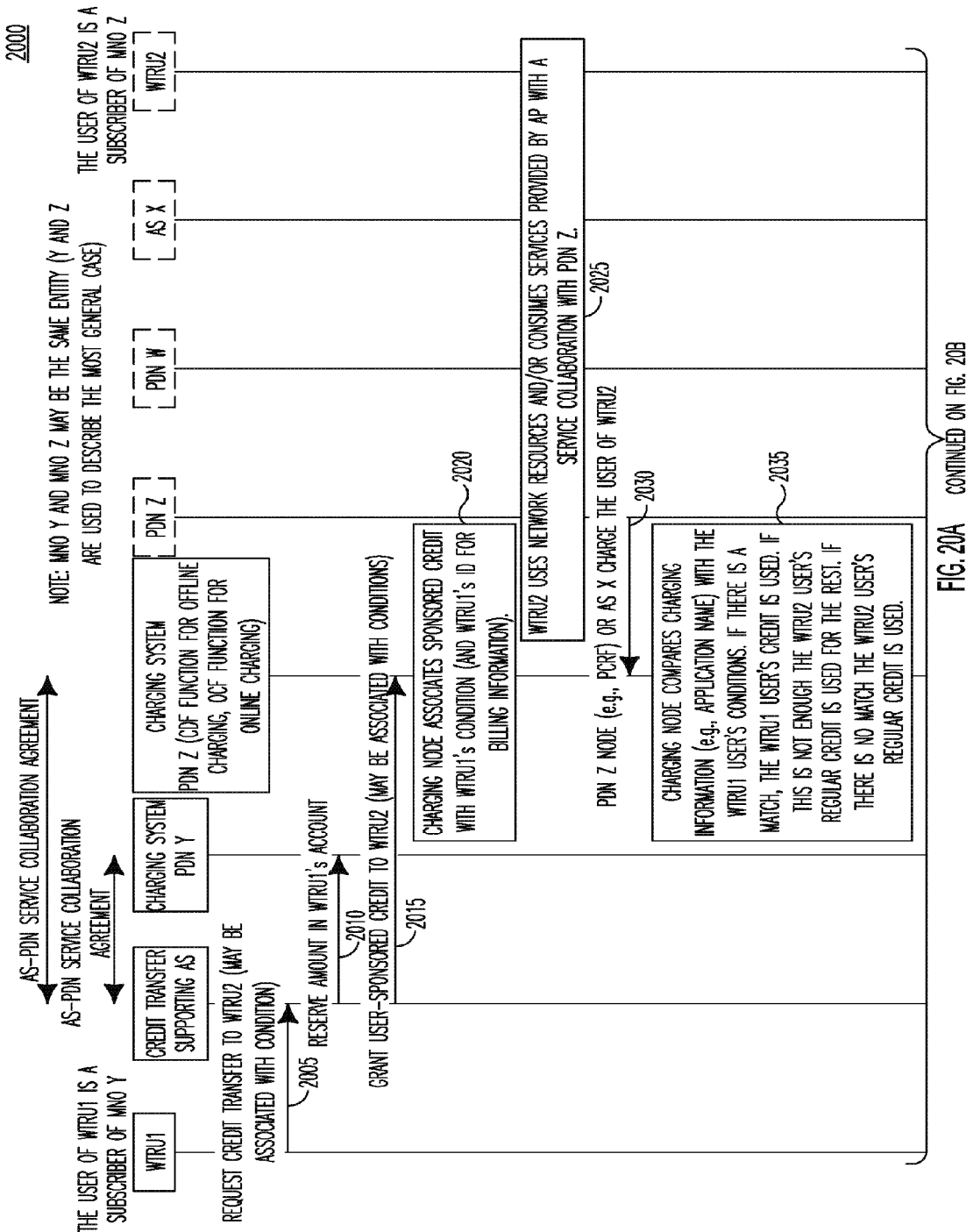

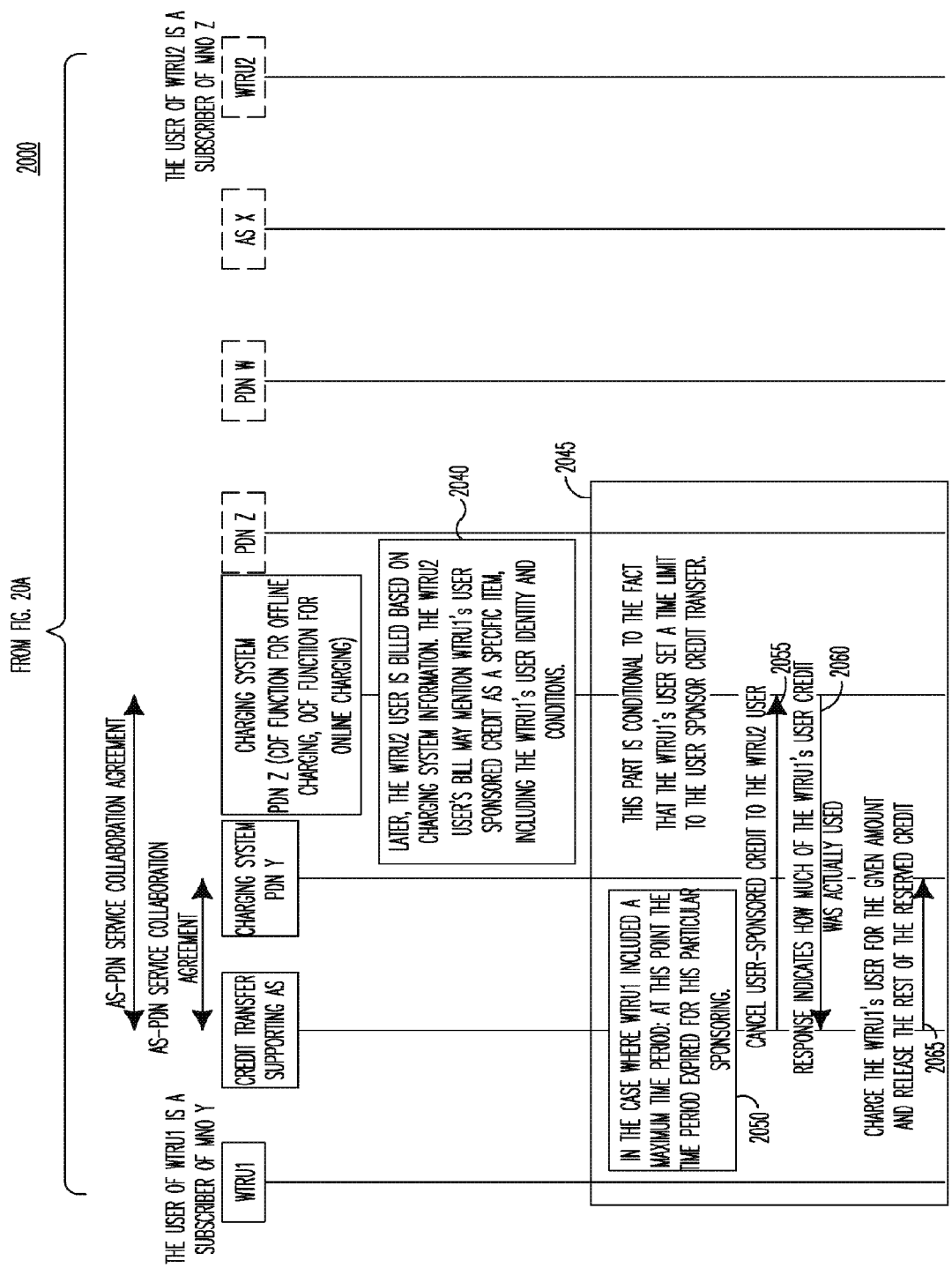

SPONSORING OF A MOBILE STATION SESSION BY ANOTHER MOBILE STATION IN A WIRELESS NETWORK

CROSS REFERENCE TO RELATED APPLICATIONS

This application claims the benefit of PCT Application No. PCT/US2013/032102, filed Mar. 15, 2013, U.S. Provisional Application No. 61/726,919, filed on Nov. 15, 2012, and U.S. Provisional Application No. 61/613,693, filed on Mar. 21, 2012, the contents of which are incorporated by reference herein.

BACKGROUND

It is desirable to support interworking between an application provider and a third generation partnership project (3GPP) network operator core network (CN). Tight integration between an application and a mobile network may be implemented by efficiently charging and billing the end users. For example, application charges may be integrated with a bill sent by a mobile network operator (MNO) to an end user. Currently, there is no mechanism to enable a user to sponsor another user for application service.

SUMMARY

An apparatus and method are described for sponsoring service and preferential traffic handling, (i.e., data connectivity), by wireless transmit/receive units (WTRUs). A first WTRU may obtain the identity of a second WTRU and initiate user sponsoring of the second WTRU via an application server (AS). The first WTRU may receive a service trigger from the AS and forward the service trigger to the second WTRU. The second WTRU may then initiate a sponsored session with the AS using the service trigger in order to receive a service from the AS. The first WTRU may also request the AS to transfer a credit to the second WTRU. The AS may establish a direct communication link with a charging system including an online charging function (OCF) and a charging data function (CDF). The AS may send a request to a network to provide preferential traffic handling needed to deliver content to the second WTRU.

BRIEF DESCRIPTION OF THE DRAWINGS

A more detailed understanding may be had from the following description, given by way of example in conjunction with the accompanying drawings wherein:

FIGS. 7A, 7B and 7C show architectural views of enabling charging events to be sent by a third party AS to a third generation partnership project (3GPP) core network (CN);

FIGS. 8A and 8B, taken together, are a high level message flow diagram of a procedure for user sponsoring;

FIGS. 20A and 20B, taken together, are a high level message flow diagram of a procedure for transferring credit among WTRU users.

DETAILED DESCRIPTION

Figure 1A:
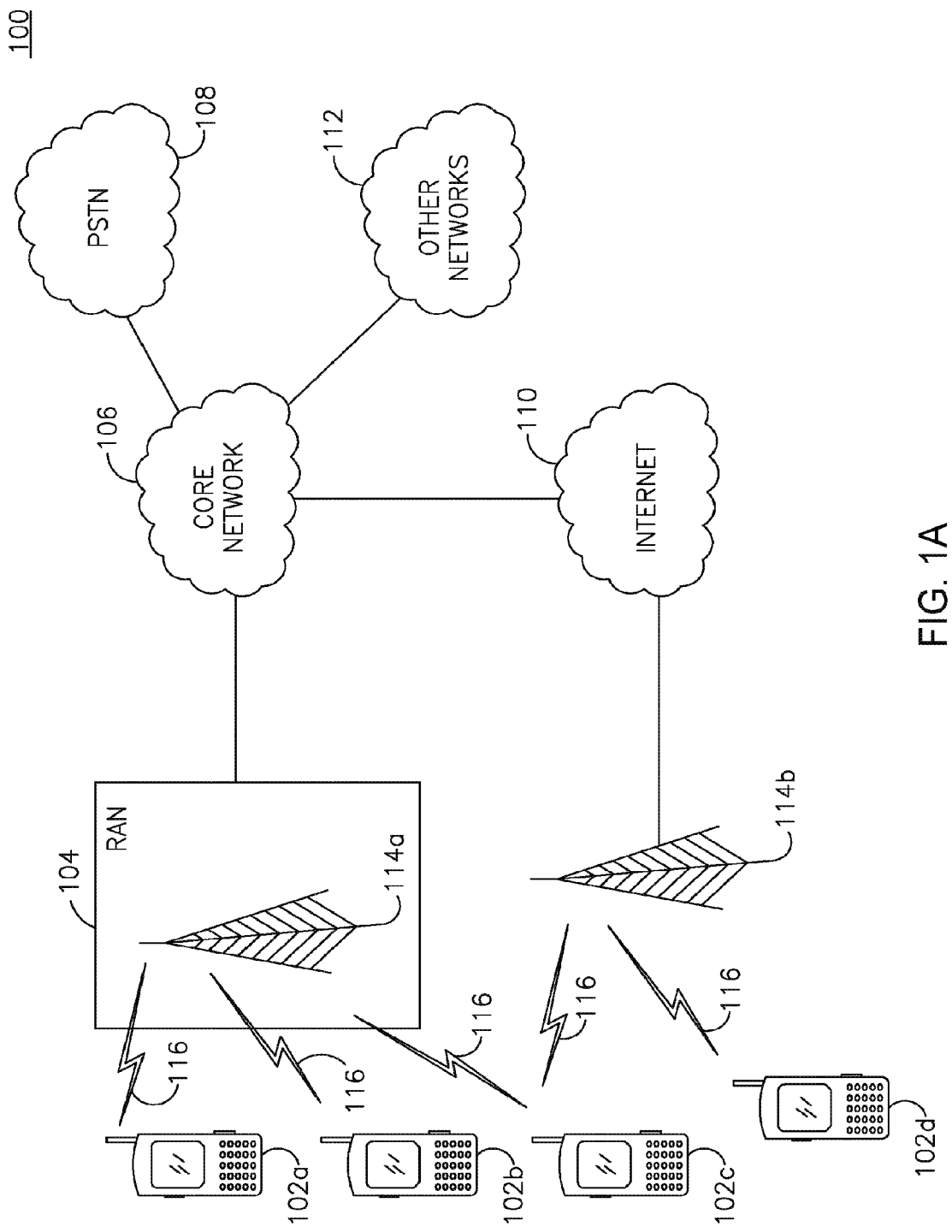
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an evolved Node-B (eNB), a home Node-B (HNB), a home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over Internet protocol (VoIP) services to one or more of the WTRUs 102a, 102b, 102c, 102d. For example, the CN 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing an E-UTRA radio technology, the CN 106 may also be in communication with another RAN (not shown) employing a GSM radio technology.

The CN 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
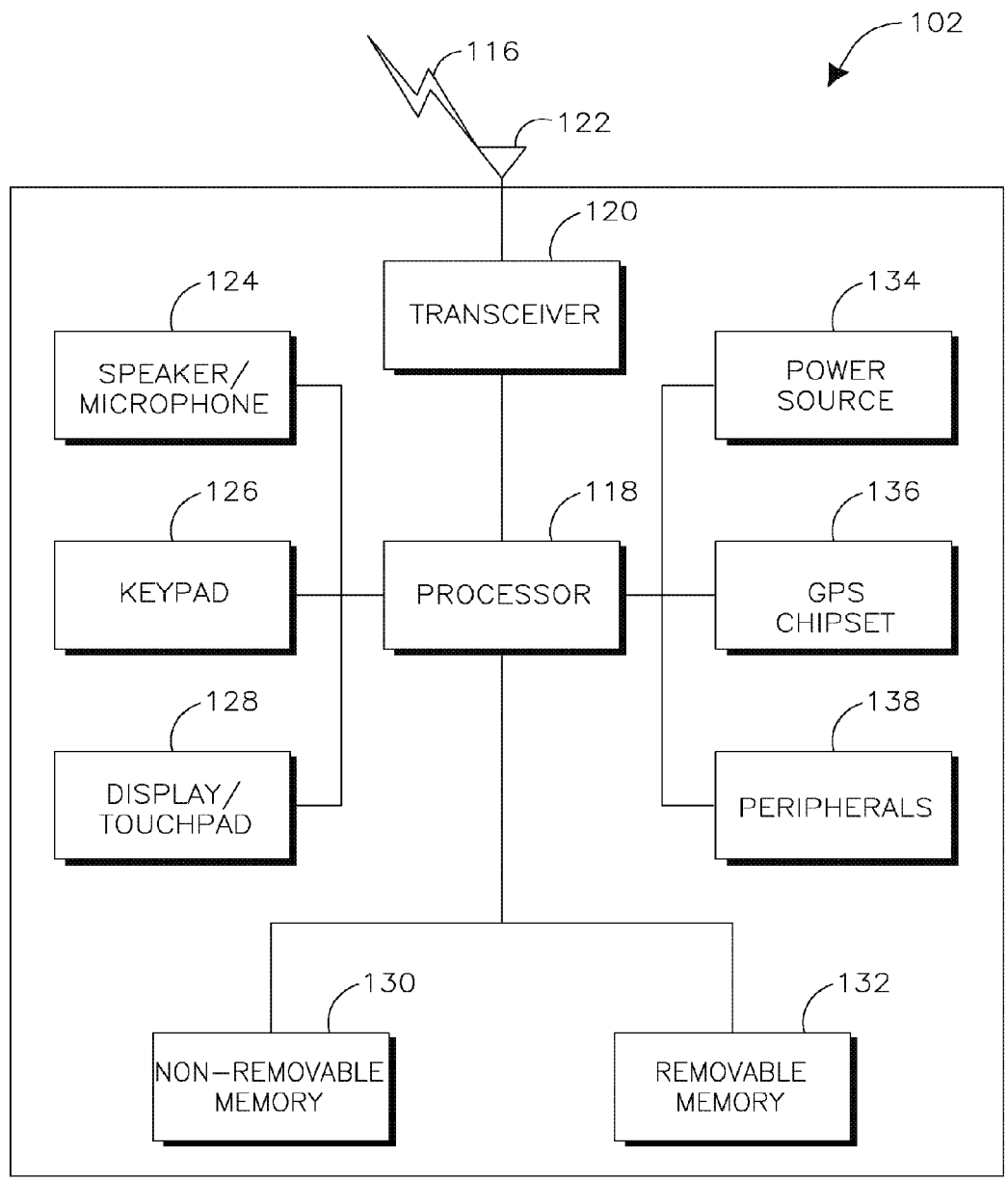
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
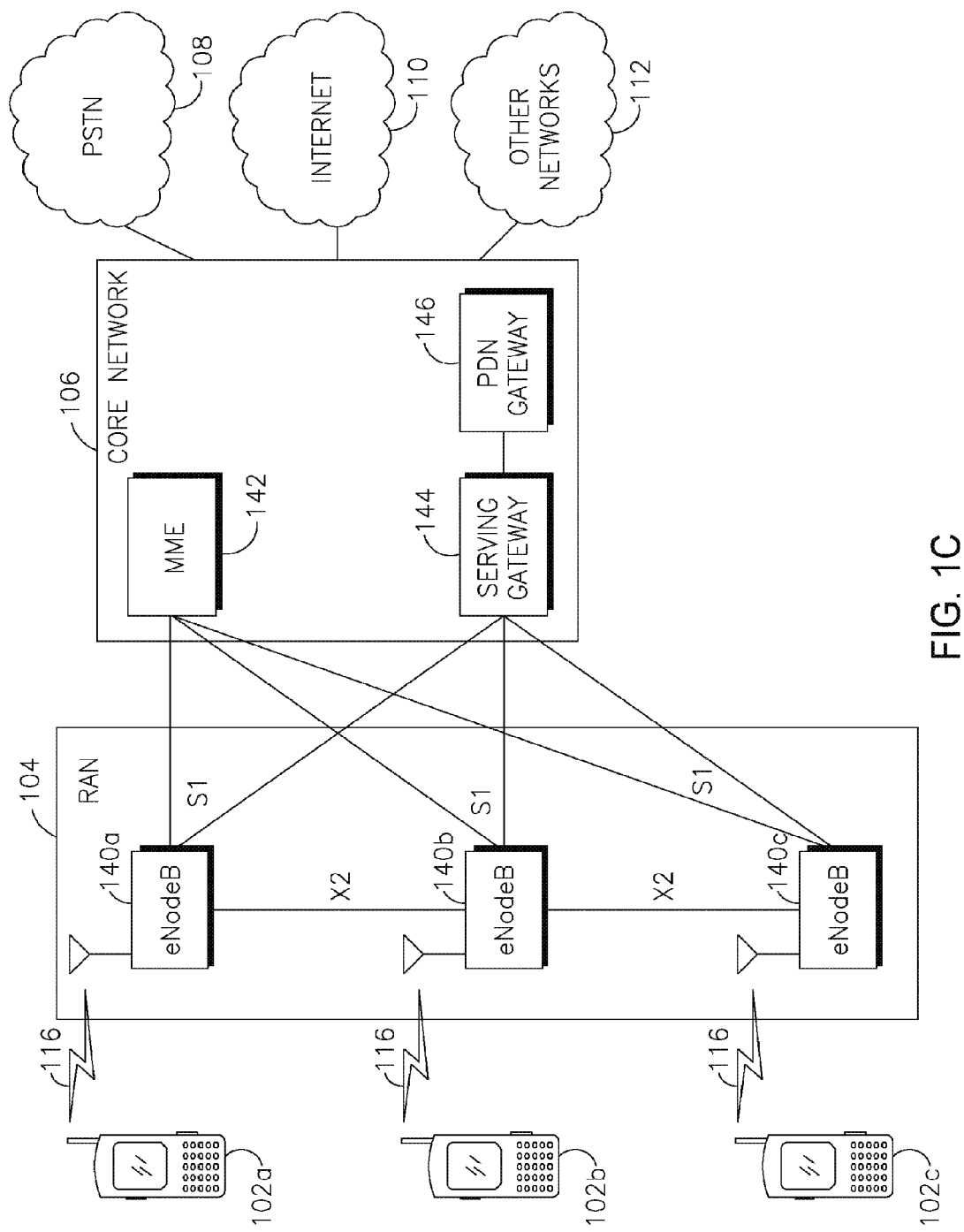
FIG. 1C shows an example radio access network and an example core network (CN) that may be used within the communications system shown in FIG. 1A.

FIG. 1C shows an example RAN 104 and an example CN 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the CN 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The CN 106 shown in FIG. 1C may include a mobility management entity (MME) 142, a serving gateway 144, and a packet data network (PDN) gateway 146. While each of the foregoing elements are depicted as part of the CN 106, it will be appreciated that any one of these elements may be owned and/or operated by an entity other than the CN operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway, (e.g., an IP multimedia subsystem (IMS) server), that serves as an interface between the CN 106 and the PSTN 108. In addition, the CN 106 may provide the WTRUs 102a, 102b, 102c with access to the networks 112, which may include other wired or wireless networks that are owned and/or operated by other service providers.

A "sponsor" may be a person, (e.g., a WTRU's user), who may be a subscriber of a public land mobile network (PLMN). For simplicity, the sponsor may be referred to in this application as "WTRU1", which may be a device used to access the service and initiate sponsoring. Nevertheless, the person, not the device, may be the sponsor, and this person may use other devices, (e.g., a personal computer (PC)), to access the service and initiate sponsoring. Similarly, a "sponsored entity" may also be a person, typically a PLMN subscriber, (e.g., a WTRU's user). For simplicity, the sponsored entity may be referred to in this application as "WTRU2", which may be a device used to consume a sponsored event.

A user may sponsor another user for the application service. Integration when a sponsor (WTRU1) and a recipient (WTRU2) of a sponsored event may be subscribers of the same mobile network operator (MNO), or when WTRU2 may not be a subscriber of an MNO. A service collaboration between WTRU1's MNO and an AP may exist. Cases with no service collaboration may also exist, including roaming scenarios and cases where the users of WTRU1 and WTRU2 may be subscribers of different MNOs.

Sponsoring may enable sharing of a service with others. In one use case, a user may visit friends at their home. The visiting user may have access to a paying live event streaming service, and may desire to watch a live event on the friend's television (TV). In another use case, a user watching a show may meet a friend on public transportation, and duplicate the presentation of the show on the friend's device. Alternatively, the user may send a digital invitation to someone to watch the show at a later time (e.g., within one week). In all cases, an inviter may be responsible for associated service fees. The application provider may also enable some form of free sharing up to a certain level of usage.

Some level of integration may be defined to ensure that charges associated with application sponsoring may be properly billed to the sponsor. Currently, sponsorship information may not be applicable for a dynamic situation where sponsoring may be offered by other end users.

Figure 2:
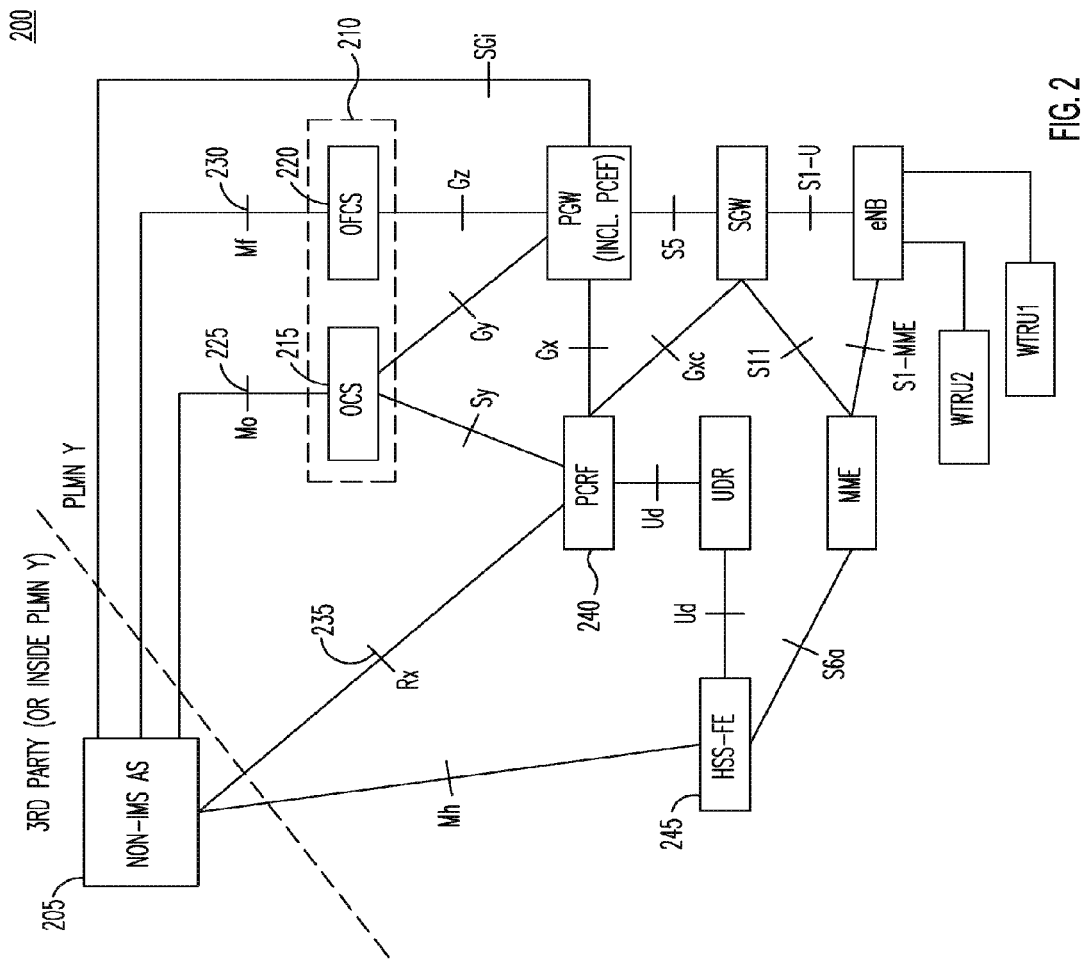
FIG. 2 shows a network architecture including an application server (AS) interconnected with charging nodes.

A cellular network subscriber may sponsor another subscriber for using an application that has an agreement to interoperate with the cellular network for user data access, policing and charging. A WTRU1 may enter in a pre-agreement with its MNO to enable sponsorship, possibly restricting this to a set of services. This information may be stored in the MNO network (home subscriber server (HSS), subscriber profile repository (SPR)/user data repository (UDR)). WTRU1 may offer an application server (AS) to sponsor another user. The AS may check authorization, (in network and potentially with WTRU2), and accept the offer by providing the proper trigger, (e.g., a hyperlink), to WTRU2 directly or through WTRU1. Part of this sequence may be performed ahead of time, (e.g., the AS may provide one-time sponsorship tokens to WTRU1 ahead of time. Then, WTRU1 may at a later time communicate uniform resource locators (URLs) containing such a token to WTRU2. Subsequently, (e.g., right after receiving the trigger or a week after receiving this trigger), WTRU2 may initiate the sponsored application session. During the session quality of service (QoS) and charging configuration, a policy and charging rules function (PCRF) 240, such as illustrated in FIG. 2, may check the sponsor's profile to ensure this sponsoring may be authorized. The session may then proceed. The sponsor may later be charged for the sponsored session.

As described herein, an enhanced 3GPP CN operation that supports sponsoring and sharing among users of a given application service may apply to a service itself, but may also cover network resource usage as well, (e.g., providing enough resource to a sponsoree to access service). This may be the case, even if the plan of the sponsoree does not enable this level of service. With reference to FIG. 2, the AS 205 may already have an agreement with the 3GPP CN operator, enabling the AS 205 to interoperate with the CN for subscriber profile access, QoS and charging.

User profile information elements (IEs) may be stored in an HSS or SPR/UDR that specify agreement by the user to sponsor others, possibly on a per-application basis, including various limitations in term of target WTRUs, validity time, or cost. Application specific limitations related to sponsoring may also be introduced in the HSS 245 or the AS 205. For example, there may be a limit to the number of concurrent sponsored access to a piece of content. Additional subscriber profile IEs related to group sponsoring and transferable sponsorship tokens may also be included.

An end user may propose sponsorship to another user, involving the application server. This sponsorship may be for the service itself, but may also cover cost of resource allocation in the access network. During this process, the AS 205 may access the sponsor user profile and verify that this operation is enabled, and then create an internal sponsored event descriptor for later use. Either the AS 205 or the sponsor may finally communicate information to access the sponsored service to the WTRU target of the operation.

The AS 205 may provide a WTRU with sponsorship tokens which the WTRU can communicate to other WTRUs to give them access to a sponsored event. These tokens can have limited scope, usage number or validity period. These tokens may be associated in the AS 205 with some form of pre-allocated sponsored event descriptor. Sponsorship tokens may be transferable to other WTRUs, or not transferable.

A WTRU may initiate an application session sponsored by another user, where the AS 205 matches this session initiation with an existing sponsored event descriptor, configures the session QoS and charging through the PCRF 240, and ensures that any charging may be directed towards the sponsor by using a distinctive charging key. The PCRF 240 may check the subscriber profiles of both the sponsor and the sponsored WTRUs to ensure that the sponsored event is authorized. If authorized, the session may be configured through a policy and charging enforcement function (PCEF). Messages may be introduced over an Rx reference point 235 between the AS 205 and the PCRF 240, to enable pre-authorization checking through the PCRF 240 by the AS 235.

Portions of the described flows may be applied independently, whereby support may enable a WTRU to share a service with another WTRU on one side, while on the other side, support may enable the AS 205 to request from a CN that a WTRU may be charged for a service given to another WTRU.

A conditional mode of a WTRU-based sponsoring may be implemented, whereby a WTRU declares that it is ready to sponsor the service for another WTRU, unless the other WTRU is able to access the service using an existing account.

In a non-3GPP context, an application service integrated with an access provider network for QoS, charging and access to a subscriber profile may enable WTRU-based sponsoring or sharing.

A sponsoring feature of 3GPP may include a request from a sponsor WTRU1 to obtain a token enabling the operation. A sponsoree WTRU2 may provide to an AS (at session initiation time) a token as a form of trigger to have the AS 205 sponsor the session on behalf of WTRU1.

An enhanced interface between the AS 205 and the 3GPP CN may be used to enable charging events to be sent by the AS 205, where the charging events do not relate to actual traffic, but to services provided by the AS 205. The Rx reference point 235 may be modified to support this feature. A gateway function, (possibly integrated with a PCRF or with a P-GW), as an intermediate between the AS 205 and the charging system may be implemented. A direct interface may be established between a third party AS and a charging system.

In a first embodiment that represents a collaborative case with the same MNO, WTRU1 and WTRU2 are subscribers of MNO Y. There is an agreement between MNO Y and AP X.

FIG. 2 shows a network architecture 200 including an application server (AS) 205 interconnected with charging nodes 210. The charging nodes 210 may include an online charging system (OCS) 215 and an offline charging system (OFCS) 220. The architecture 200 may provide an interconnection between the AS 205 and a wireless transmit/receive unit (WTRU) such as a mobile node (MN). The AS 205 and the charging nodes 210 may be directly interconnected over an Mo reference point 225 (for online charging) and/or an Mf reference point 230 (for offline charging). The Mo reference point 225 may be based on an Ro interface that is based on the Diameter base protocol, and the Mf reference point 230 may be based on an Rf interface that is based on the Diameter base protocol. In the architecture 200, charges related to accessing a service (or content) may be conveyed over the Mo reference point 225 and the Mf reference point 230.

With respect to offline charging, the Rf interface, (and therefore the Mf reference point 230 as well), may support event-based charging and session-based charging. The AS 205 may send an accounting-request (ACR) message including accounting data of accounting record type EVENT or START/INTERIM/STOP. With respect to online charging, Ro (and therefore the Mo reference point 225 as well) may support immediate event charging, event charging with unit reservation, and session charging with unit reservation. The AS 205 may send a credit-control-request (CCR) message including a CC-requested-type of set to the appropriate value.

The AS 205 and PCRF 240 charging interface updates may occur as described below. Since the AS 205 may charge a first WTRU user (WTRU1) over the Mo reference point 225 or the Mf reference point 230, user sponsoring may be enabled differently for service and connectivity.

One procedure may be applicable for service sponsoring, (e.g., cost of access for content delivered by the AS 205), and another procedure may be applicable for connectivity sponsoring, (e.g., cost for preferential traffic handling needed to deliver this content with a satisfactory quality of experience (QoE) for a second WTRU (WTRU2). This procedure may include user sponsoring of service, (e.g., cost to access content), which may be performed by the AS 205 over Mo reference point 225 or the Mf reference point 230 by charging WTRU1 directly rather than WTRU2, or by charging WTRU2 and including WTRU1's identity as the sponsor. The OCS 215 and OFCS 220 may create a charging data record (CDR) for WTRU1 which contains IEs stating that this CDR is related to the user sponsoring of WTRU2. Thus, WTRU1's bill may mention this information along with the charge.

Another procedure may include user sponsoring performed by the AS 205 over the Rx interface 235, by mentioning a user sponsor identity in the Rx message.

User sponsoring type may be controlled by WTRU1 at the application layer. In the user sponsoring request sent to the AS 205, the user sponsor may select the type of sponsoring among the following choices: service only, preferential traffic handling (i.e., connectivity) only, and service and preferential traffic handling. The AS 205 may act by independently using the procedures described above, depending on the user sponsoring type that was chosen by WTRU1.

The system may enable user-sponsoring related check to the OCS 215. A PCRF 235 may use its existing interface to the OCS 215 to check if WTRU1 has enough credit to perform the user sponsoring. For example, a specific user-sponsoring policy counter may be set up by an MNO to represent a user-sponsoring allowance for WTRU1, (e.g., up to 100 Mbytes of data traffic may be sponsored per month).

Classification of sponsor identity over Rx reference point 235 may occur. Rx signaling may be enhanced to distinguish between regular sponsor, (an entity with a sponsoring agreement with the MNO), and a user sponsor, (e.g., a subscriber such as WTRU1). The PCRF 240 may, if enabled by operator policy, perform authorization checks on sponsored preferential traffic handling profiles, while authorization checks for user sponsoring may be different (e.g. authorization in this case may require checking WTRU1's subscriber profile). This distinction between entity and user sponsors could be enabled by using some heuristics on the format of the sponsor-identity, (e.g., mobile station international subscriber directory numbers (MSISDNs), may be used for user sponsoring only). Nevertheless, this may require analyzing the sponsor-identity string and imposing additional restriction on the format of both entity and user sponsor identities, which adds complexity to the system and may restrict unnecessarily sponsoring features.

The following example methods may be used for proper classification. These are two examples of implementation of a classification of the sponsor identity.

```
Sponsored-Connectivity-Data::= < AVP Header: 530 >
                [ Sponsor-Identity ]
                [ User-Sponsor-Identity ]
        (Either Sponsor-Identity or User-Sponsor-Identity may be
        present)
                        [ Application-Service-Provider-
                          Identity ]
                        [ Granted-Service-Unit ]
                        [ Used-Service-Unit ]
                        *[ AVP ]
-or-
Sponsored-Connectivity-Data::= < AVP Header: 530 >
                [ Sponsor-Identity ]
                [ Sponsor-Identity-Type ]
                [ Application-Service-Provider-Identity ]
                [ Granted-Service-Unit ]
                [ Used-Service-Unit ]
                *[ AVP ]
```

In the first example, a new user-sponsor-identity of type UTF8String may be used. Sponsored-connectivity-data may include one and only one sponsor identity attribute value pair (AVP), either sponsor-identity, (for an entity with a sponsoring agreement with the MNO), or user-sponsor-identity, (for a sponsor who is a subscriber of the mobile network).

Alternatively, a second equivalent encoding may be provided as an example, where sponsor-identity may be used for both types of sponsors, but a new enumerated AVP sponsor-identity-type may be added, with the supported value SPONSOR_TYPE_ENTITY (0), the default value if this AVP is not present (for backward compatibility) and SPONSOR_TYPE_USER (1).

As a third alternative, there is no change in the AVP definition, but it is left to the AP and MNO to agree to use Sponsor-Identity in a way that conveys the sponsor type. For example, MSISDN or MSISDN@mnol.com or WTRU network access identifier (NAI) to identify a user sponsor and other strings to identify an entity sponsor.

Classification of sponsor identity over the Mf reference point may occur. Two deployment scenarios exist for the existing sponsored data connectivity feature. In a first scenario, the PCRF may assign a service specific charging key for a sponsored Internet protocol (IP) flow. As a result, later correlation of accounting records and usage data may be performed using the charging key. In a second scenario, a sponsor identifier and an application service provider identity may be included in policy control and charging (PCC) rules from the PCRF to the PCEF, which may provide this information to the charging nodes.

In this second scenario, Mf reference point signaling, (which is assumed to be equivalent to Rf signaling), may be enhanced to enable a distinction between a user sponsor and an entity with an agreement with the MNO. As a result, the charging node (e.g., charging data function (CDF)) may be aware that an accounting record may be related to a user sponsor, and may apply the charge to this user.

The following is an example of implementation of this classification. Service-Data-Container AVP may be included in the ACR message. Service-data-container AVP may be included in a packet switched (PS) information AVP, which may be included in a service-information AVP, which may be included in the ACR.

```
Service-Data-Container :: = < AVP Header: 2040>
                [ AF-Correlation-Information ]
                [ Charging-Rule-Base-Name ]
                [ Accounting-Input-Octets ]
                [ Accounting-Output-Octets ]
                [ Accounting-Input-Packets ]
                [ Accounting-Output-Packets ]
                [ Local-Sequence-Number ]
                [ QoS-Information ]
                [ Rating-Group ]
                [ Change-Time ]
                [ Service-Identifier ]
                [ Service-Specific-Info ]
                [ SGSN-Address ]
                [ Time-First-Usage ]
                [ Time-Last-Usage ]
                [ Time-Usage ]
               *[ Change-Condition]
                [ 3GPP-User-Location-Info ]
                [ 3GPP2-BSID ]
                [ Sponsor-Identity ]
                [ User-Sponsor-Identity ]
            (Either Sponsor-Identity or
            User-Sponsor-Identity may be
            present)
                [ Application-Service-Provider-Identity ]
-or-
Service-Data-Container :: = < AVP Header: 2040>
                [ AF-Correlation-Information ]
                [ Charging-Rule-Base-Name ]
                [ Accounting-Input-Octets ]
                [ Accounting-Output-Octets ]
                [ Accounting-Input-Packets ]
                [ Accounting-Output-Packets ]
                [ Local-Sequence-Number ]
                [ QoS-Information ]
                [ Rating-Group ]
                [ Change-Time ]
                [ Service-Identifier ]
                [ Service-Specific-Info ]
                [ SGSN-Address ]
                [ Time-First-Usage ]
                [ Time-Last-Usage ]
                [ Time-Usage ]
               *[ Change-Condition]
                [ 3GPP-User-Location-Info ]
                [ 3GPP2-BSID ]
              [ Sponsor-Identity ]
                [ Sponsor-Identity-Type ]
                [ Application-Service-Provider-Identity ]
```

In the first example, a new user-sponsor-identity of type UTF8String may be used. Sponsored-connectivity-data may include either a sponsor-identity, (for an entity with a sponsoring agreement with the MNO), or a user-sponsor-identity, (for a sponsor who is a subscriber of the Mobile Network).

Alternatively, a second equivalent encoding may be provided as an example, where sponsor-identity may be used for both types of sponsors, but a new enumerated AVP sponsor-identity-type may be added, with the supported value SPONSOR_TYPE_ENTITY (0), the default value if this AVP is not present (for backward compatibility) and SPONSOR_TYPE_USER (1).

As another alternative, there may be no change in the AVP definition, but it may be left to the AP and MNO to agree to use sponsor-identity in a way that conveys the sponsor type, (e.g., MSISDN or MSISDN@mnol.com or WTRU-NAI to identify a user sponsor and other strings to identify an entity sponsor).

Classification of sponsor identity over the Mo reference point may occur. The enhancement described above for the Mf reference point, (i.e., for the offline charging case), may be applicable for the Mo reference point as well, (i.e., for the online charging case), because a service-data-container AVP may also be included in the credit-control-request message.

AS owned by MNO may occur. The embodiment may be extended to the case where the AS is owned and deployed by the MNO. There is no change in the actual signaling of the solution in this case.

Example of minor enhancements include: AS typically would not dialog with PCRF to check WTRU1's authorization in 'sponsorship grant involves AS' part.

In a second embodiment that represents a collaborative case, with the same MNO, WTRU1 and WTRU2 are subscribers of MNO Y. There is an agreement between MNO Y and AP X.

An architecture where AS is interconnected with the charging nodes may be configured. Direct interconnection of the AS with the charging nodes over Mo/Mf may be used by AS to charge a user directly and the user sponsor may sponsor service only, preferential traffic handling only, or both. The AS may be owned and deployed by the MNO.

Figure 3A:
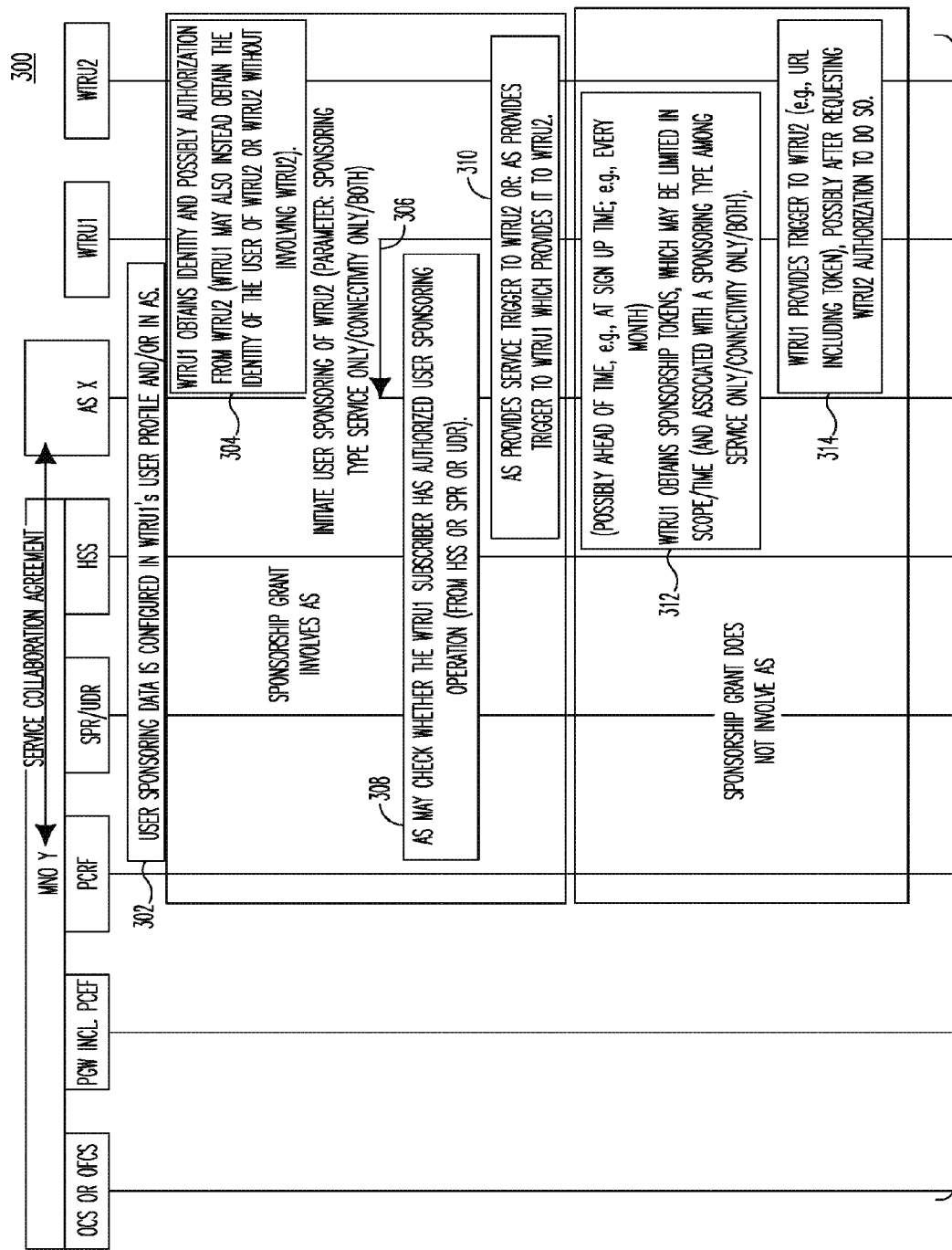
FIGS. 3A and 3B, taken together, are a message flow diagram of a user sponsoring procedure where an application server (AS) may be owned and deployed by a mobile network operator (MNO)
Figure 3B:
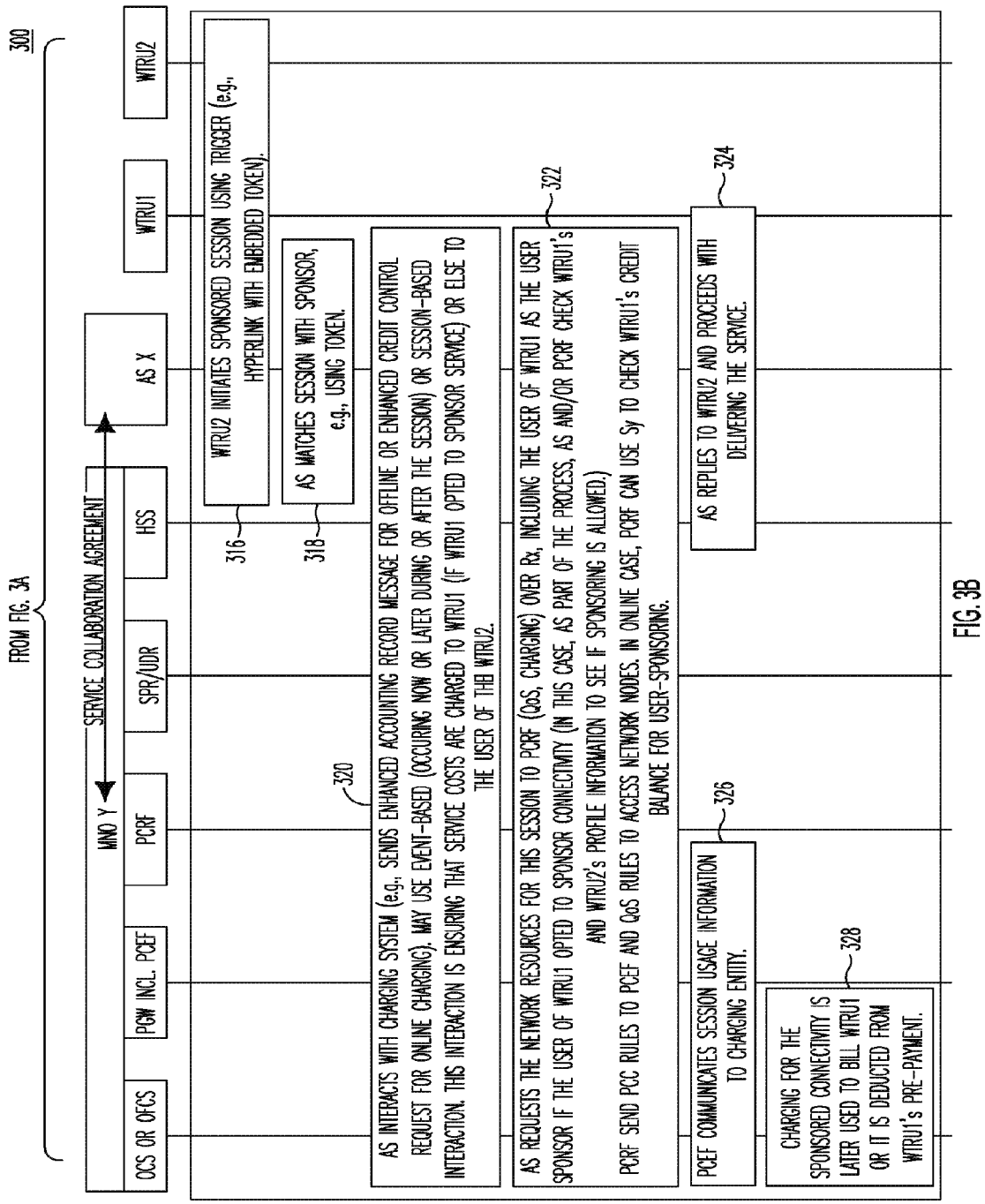

FIGS. 3A and 3B, taken together, is a message flow diagram of a user sponsoring procedure 300 where an AS may be owned and deployed by an MNO. A user may sponsor an application session for another subscriber of the same MNO. Context information may be provided for the network structure, where the AS has an agreement with a mobile network. WTRU1 and WTRU2 may be subscribers of the same mobile network.

WTRU1 may access a service provided by the AS with an agreement to the MNO. WTRU1 may be in the home network or may be roaming. WTRU2 may be a subscriber of the same MNO. WTRU2 may be in the home network. WTRU1 may seek to sponsor an application session, such as streaming of a particular movie from a movie service provided by the AS, or streaming of any movie from this service, during up to 4 hours within 2 weeks, for example.

As shown in FIG. 3A, user sponsoring data may be configured in WTRU1's user profile and/or in the AS (302). WTRU1 may obtain identity and authorization from WTRU2, and WTRU1 may also instead obtain the identity of the user of WTRU2, or the WTRU2 itself, without involving WTRU2(304). User sponsoring of WTRU2 may be initiated, (at least one of a service sponsoring type parameter or a connectivity sponsoring type parameter), (306). The AS may check whether the WTRU1 subscriber has an authorized user sponsoring operation, (from an HSS, SPR or UDR), (308). The AS may provide a service trigger to WRTU2, or the AS may provide a trigger to WTRU1 which provides it to WTRU2(310). WTRU1 may obtain sponsorship tokens, (possibly ahead of time, e.g., at sign up time or every month), which may be limited in scope/time, (and associated with at least one of a service sponsoring type or a connectivity sponsoring type), (312). WTRU1 may provide a trigger to WTRU2, (e.g., a URL including a token), possibly after requesting WTRU2 for authorization to do so (314).

As shown in FIG. 3B, WTRU2 may initiate a sponsored session using a trigger, (e.g., a hyperlink with an embedded token), (316). The AS may match the session with the sponsor (e.g., using the token), (318). The AS may interact with a charging system, (e.g., send an enhanced accounting record message for offline charging or enhanced credit control request for online charging), and the AS may use an event-based interaction, (occurring now or later during or after the session), or a session-based interaction (320). This interaction may ensure that service costs may be charged to WTRU1, (if WTRU1 opted to sponsor service), or else to the user of WTRU2. The AS may request the network resources for this session to the PCRF (QoS, charging) over the Rx interface, including the user of WTRU1 as the user sponsor if the user of WTRU1 opted to sponsor connectivity, (in this case, as part of the process, the AS and/or the PCRF may check WTRU1's and WTRU2's profile information to see if sponsoring is allowed), (322). The PCRF may send PCC rules to the PCEF, and send QoS rules to access network nodes. In an online case, the PCRF can use a Sy interface to check WTRU1's credit balance for user-sponsoring. The AS may reply to WTRU2 and proceed with delivering the service (324). The PCEF may communicate session usage information to a charging entity (326). Charging for the sponsored connectivity may be later used to bill WTRU1, or it may be deducted from a WTRU1's pre-payment (328).

Figure 3C:
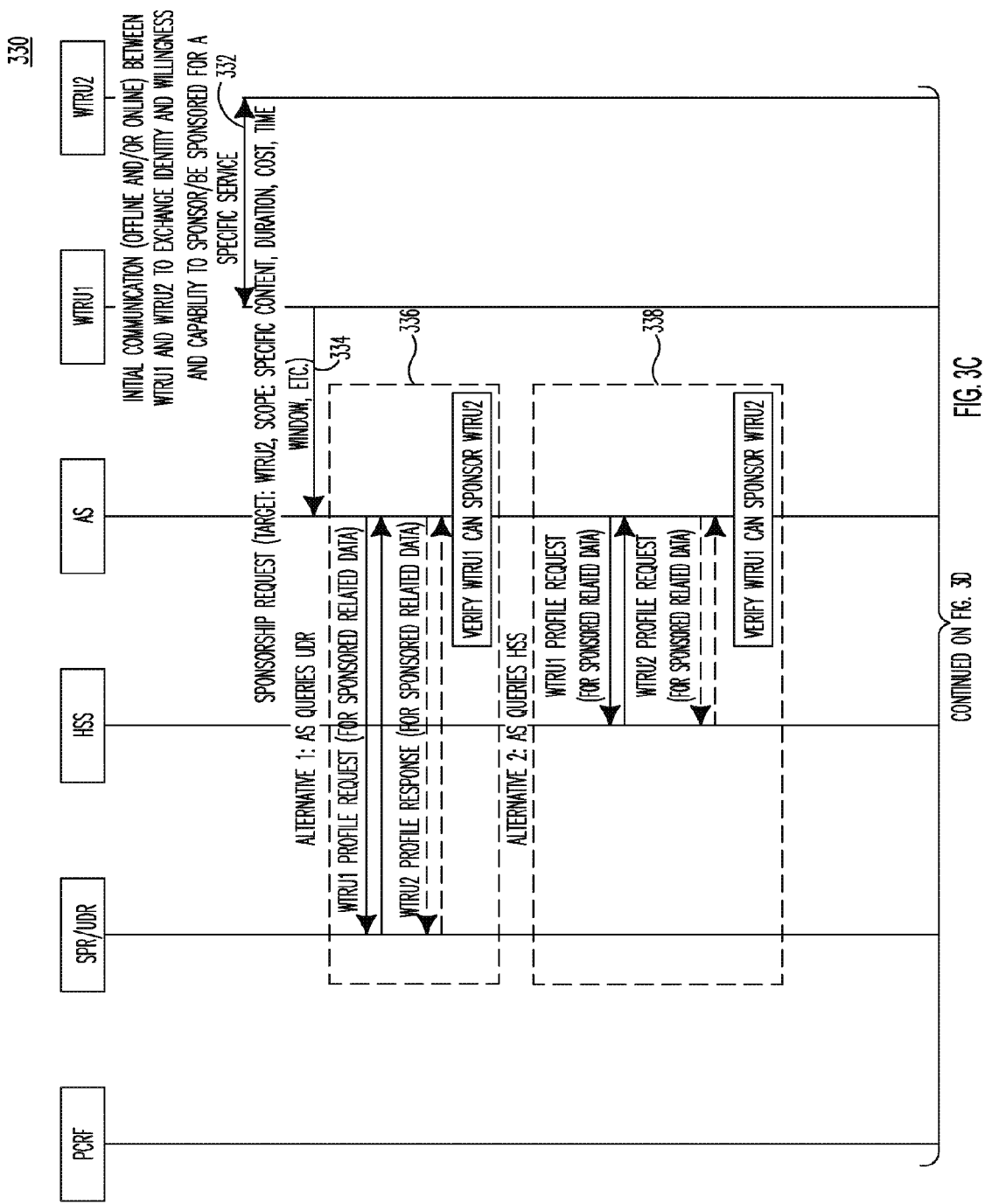
FIGS. 3C and 3D, taken together, are a message flow diagram of a sponsoring request procedure.
Figure 3D:
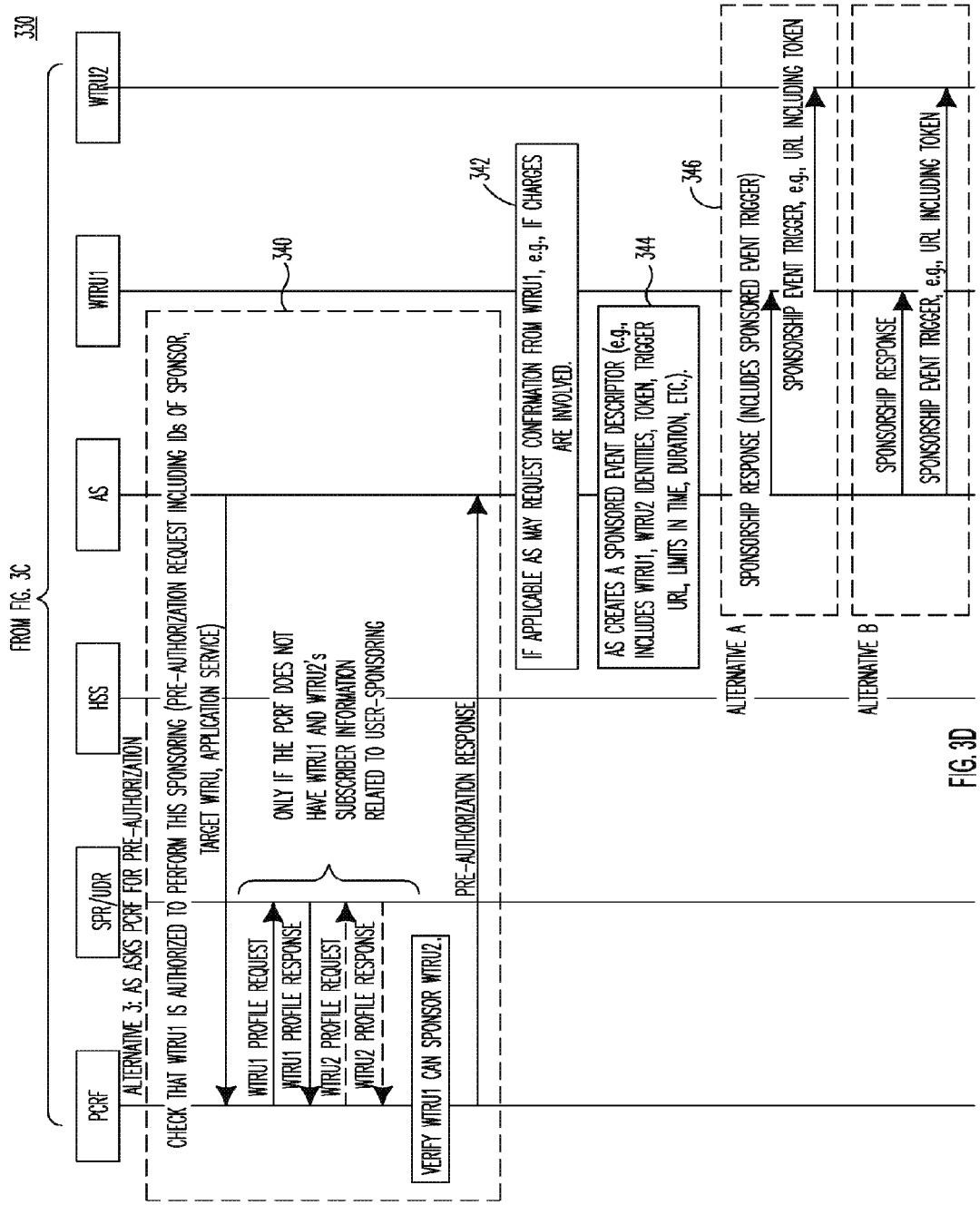

FIGS. 3C and 3D, taken together, are a message flow diagram of a sponsoring request procedure 330. As shown in FIG. 3C, initial communication may be established, (offline and/or online) between WTRU1 and WTRU2 to exchange identity, and willingness and capability to sponsor/be sponsored for a specific service (332). WTRU1 may send a sponsorship request message, (target: WTRU2, scope: specific content, duration, cost, time window, and the like), to the AS, offering to sponsor WTRU2 and may provide WTRU2's identity, as well as scope information about the sponsoring, (e.g., limitation in terms of cost or service duration, as access to a particular content or category of content), (334). This request may be performed at the application layer and the service may have explicit support for this sponsoring feature.

Upon reception of the sponsoring request, the AS may check that the WTRU1 is authorized to sponsor another user. The goal of this check is to enhance user experience. Generally, it may be more user-friendly to stop the procedure at this stage than to let the procedure fail later when WTRU2 initiates the application session. This check may be performed in several ways.

In a first alternative (336), the UDR may be used. The AS may query the UDR for WTRU1 profile information related to sponsoring, and verify that WTRU1 is authorized to sponsor WTRU2.

In a second alternative (338), the AS may obtain WTRU1 profile information related to sponsoring from HSS.

As shown in FIG. 3D, in a third alternative (340), the AS may ask the PCRF for pre-authorization. The PCRF in turn may obtain WTRU1 profile information from the SPR/UDR, check its authorization to sponsor WTRU2, and reply to the AS. This may requires a change to the PCRF and Rx reference point between AS and Rx, (e.g., modification to an AAR message to request pre-authorization of a future session instead of creating a new or modifying an existing session).

The WTRU2's user profile may also be used to verify that this sponsored event is authorized. For example, sponsored events recent history may show that WTRU2 sponsored quota has been exceeded, assuming such a quota is imposed by the AS.

The AS may perform this check earlier, for example, when WTRU1 signs on to the service and configures the application account to enable sponsoring, such that the AS may cache this result. The AS may omit this check, which may result in WTRU2 being denied sponsored service if WTRU1 is not authorized to sponsor WTRU2 for this service.

The AS may request confirmation from WTRU1, such as if some charges are involved (342). WTRU1 may review the final charge before confirming. This may include any unexpected surcharges that may be needed if WTRU2 does not have the proper IP connectivity plan. The AS may request confirmation from WTRU1. The AS may create an internal sponsored event descriptor for future use (344). The AS may include all or some of the following in the event descriptor: the identity of WTRU1 and WTRU2, the token, the trigger URL, application level scope, expiration date for consuming the sponsored event, and allowed service duration.

The AS may reply with a positive or negative success code to WTRU1 (346, 348). In case of success, the AS may provide a trigger, (e.g., a hyperlink to the sponsored content, including a token identifying the sponsored event), to WTRU2, (e.g., using short messaging service (SMS)), (346). The AS may provide this information in the response to WTRU1, and WTRU1 may send it to WTRU2, for example, using near field communication, SMS or email (346).

Figure 3E:
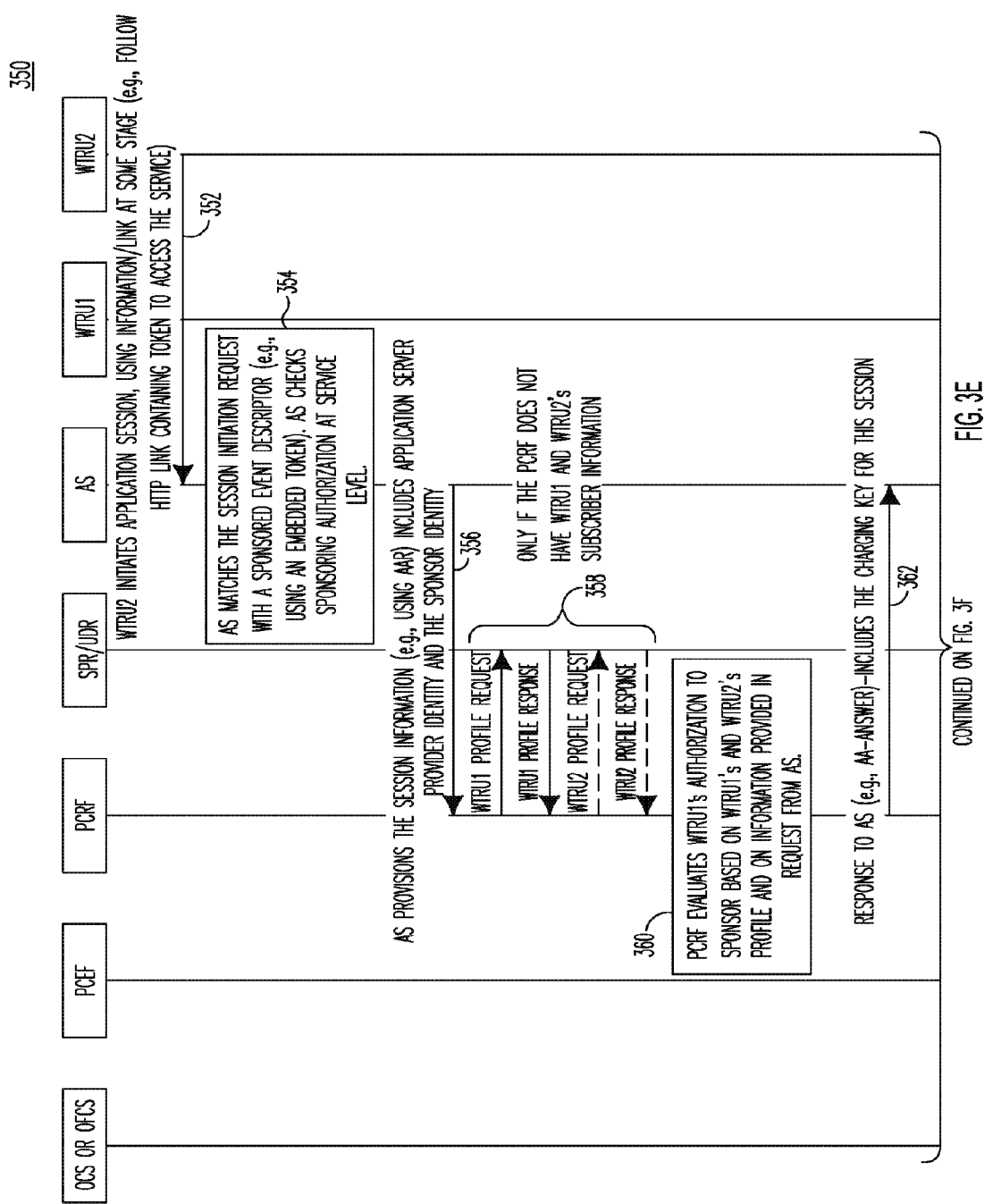
FIGS. 3E and 3F, taken together, are a message flow diagram of a procedure for sponsored session initiation.
Figure 3F:
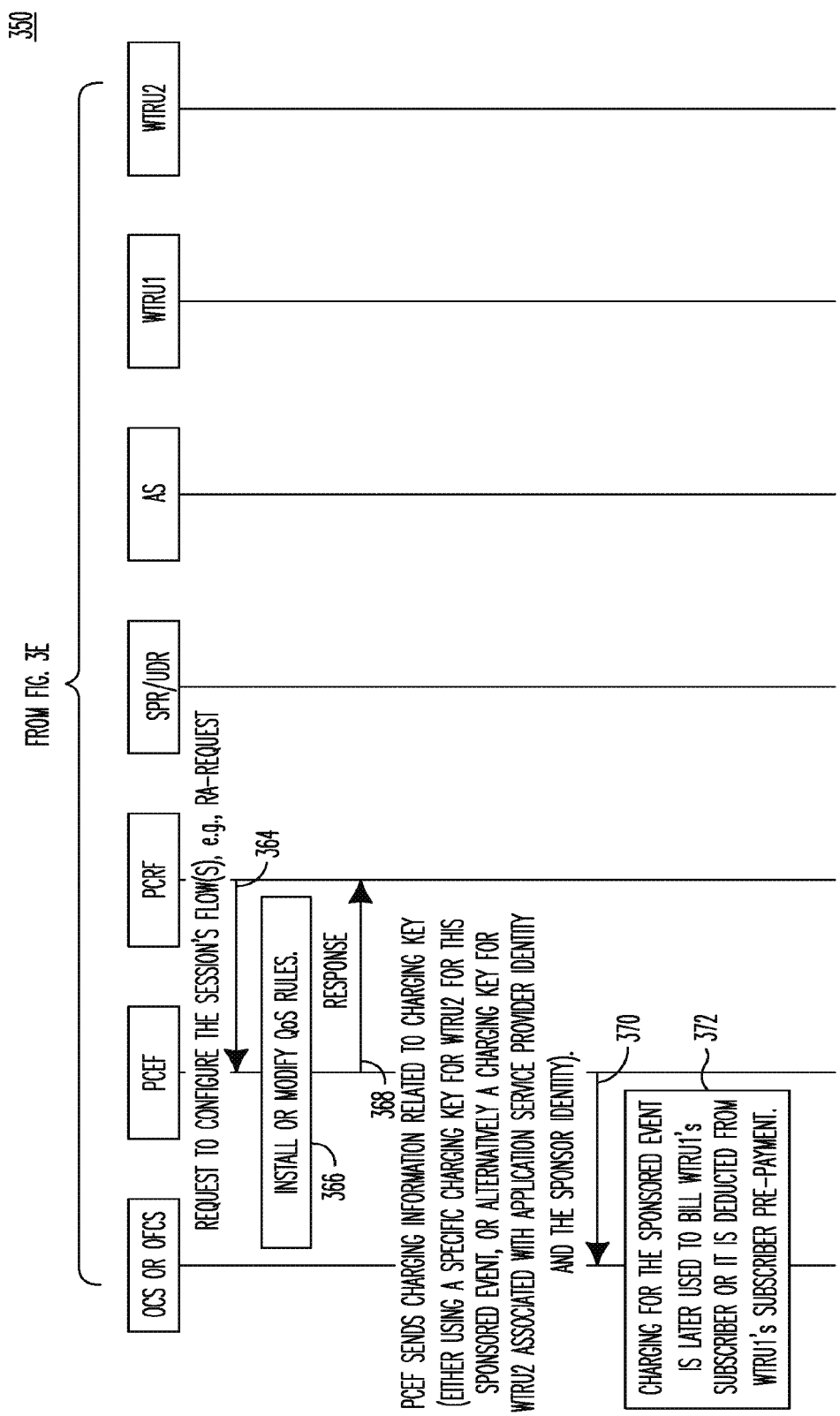

FIGS. 3E and 3F, taken together, is a message flow diagram of a procedure 350 for sponsored session initiation. As shown in FIG. 3E, WTRU2 may initiate the sponsored application session, for example, by following the hyperlink containing a token (352). The decision to start the sponsored application session may be initiated by WTRU2's user, (e.g., watching a sponsored show at a convenient time). WTRU1's user may sponsor WTRU2's user to share an ongoing live show. WTRU2 may start receiving the service as soon as the sponsorship initiation process is completed. The sponsored application may also be initiated by the AS, (e.g., the AS may send an SMS to WTRU2 when the sponsored live show starts). Upon reception of the application session request from WTRU2, the AS may match this session with its sponsor, for example, using the token included in the service URL used by WTRU2 and matching this token with a sponsored event descriptor data structure stored on the AS (354). The AS may perform authorization checks before proceeding. For example, authorization checks may prevent over-sponsoring of the same video show at the same time, and may prevent abuses of the sponsoring feature. The AS may communicate with the PCRF to configure the application session for QoS and charging, (e.g., an AAR message over Rx). For example, an AAR message may be sent that may include a session identifier, a charging key, the sponsor identity, application service provider identity and other parameters related to sponsoring (356).

The PCRF may check the sponsor's profile (from SPR/UDR) to ensure that this sponsored event is authorized, (e.g., WTRU1's profile authorize sponsoring of this particular service), (358). For example, WTRU2 may be part of a white list of WTRUs that may be sponsored. The WTRU2 profile may also be used as input for this same test, (e.g., if WTRU2 has been sponsored too many times in a given period, then the sponsored event may not be authorized and/or if WTRU2's data plan does not support the required QoS, then the WTRU1 profile may indicate whether the surcharge is acceptable). The PCRF may configure the session through the PCEF. The PCEF may interact with charging system nodes such as the OCS or the OFCS over the Gy interface to the OCS, or over the Gz interface to the OFCS.

The PCRF may evaluate WTRU1 authorization to a sponsor based on the WTRU1 and WTRU2 profiles, and on information provided in a request from the AS (360). The PCRF may send a response to the AS (e.g., AA answer) including a charging key for the current session (362).

As shown in FIG. 3F, the PCRF may send a request to the PCEF to configure the session's flow(s), (e.g., a routing area (RA) request), (364). The PCEF may install or modify QoS rules (366) and send a response to the PCRF (368). The PCEF may send charging information related to a charging key, (either using a specific charging key for WTRU2 for this sponsored event, or alternatively a charging key for WTRU2 associated with an application service provider identity and the sponsor identity), (370). Charging for the sponsored event may later be used to bill WTRU1's subscriber, or it may be deducted from WTRU1's subscriber pre-payment (372).

Multiple WTRUs may be supported simultaneously. For example, the organizer of an event could sponsor services towards all users present at the event. The AS may support group sponsoring. That is, the AS may provide and process tokens valid for more than one end user. For example, the AS may emit a token valid for up to 1,000 end users as long as they initiate the sponsored session during a single validity day. Further, the token may be provided by WTRU1(or the AS) to all recipients. For example, WTRU1 may send multiple SMS messages to all intended recipients, or may alternatively post the token on a web or Intranet page. WTRU1's subscriber profile may include new IEs to enable/disable group sponsoring, or impose limitation on group sponsoring. For example, a maximum number of recipients for group sponsoring may be included and/or the cost limit for group sponsoring may be enabled. These information elements may have a scope of a single application or be global for all applications.

Transferable tokens may also be supported. That is, tokens may be transmitted from WTRU2 to WTRU3. WTRU3 then consumes the service using the token. For example, a user sends a sponsored service link (e.g. access to a live sport event) to a friend as a birthday gift, but this friend does not have time to watch the show and decides to transfer the link to his son (who will see the show on his own device, under a different subscription).

The message flow presented in FIGS. 3A and 3B may be applied to the transferred tokens. The token may be marked as transferable or non-transferable in the AS. For example, WTRU1 may request a non-transferable token from AS by providing the destination WTRU2 identity in the "WTRU1 subscriber initiates sponsoring of WTRU2" request. WTRU1 may not include WTRU2's identity in the request. The AS may check if WTRU1 is allowed to get transferable tokens before providing the token to WTRU1. When WTRU2 or another WTRU3 accesses the service using the transferred token, the AS matches the token with the sponsored session, and can reject a request from WTRU3 if WTRU2 was explicitly mentioned in the original sponsorship request from WTRU1. If there are not explicit instructions, the sponsored service may proceed further.

The AS may provide tokens with no determined target of the sponsoring, (e.g., the case mentioned previously where the AS provides a set of monthly tokens to WTRU1). In this case, the AS may process the service request from WTRU2/WTRU3 in a way similar to a transferred token. Additional subscriber profile IEs may be utilized in this situation to include enable/disable transferable sponsoring, (on a per-application basis, and/or associated with a cost limit).

Partial applications of the procedure described above may also be performed. For example, smaller steps of the above procedure may be performed independently. Sharing may occur without focusing on charging, and user sponsoring may occur during a preliminary exchange.

With respect to sharing without impact on charging, sponsoring may be replaced with sharing. WTRU1 may provide a token to WTRU2 to enable access to the service, such as access to a live show and/or streaming of the show, (and possibly synchronized with the show currently playing on WTRU1's device).

The exchange of tokens may occur as described above. WTRU2 may initiate the application session with AS. The AS may interpret the token as a sharing token. The AS may not include a sponsor identity in the session setup message, (e.g., AAR) sent to the PCRF. The application session QoS and charging may be handled as described above.

Conditional sponsoring may also occur. For conditional sponsoring, WTRU1 desires to share a session with WTRU2, and only sponsor if necessary. For example, if WTRU2 is already a monthly subscriber of the service provided by AS, there is typically no need for WTRU1 to sponsor WTRU2. Conditional sponsoring may be implemented in the AS, (i.e., in the application layer). The application checks if WTRU2 is already a subscriber of the service, and if WTRU2 is a member, the application may not provide a sponsor identity in the session setup message (e.g. Diameter AAR) towards PCRF. If WTRU2 is not a subscriber, (or if WTRU2's subscription does not include the particular service that WTRU1 desires to share with WTRU2), then the sponsorship may proceed, for example, following the flow described above.

In the situation where a user is sponsoring without a preliminary exchange, (e.g., support for merged accounts), the AS may know ahead of time that WTRU2 is being sponsored by WTRU1. For example, several family members who have different subscriptions may decide to access a single service using one single account. Such a single account may be configured to sponsor all service access for these specific other users. To support this, the user subscriber profile may include specific parameters, (e.g., a list of WTRUs to sponsor for application X, within a cost limit of Y (or with unlimited cost limit)).

Application of the present description is provided for a general, non-3GPP specific context. An access network operator providing QoS and charging, and providing integration hooks for third party application providers, may be enhanced to support user sponsoring and sharing.

Figure 4:
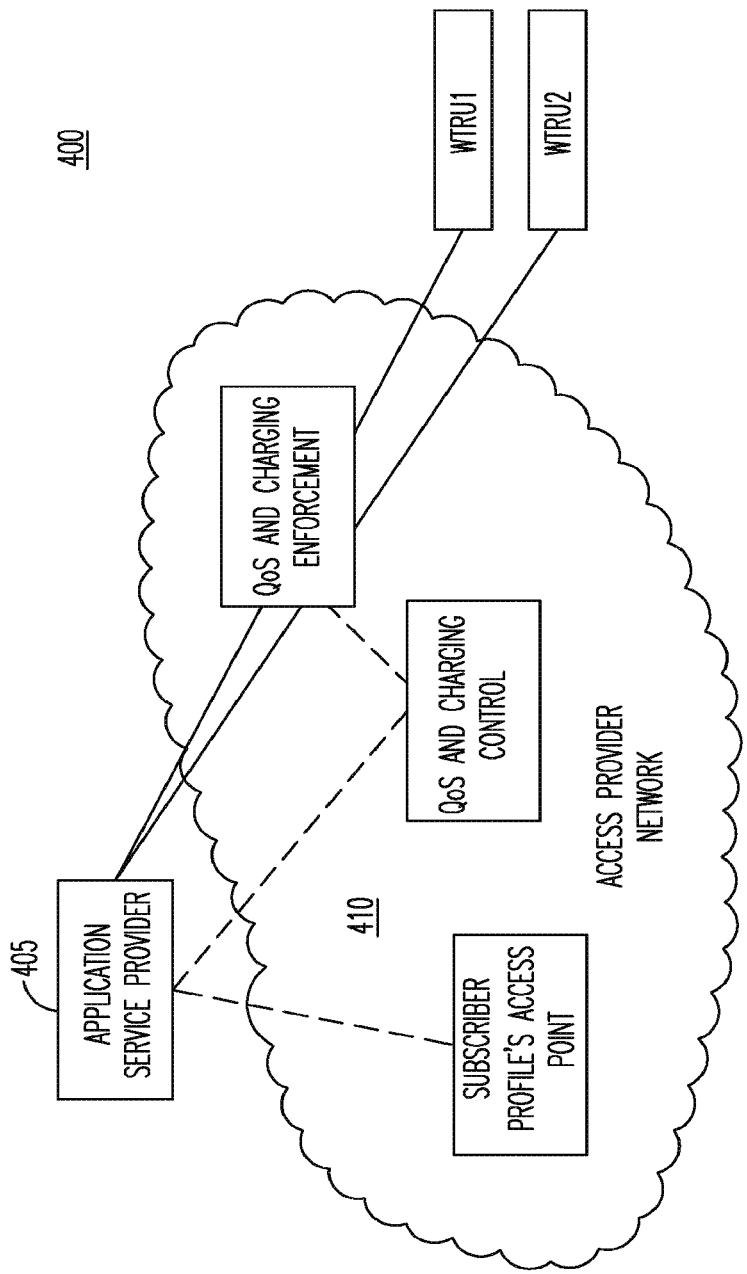
FIG. 4 shows an architecture context whereby an application service provider may establish an agreement with an access provider network.

FIG. 4 shows an architecture context 400 whereby an application service provider 405 may establish an agreement with an access provider network 410. As part of this agreement, the application service provider 405 may control QoS and charging for WTRUs (e.g., WTRU1 and WTRU2) accessing the service via the access provider network 410. The application service provider 405 may also access a portion of the subscriber profile.

Figure 5A:
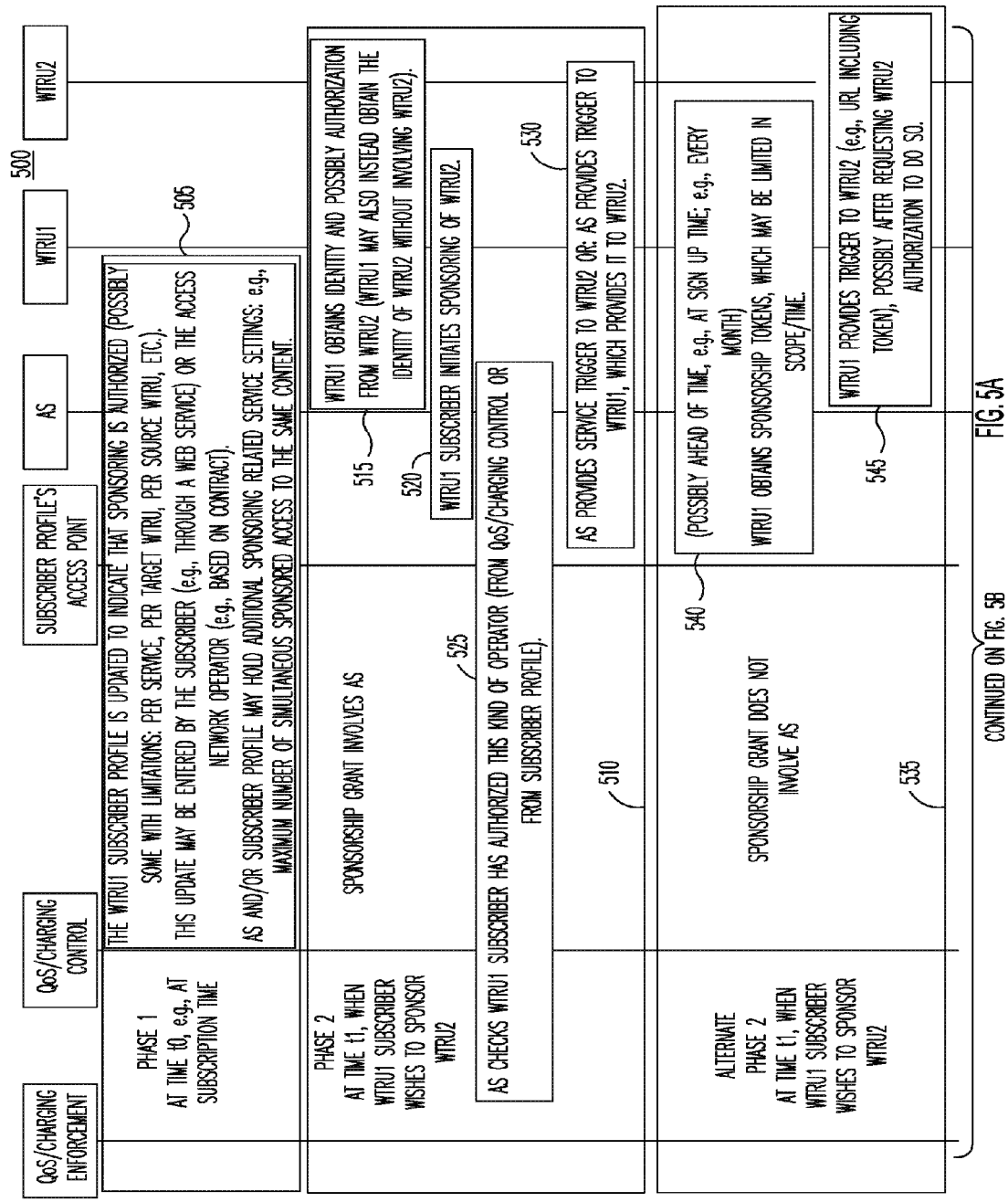
FIGS. 5A and 5B, taken together, are a high level message flow diagram of a procedure implementing user-based sponsoring.
Figure 5B:
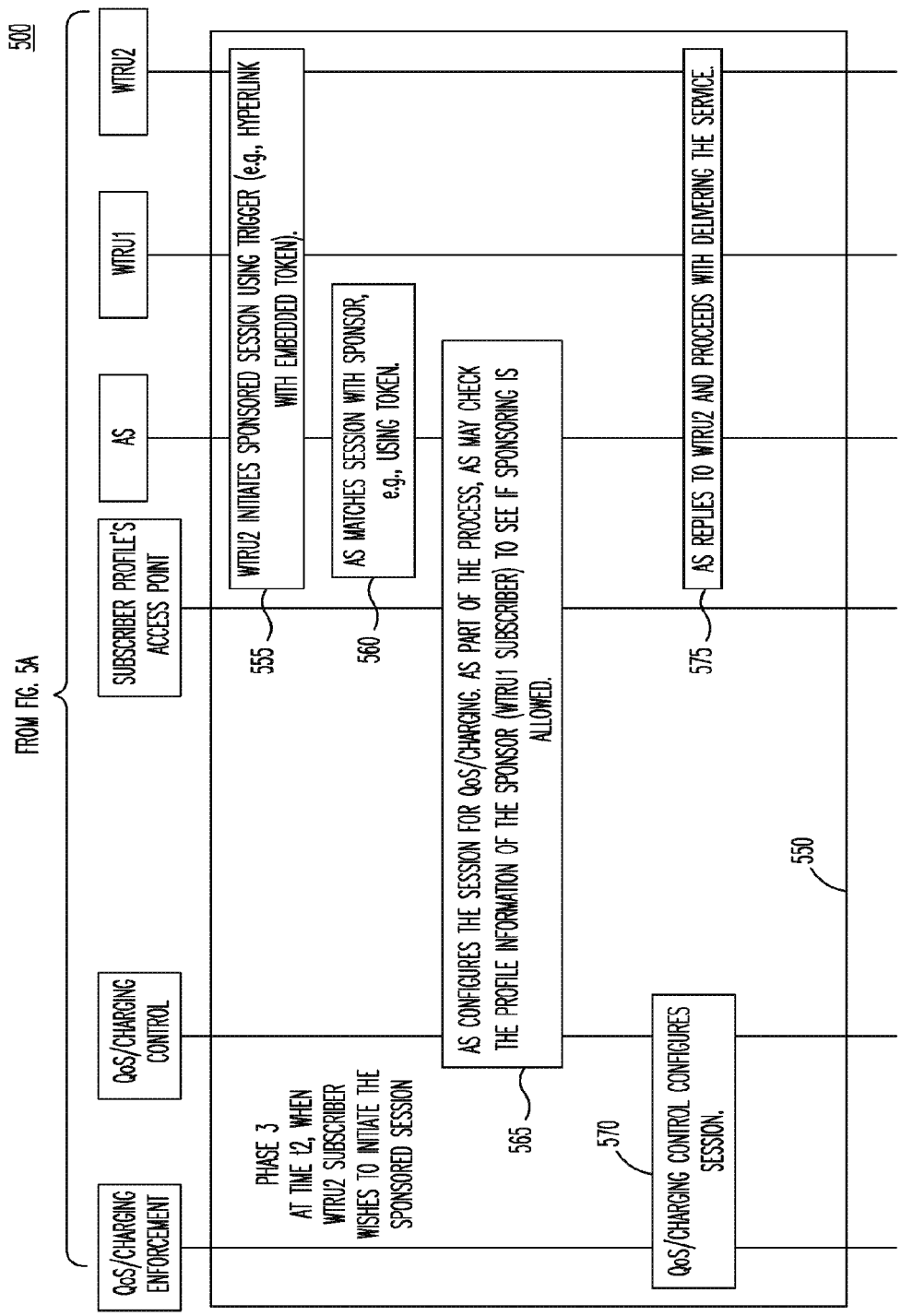

FIGS. 5A and 5B, taken together, is a high level message flow diagram of a procedure 500 implementing user-based sponsoring.

As shown in FIG. 5A, in a first phase (505), at time t0, (e.g., at subscription time), a WTRU1 subscriber profile may be updated to indicate that sponsoring is authorized, (possibly some with limitations: per service, per target WTRU, per source WTRU, and the like). This update may be entered by the subscriber, (e.g., through a web service), or the access network operator, (e.g., based on a contract). The AS and/or the subscriber profile may hold additional sponsoring related service settings, (e.g., maximum number of simultaneous sponsored access to the same content.

In a second phase (510), at time t1, when the WTRU1 subscriber desires to sponsor WTRU2, a sponsorship grant may involve the AS. WTRU1 may obtain an identity and possibly authorization from WTRU2, (instead, WTRU1 may obtain the identity of WTRU2 without involving WTRU2), (515). The WTRU1 subscriber may initiate the sponsoring of WTRU2(520). The AS may check whether the WTRU1 subscriber has authorized this kind of operator, (from QoS/charging control or from a subscriber profile), (525). The AS may provide a service trigger to WTRU2 or the AS may provide a trigger to WTRU1, which may provide it to WTRU2(530). In an alternate second phase (535), at time t1, when the WTRU1 subscriber desires to sponsor WTRU2, the sponsorship grant may not involve the AS. Possibly ahead of time, (e.g., at sign up time or every month), WTRU1 may obtain sponsorship tokens, which may be limited in scope/time (540). WTRU1 may provide a trigger to WTRU2, (e.g., a URL including a token), possibly after requesting WTRU2 authorization to do so (545).

As shown in FIG. 5B, in a third phase (550), at time t2, when the WTRU2 subscriber desires to initiate the sponsored session, WTRU2 may initiate a sponsored session using a trigger, (e.g., a hyperlink with an embedded token), (555). The AS may match a session with a sponsor, (e.g., using the token), (560). The AS may configure the session for QoS/charging (565). As part of the process, the AS may check the profile information of the sponsor (WTRU1 subscriber) to se if sponsoring is allowed. QoS/charging control may be used to configure the session (570). The AS may reply to WTRU2 and proceed with delivering the service (575).

An application provider may sponsor WTRU2 on behalf of WTRU1. The sponsor, from a 3GPP CN standpoint may be the application provider. WTRU1 may trigger the AS to sponsor WTRU2 on behalf of WTRU1. The subscriber profile in HSS and/or SPR/UDR may still include sponsorship related configuration (that AS can check before granting the sponsorship token) and/or the AS may store all this information internally.

In a first example, user based sponsoring WTRU may be charged on a fixed basis. WTRU1, as a subscriber of the service provided by AS, may be entitled to sponsor other WTRUs either for free or as part of a fixed additional subscription fee, (typically within a maximum cost limit or a maximum number of sponsored events). From the 3GPP CN standpoint, the application provider may sponsor the WTRUs. Internally, the AS may ensure that WTRU1 stays within the allowed limits for sponsoring, (e.g., by maintaining a count of the sponsored events and/or a sum of the service cost).

Figure 6A:
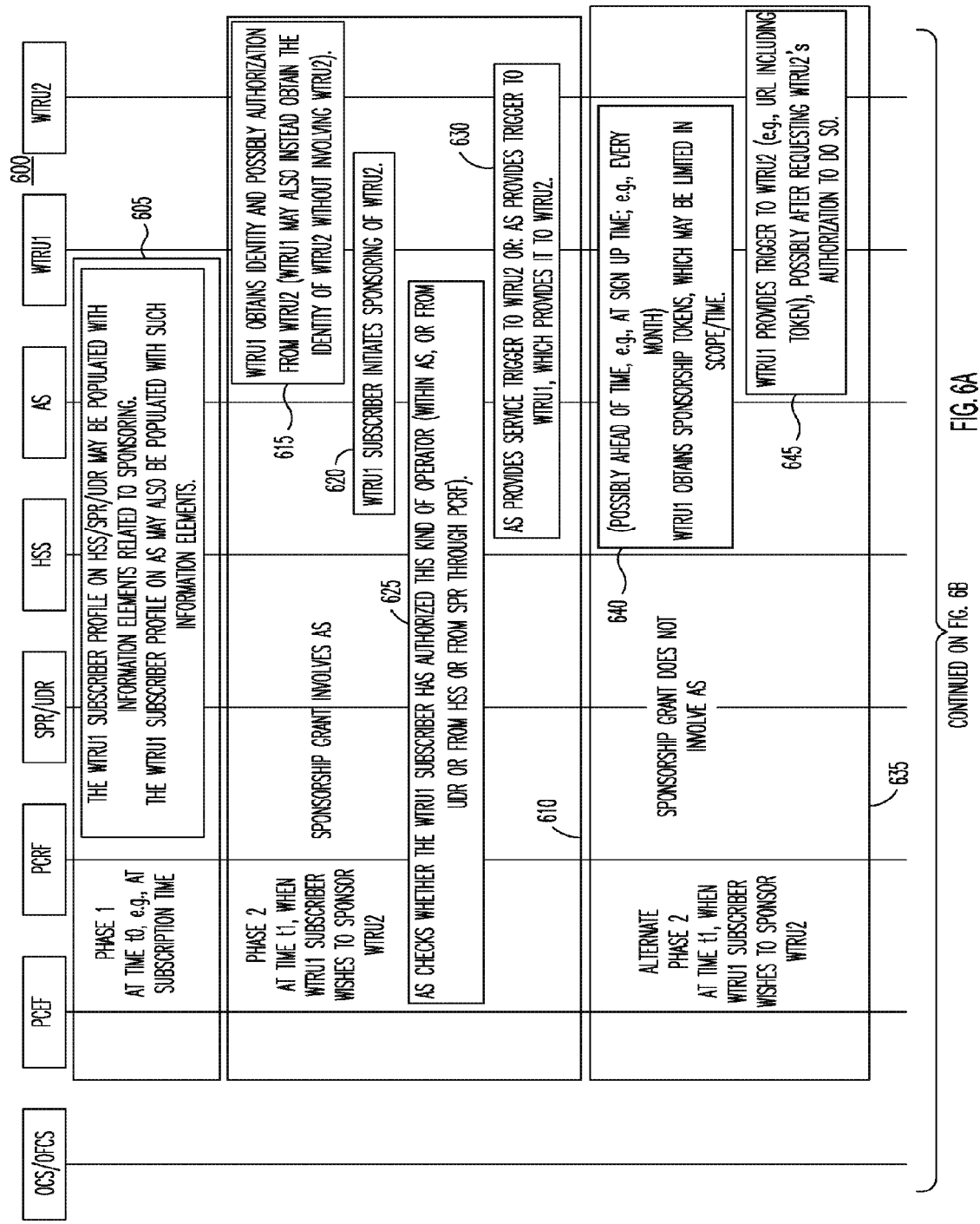
FIGS. 6A and 6B, taken together, are a high level message flow diagram of a procedure for an application provider sponsoring a WTRU service on behalf of another WTRU.
Figure 6B:
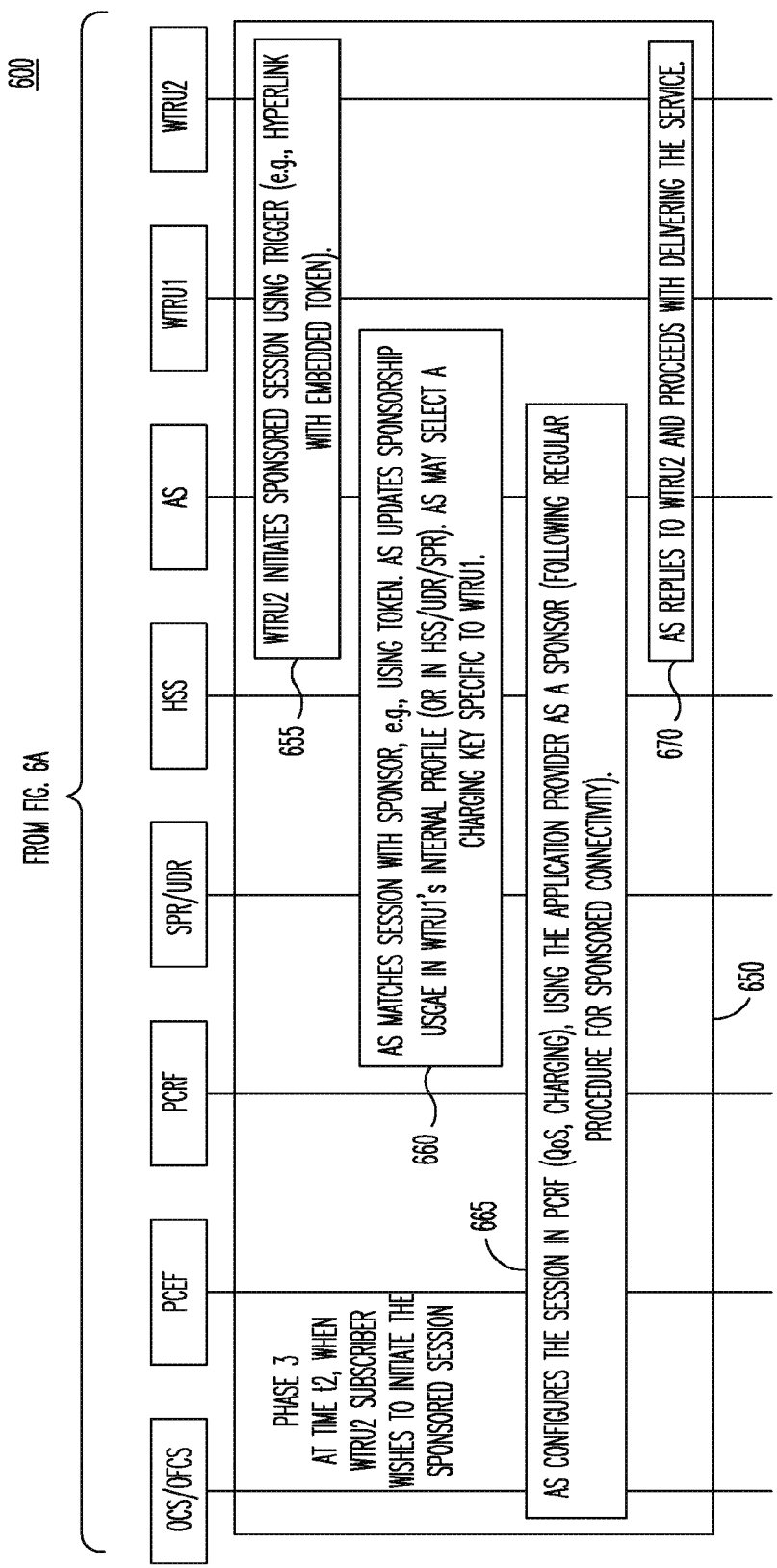

FIGS. 6A and 6B, taken together, is a high level message flow diagram of a procedure 600 for an application provider sponsoring a WTRU service on behalf of another WTRU. Since sponsoring is free or part of a fixed subscription package, the AS may not need to ensure that the cost of the sponsored session may be integrated in WTRU1's bill.

As shown in FIG. 6A, in a first phase (605), at time t0, (e.g., at subscription time), a WTRU1 subscriber profile on HSS/SPR/UDR may be populated with IEs related to sponsoring. The WTRU1 subscriber profile on the AS may also be populated with such IEs.

In a second phase (610), at time t1, when the WTRU1 subscriber desires to sponsor WTRU2, a sponsorship grant may involve the AS. WTRU1 may obtain an identity and possibly authorization from WTRU2, (instead, WTRU1 may obtain the identity of WTRU2 without involving WTRU2), (615). The WTRU1 subscriber may initiate the sponsoring of WTRU2(620). The AS may check whether the WTRU1 subscriber has authorized this kind of operator, (within the AS, or from the UDR, HSS or SPR through the PCRF), (625). The AS may provide a service trigger to WTRU2 or the AS may provide a trigger to WTRU1, which may provide it to WTRU2 (630). In an alternate second phase (635), at time t1, when the WTRU1 subscriber desires to sponsor WTRU2, the sponsorship grant may not involve the AS. Possibly ahead of time, (e.g., at sign up time or every month), WTRU1 may obtain sponsorship tokens, which may be limited in scope/time (640). WTRU1 may provide a trigger to WTRU2, (e.g., a URL including a token), possibly after requesting WTRU2 authorization to do so (645).

As shown in FIG. 6B, in a third phase (650), at time t2, when the WTRU2 subscriber desires to initiate the sponsored session, WTRU2 may initiate a sponsored session using a trigger, (e.g., a hyperlink with an embedded token), (655). The AS may match a session with a sponsor, (e.g., using the token), (660). The AS may update sponsorship usage in the WTRU1's internal profile, (or alternatively, in the HSS/UDR/ SPR). The AS may configure the session in the PCRF (QoS, charging), using the application provider as a sponsor (following regular procedure for sponsored connectivity), (665). The AS may reply to WTRU2 and proceed with delivering the service (670).

The sponsor WTRU may be charged on a per-sponsored session basis. WTRU1's user is sponsoring other WTRUs outside of a fixed settlement. For example, the cost of every session is based on effective time of usage of sponsorees. A variety of monetary models may be used (e.g. WTRU1 may sponsor others for free up to a certain cost, and then pay for excess usage). The application provider is effectively sponsoring the session (from 3GPP CN perspective). Therefore AS needs to redirect the charge towards WTRU1's subscriber using some kind of charging events. These charging events are not related to actual sessions passing through PCEF, but instead indicate a onetime cost (one shot events), or indicate a start or end of a time based charging event.

In one example of implementation of charging events, the Rx interface may be enhanced to enable charging events to be sent by the AS to PCRF, (e.g., charge WTRU1 for XXX, cost of service). The charging events may be conveyed to the charging server through PCRF and PCEF. In more detail, a new "Charging-Event-Type" attribute-value pair (AVP) type may be defined and have values such as "onetime", "start" and "stop". This AVP may be used in AA-request commands (from AS to PCRF) to express a charging event. Session ID value or range may be reserved to relate for charging event types (i.e. this session IDs never relate to a real session).

The AS may have a direct interconnection with the offline and/or online charging systems. These new interfaces between a third party AS and the charging systems may be based on the reference points including Ro between the charging trigger function (AS) and the online charging function, and Rf between the charging trigger function (AS) and the offline charging function.

AS may interconnect with the charging system(s) through a charging gateway. This charging gateway may have the role of the charging trigger function to the reference points to the charging functions. A reference point may be introduced between the AS and the charging gateway. This reference point may implement Ro, Rf or a subset of these reference points' functionalities.

FIGS. 7A, 7B and 7C show architectural views of enabling charging events to be sent by a third party AS to the 3GPP CN.

In FIG. 7A, an enhanced Rx interface 705 may enable charging events, such as one time charging commands to be sent by an AS 710 to a PCRF 715.

In FIG. 7B, a direct interconnection to an online charging function (OCF) 720 and/or an offline charging function, such as a charging data function (CDF) 725, may be used by an AS 730 to send charging events.

In FIG. 7C, an indirect interconnection to an OCF 735 and/or a CDF 740, through a charging gateway 745, may be used by an AS 750 to send charging events.

Figure 8B:
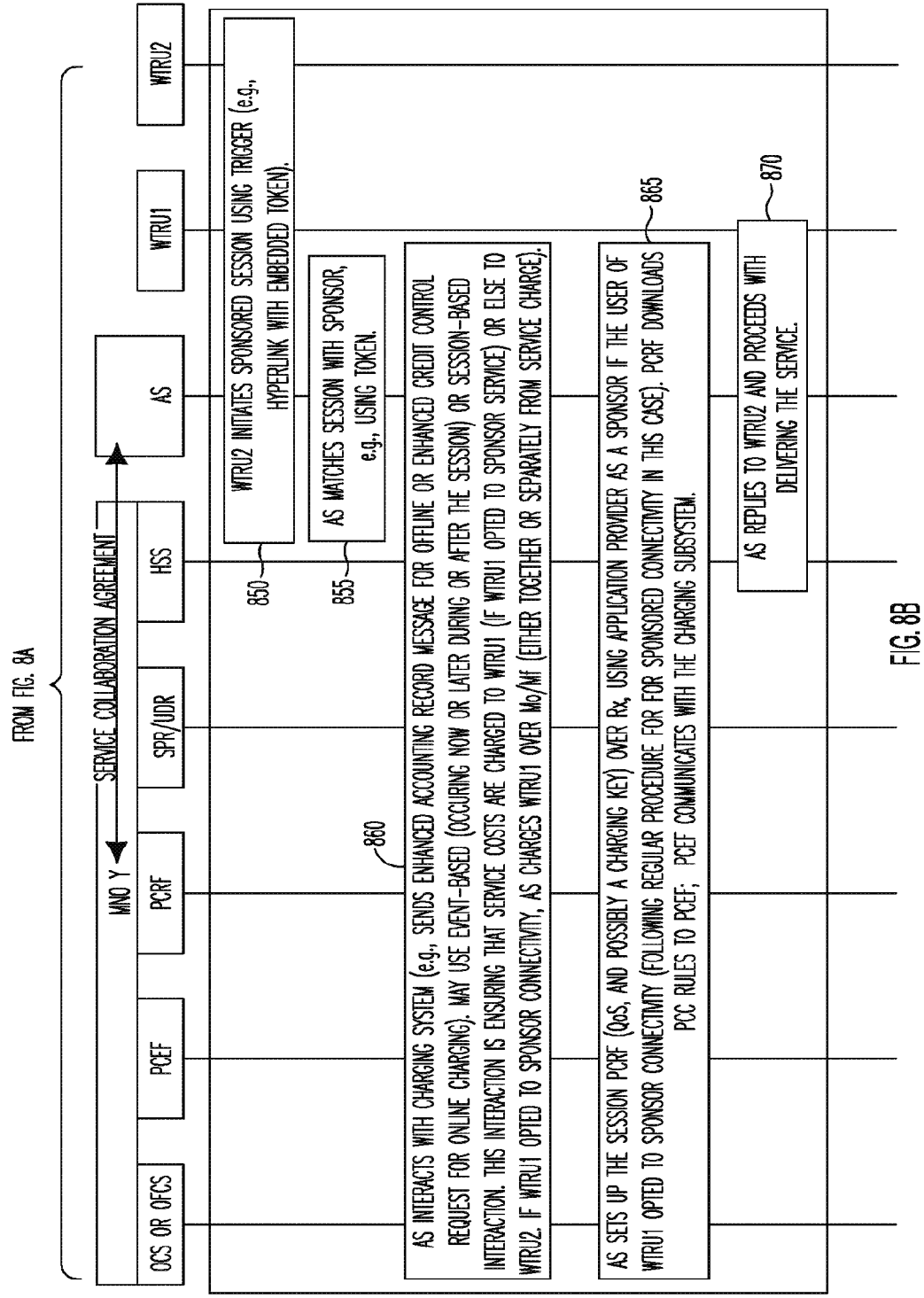

FIGS. 8A and 8B, taken together, is a high level message flow diagram of a procedure 800 for user sponsoring. The AS typically may not dialog with the PCRF to check WTRU1's authorization when a sponsorship grant involves an AS part. In a collaborative case, with the same MNO in a roaming situation, WTRU1 and WTRU2 may be enabled to be subscribers on the same MNO Y. AP X may have an agreement with MNO Y. WTRU2 may be roaming in MNO W. MNO W may have a roaming agreement with MNO Y to provide preferential traffic handling for MNO Y subscribers at an extra cost to the user.

As shown in FIG. 8A, the WTRU1 subscriber profile on the HSS/SPR/UDR may be populated with IEs related to sponsoring. The WTRU1 subscriber profile on the AS may also be populated with such IEs (805).

When a sponsorship grant involves the AS (810), WTRU1 may obtain an identity and authorization from WTRU2, or obtain the identity of WTRU2 without involving WTRU2 (815). User sponsoring of WTRU2 may be initiated by WTRU1 to the AS, (at least one of a service sponsoring type parameter or a connectivity sponsoring type parameter), (820). The AS may check whether the WTRU1 subscriber has authorized a user sponsoring operation, (from the HSS, SPR or UDR), (825). The AS may provide a service trigger to WTRU2, or the AS may provide a service trigger to WTRU1, which provides it to WTRU2(830).

When a sponsorship grant does not involve the AS (835), (possibly ahead of time, e.g., at sign up time or every month), WTRU1 may obtain sponsorship tokens, which may be limited in scope/time, (and may be associated with a sponsoring type among at least one of service or connectivity), (840). WTRU1 may provide a trigger to WTRU2, (e.g., a URL including a token), possibly after requesting WTRU2 for authorization to do so (845).

As shown in FIG. 8B, WTRU2 may initiate a sponsored session using a trigger, (e.g., a hyperlink with an embedded token), (850). The AS may match a session with a sponsor, (e.g., using the token), the AS may update sponsorship usage in WTRU1's profile in the AS or in the HSS, UDR or SPR, and the AS may select a charging key specific to WTRU1(855). The AS may interact with the charging system (OCS or OFCS), (e.g., by sending an enhanced accounting record message for offline charging or an enhanced credit control request for online charging), (860). An event-based interaction, (occurring now or later during or after the session), or a session based interaction may be used to ensure that service costs are charged to WTRU1, (if the user of WTRU1 opted to sponsor service), or else to WTRU2. If WTRU1 opted to sponsor connectivity, the AS may charge WTRU1 over the Mo/Mf reference point, (either together or separately from the service charge), (860). The AS may set up the session in the PCRF, (QoS, and possibly a charging key), over the Rx interface, using the application provider as a sponsor if the user of WTRU1 opted to sponsor connectivity, (following regular procedure for sponsored connectivity in this case), (865). The PCRF may download PCC rules to the PCEF, which may communicate with the charging subsystem. The AS may reply to WTRU2 and proceed with delivering the service (870).

Figure 9:
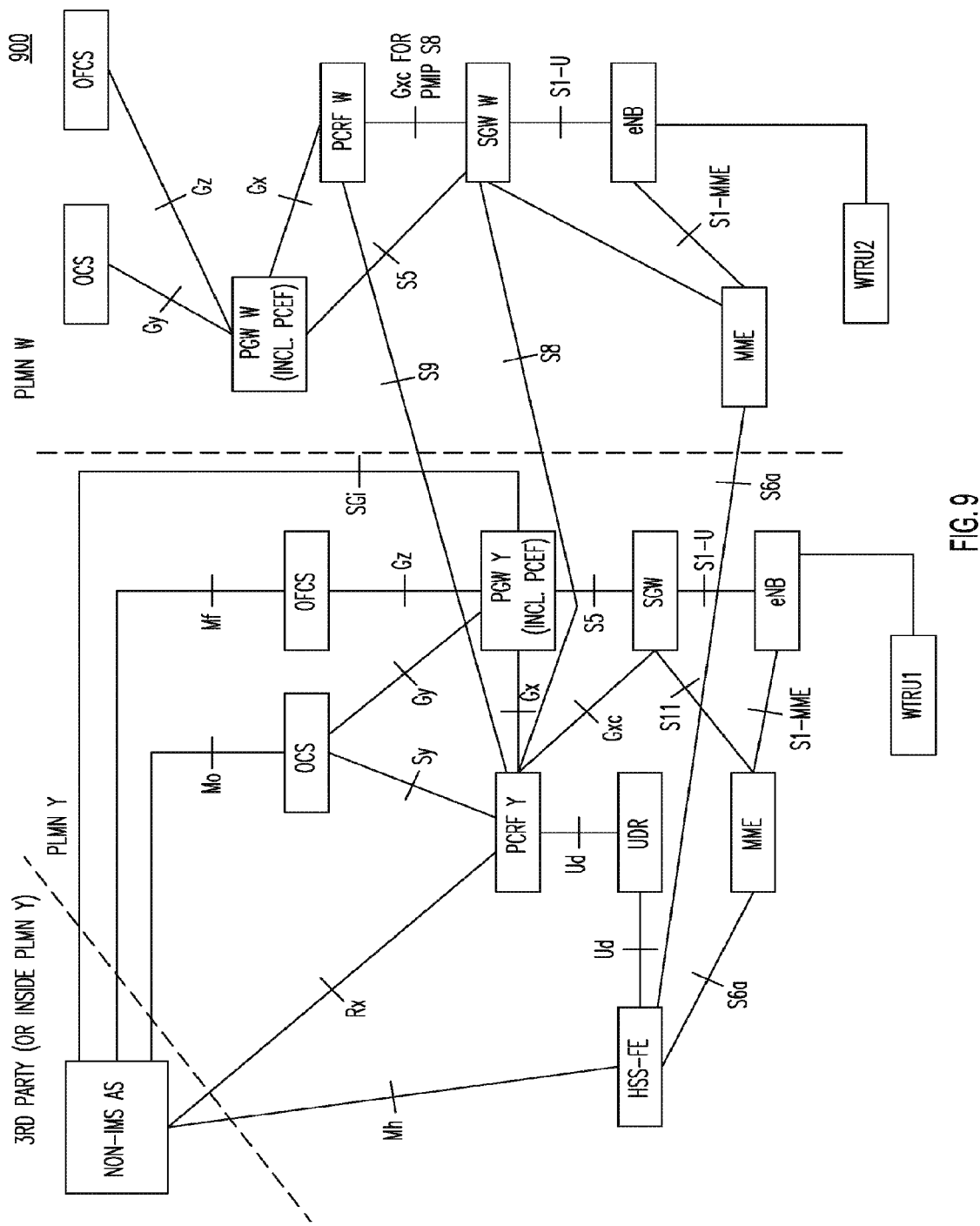
FIG. 9 shows a home-routed network architecture in which the users of two different WTRUs subscribe to a first MNO, but one of the WTRUs is roaming in a second MNO that provides preferential traffic handling to subscribers to the first MNO at an extra cost.

FIG. 9 shows a network architecture 900 for a context of application. WTRU1 may be represented in the home network or in another PLMN, without impacting the solutions described below, since WTRU1 involvement may be at the application layer. WTRU2 may be roaming in PLMN W. FIG. 9 illustrates the home-routed roaming architecture, whereby data traffic may be routed to/from WTRU2 through the home network.

Figure 10:
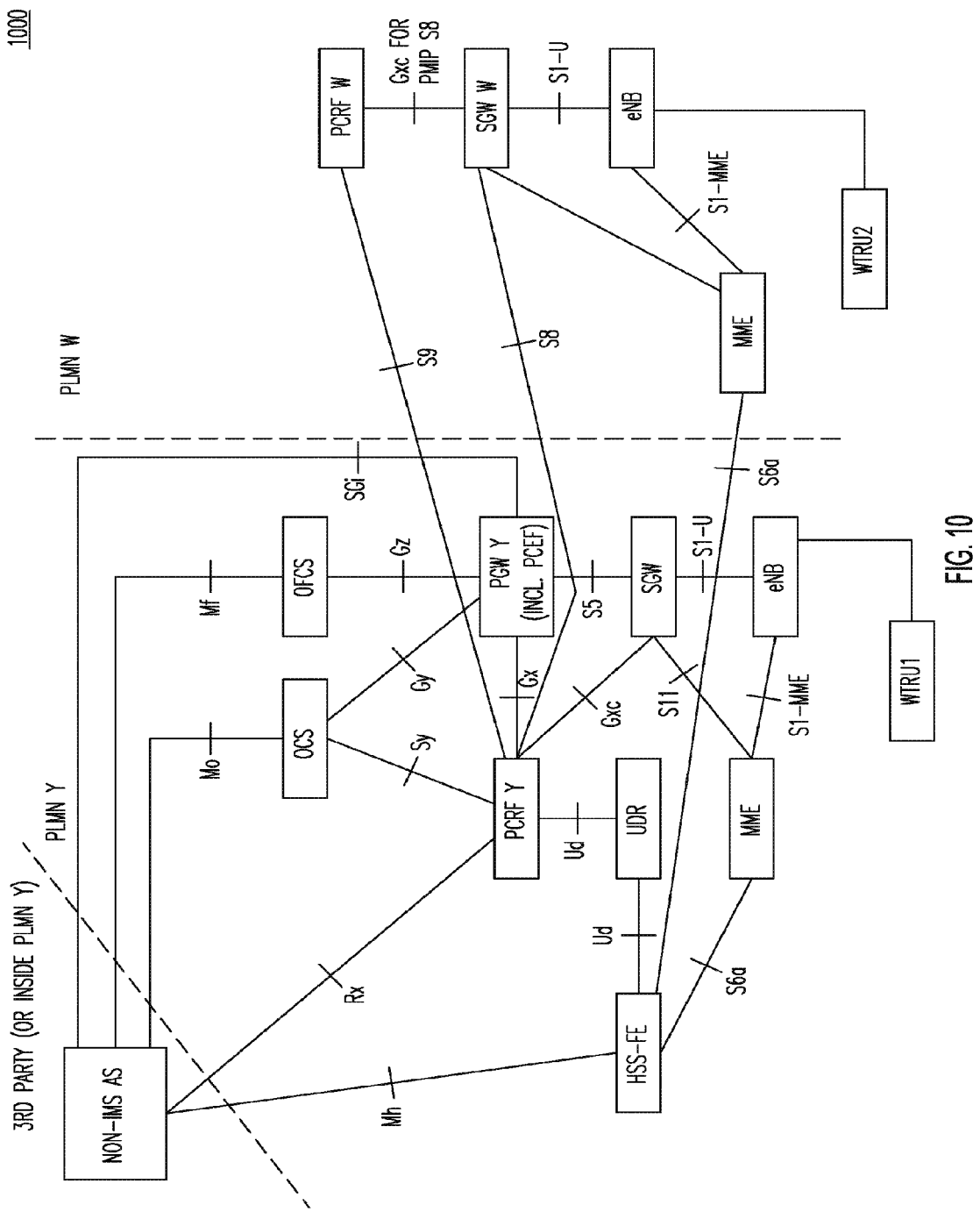
FIG. 10 shows a local breakout roaming network architecture in which the user of one WTRU sponsors application service and/or preferential traffic handling for the user of another WTRU.

FIG. 10 shows a network architecture 1000 for further context. WTRU1 may be represented in the home network or in another PLMN, without impacting the solutions described below, since WTRU2 involvement may be at the application layer. WTRU2's WTRU2 is roaming in PLMN W. FIG. 10 illustrates the local breakout roaming architecture, whereby data traffic to/from WTRU2 may be breaking out at the visited network PGW.

WTRU1 may sponsor at least one of the application service or preferential traffic handling. For the user sponsoring of service, the AS may use Mo/Mf with MNO Y to charge WTRU1. If WTRU1 sponsors preferential traffic handling for WTRU2, AP X may request preferential traffic handling over its Rx interconnection with MNO Y. AP X may insert the identity of WTRU1 as the sponsor identity in the request over Rx. PCRF Y may perform checks to ensure that WTRU1 is authorized to sponsor WTRU2; then PCRF Y uses S9 to request the resources through PCRF W.

A roaming case may exist where a WTRU1's subscriber identity (ID) may be set as sponsor over Rx. In the local breakout case, PCRF Y may insert the sponsor identity in the message over S9. PCRF W may download the PCC rules in PDN GW W (also including the sponsor identity) and the QoS rules to the access nodes. PDN GW W may charge the sponsor, (i.e., either sends charging related messages using WTRU2 as a user identity, but mentioning WTRU1 as the sponsor, or send charging related messages using WTRU1 as user identity and possibly mentioning WTRU2 as sponsoree). Finally, WTRU1 may be charged through roaming charging mechanisms already in place. In the home-routed case, PCRF Y may insert or not the sponsor identity in the message over S9. PCRF W may ignore it if it is present. PCRF may download QoS rules to the access nodes. In the home network, PDN GW Y may charge the sponsor, (i.e., either sends charging related messages using WTRU2 as user identity, but mentioning WTRU1 as the sponsor, or send charging related messages using WTRU1 as user identity and possibly mentioning WTRU2 as sponsoree). Finally, WTRU1 may be charged through roaming charging mechanisms already in place.

Figure 11A:
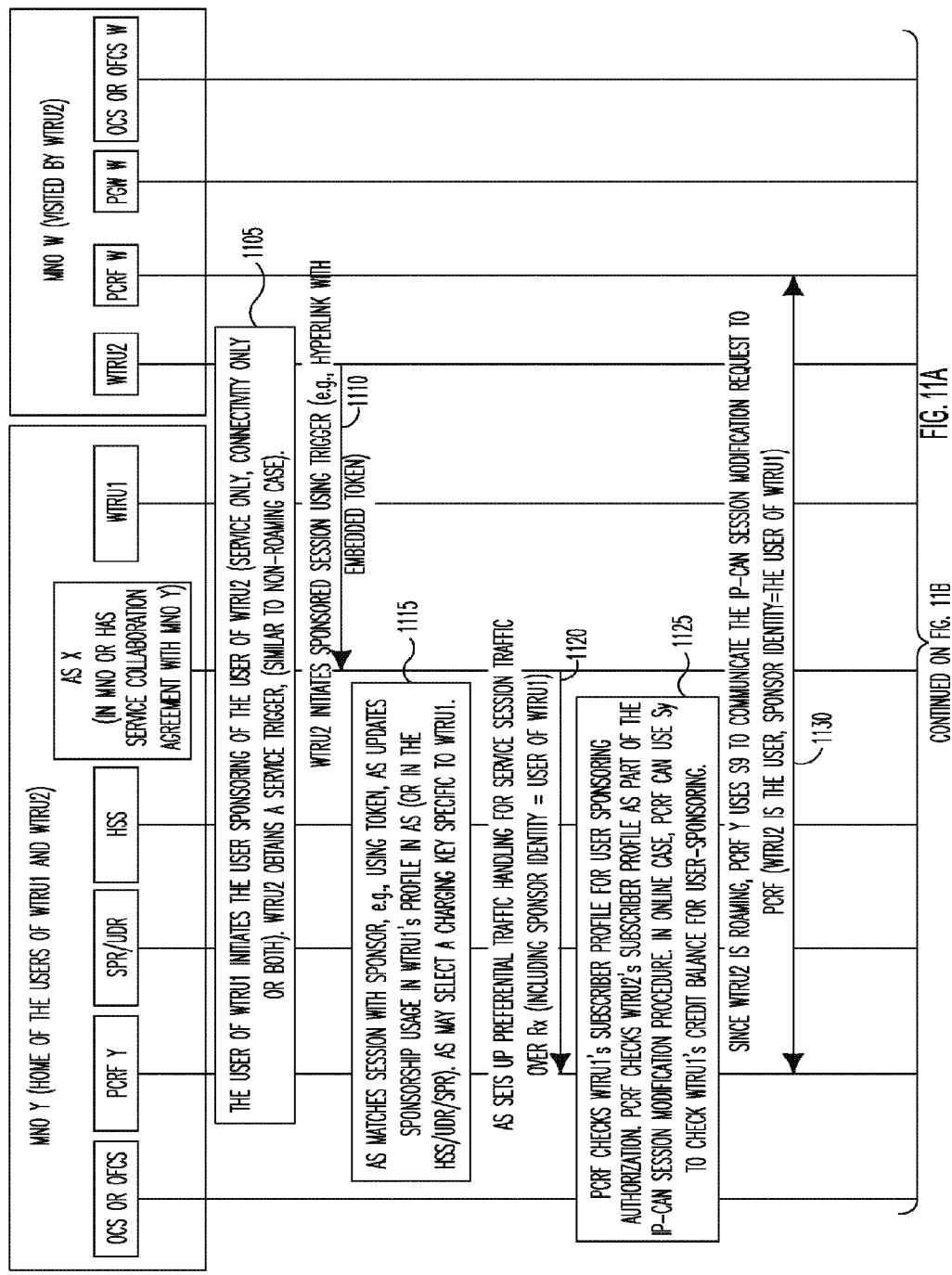
FIGS. 11A and 11B, taken together, are a high level message flow diagram of a procedure for a local breakout collaborative case with the same MNO and roaming.
Figure 11B:
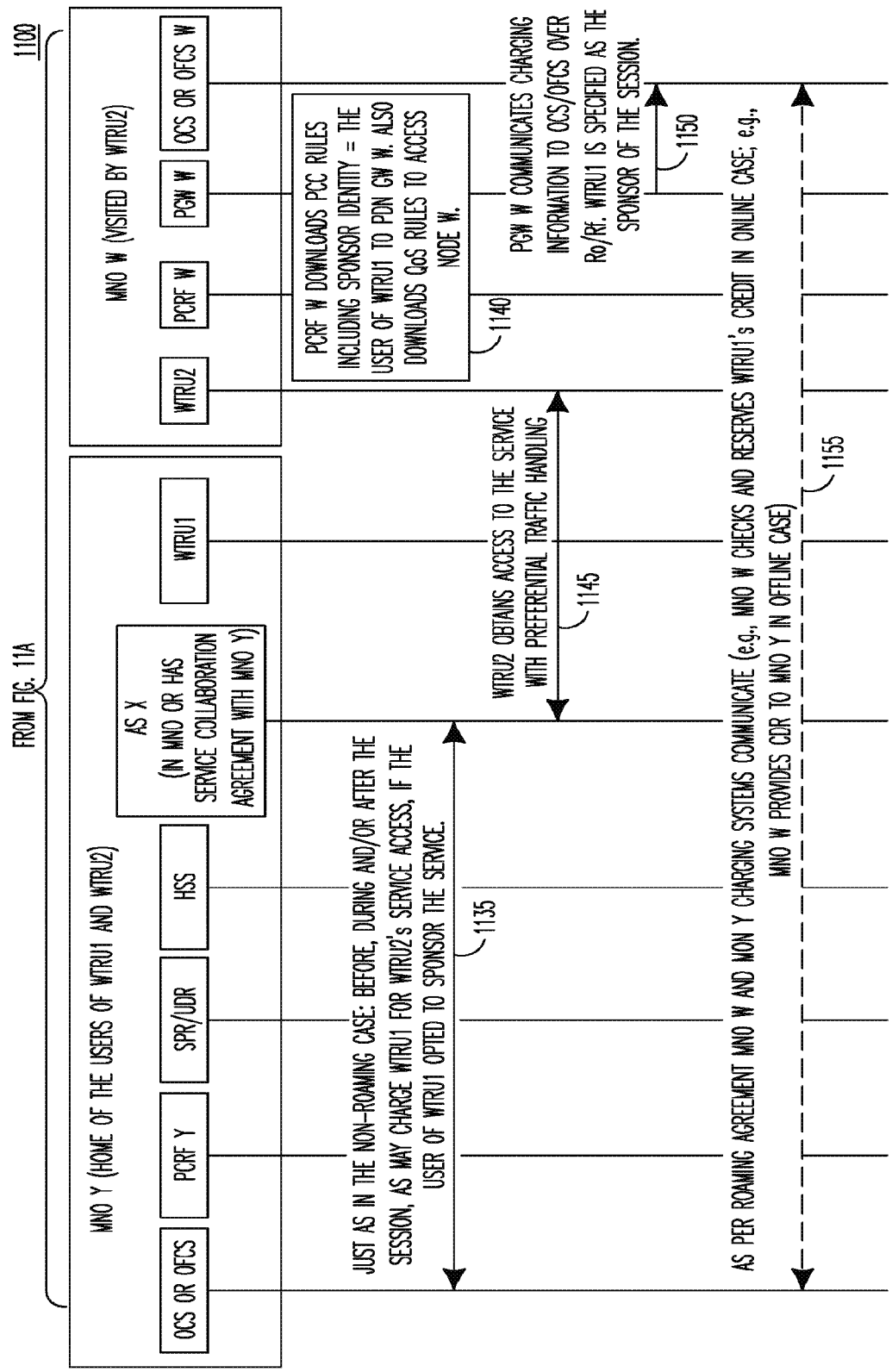

FIGS. 11A and 11B, taken together, is a high level message flow diagram of a procedure 1100 for a local breakout collaborative case with the same MNO and roaming. As a result, WTRU1 may be charged once for the service through OCS/OFCS Y, and once for the connectivity, (i.e., preferential traffic handling), through MNO W just as if WTRU1 was roaming in MNO W.

As shown in FIG. 11A, the user of WTRU1 may initiate the user sponsoring of WTRU2, (at least one of service or connectivity), whereby WTRU2 may obtain a service trigger, (similar to non-roaming case), (1105). WTRU2 may initiate a sponsored session using a trigger, (e.g., a hyperlink with an embedded token), (1110). The AS may match a session with a sponsor, (e.g., using the token, update sponsorship usage in WTRU1's profile in the AS or in the HSS, UDR or SPR), and the AS may select a charging key specific to WTRU1(1115). The AS may set up preferential traffic handling for service session traffic over the Rx interface, (including sponsor identity of the user of WTRU1), (1120). The PCRF may check WTRU1's subscriber profiles for user sponsoring authorization, and may check WTRU2's subscriber profile as part of an Internet protocol connectivity access network (IP-CAN) session modification procedure (1125). In an online case, the PCRF may use a Sy interface to check WTRU1's credit balance for user-sponsoring. Since WTRU2 may be roaming, PCRF Y may uses S9 to communicate the IP-CAN session modification request to the PCRF, (WTRU2 may be the user, and the sponsor identity may be the user of WTRU1), (1130).

As shown in FIG. 11B, just as in the non-roaming case, before, during and/or after the session, the AS may charge WTRU1 for WTRU2's service access, if the user of WTRU1 opted to sponsor the service (1135). The PCRF W may download PCC rules including a sponsor identity of the user of WTRU1 to PDN GW W, and also download QoS rules to access nodes W (1140). WTRU2 may obtain access to the service with preferential traffic handling (1145). The PGW W may communicate charging information to the OCS/OFCS over the Ro/Rf interfaces, and WTRU1 may be specified as the sponsor of the session (1150). In the online charging case, PGW W may instead communicate with OCS Y directly instead of OCS W. As per the roaming agreement, the MNO W and MNO Y charging systems may communicate, (e.g., MNO W may check and reserve WTRU1's credit in online case, MNO W may provide a CDR to MNO Y in an offline case), (1155).

Figure 12A:
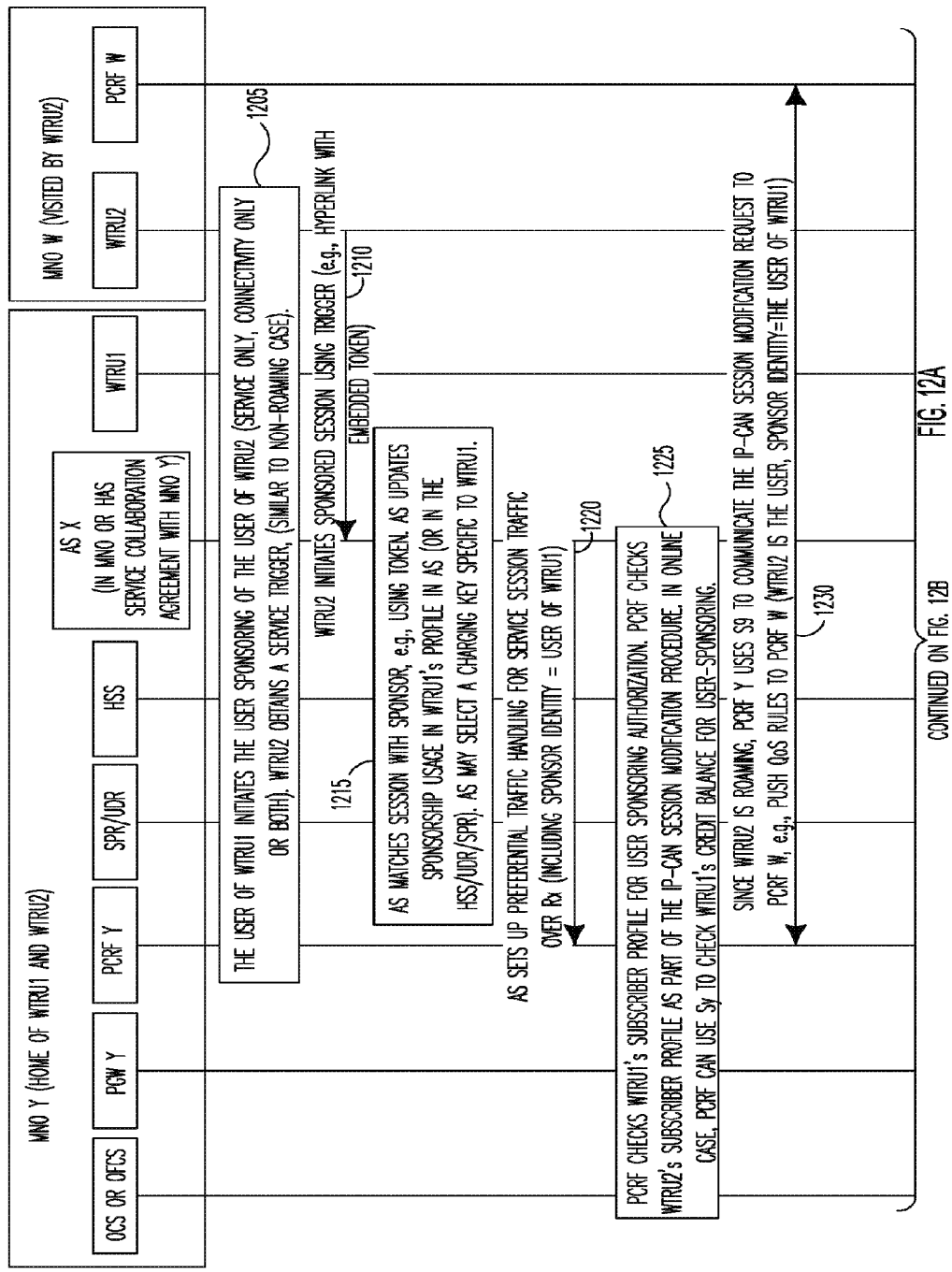
FIGS. 12A and 12B, taken together, are a high level message flow diagram of a procedure for a home-routed collaborative case with the same MNO and roaming.
Figure 12B:
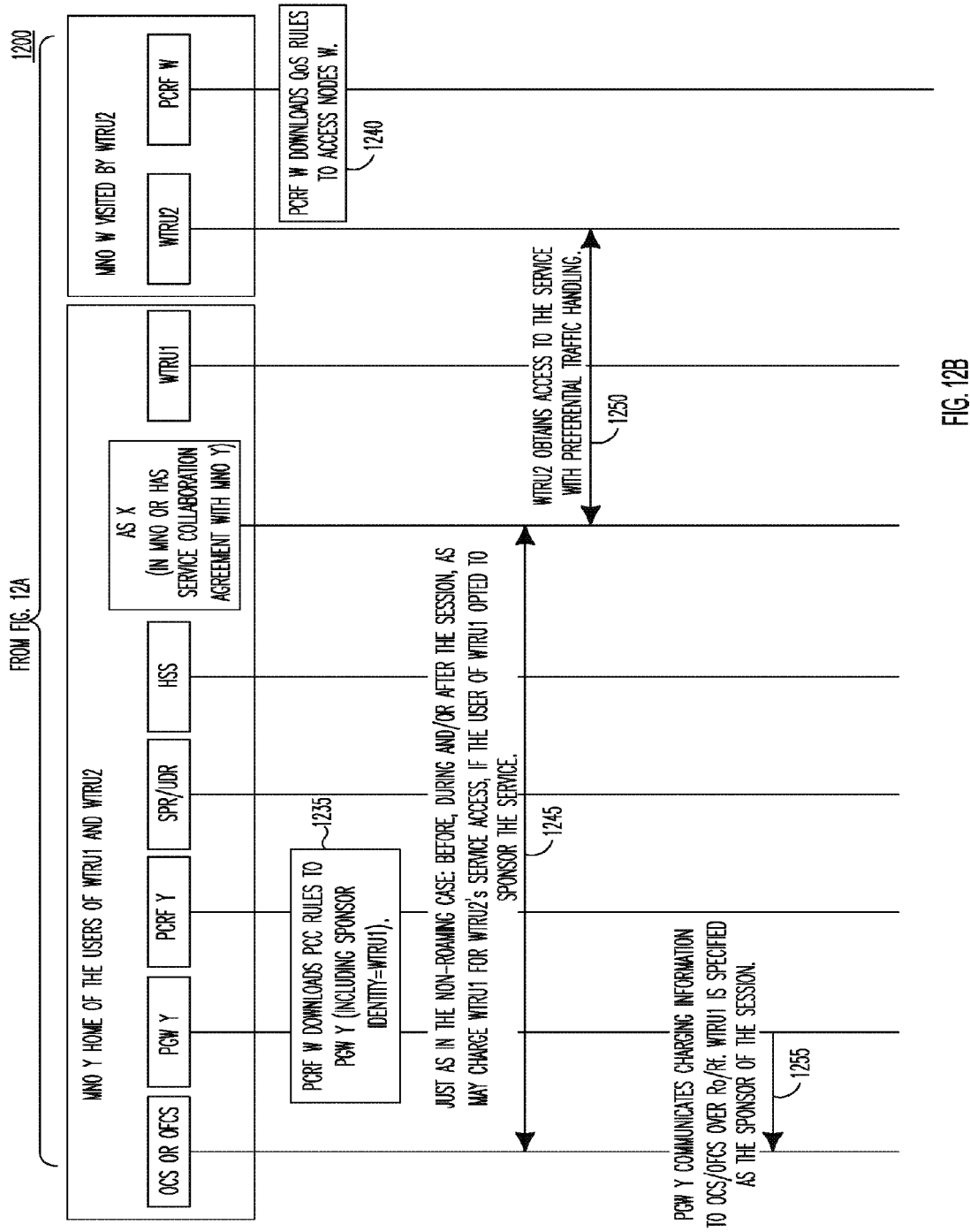

FIGS. 12A and 12B, taken together, is a high level message flow diagram of a procedure 1200 for a home-routed collaborative case with the same MNO and roaming. As a result, WTRU1 may be charged once for the service through OCS/OFCS Y, and once for the connectivity, (i.e., preferential traffic handling), through MNO W, just as if WTRU1 was roaming in MNO W.

As shown in FIG. 12A, the user of WTRU1 may initiate the sponsoring of the user of WTRU2, (at least one of service or connectivity), and WTRU2 may obtain a service trigger, (similar to the non-roaming case), (1205). WTRU2 may initiate a sponsored session using a trigger, (e.g., a hyperlink with an embedded token), (1210). The AS may match a session with a sponsor, (e.g., using the token, update sponsorship usage in WTRU1's profile in the AS or in the HSS, UDR or SPR), (1215). The AS may select a charging key specific to WTRU1. The AS may set up preferential traffic handling for service session traffic over an Rx interface, (including a sponsor identity of the user of WTRU1), (1220). The PCRF may check WTRU1's subscriber profiles for user sponsoring authorization and WTRU2's subscriber profile as part of the IP-CAN session modification procedure (1225). In an online case, the PCRF may use a Sy interface to check WTRU1's credit balance for user-sponsoring. Since WTRU2 is roaming, PCRF Y may use S9 to communicate the IP-CAN session modification request to PCRF W, (e.g., push QoS rules to PCRF W where WTRU2 is the user and the sponsor identity is the user of WTRU1), (1230).

As shown in FIG. 12B, the PCRF W may download PCC rules to PGW Y, (including sponsor identity of WTRU1), (1235). The PCRF W may download QoS rules to access nodes W (1240). Just as in the non-roaming case, before, during and/or after the session, the AS may charge WTRU1 for WTRU2's service access, if WTRU1 opted to sponsor the service (1245). WTRU2 may obtain access to the service with preferential traffic handling (1250). PGW Y may communicate charging information to the OCS/OFCS over the Ro/Rf interfaces where WTRU1 is specified as the sponsor of the session (1255).

The AP X may be set as the sponsor over the Rx interface. AP X may be used instead of WTRU1 as the sponsor in all messages mentioning the sponsor. AP X may therefore be charged by MNO Y for the related cost. Additionally, AS X may charge WTRU1 over Mo/Mf, to reflect the cost of preferential traffic handling.

WTRU1 and WTRU2 may be subscribers of a different MNO (MNO Y and MNO Z, respectively). AP X may have an agreement with MNO Y. WTRU2 may be in his home network or may be roaming. WTRU1 may opt to sponsor service only, connectivity only, or both.

In a non-roaming situation, WTRU2 is in his home network Z. When WTRU1 sponsors WTRU2 for service access, AS X may charge WTRU1 over Mo/Mf. WTRU2 is a subscriber of another MNO. When WTRU1 sponsors WTRU2 for connectivity, (i.e., preferential traffic handling), AP X may use Rx to reserve network resources on MNO Z through PCRF Y. PCRF Y may verify that WTRU1 is authorized to sponsor WTRU2. PCRF Y may use S9 to forward the message to PCRF Z, which may effectively reserve the resources, (e.g., download PCC rules in PDN GW Z, QoS rules in access network Z node). PDN GW Z may communicate charging information with the charging subsystem of MNO Z, using WTRU2 as the user and WTRU1 as the sponsor. Finally, WTRU1 may be charged through an agreement between MNO Z and MNO Y, similar to a roaming agreement. This agreement may effectively be seen as a minor extension of a normal roaming agreement, where MNO Z agrees to reserve resources for a user on behalf of a user sponsor who is a subscriber of MNO Y.

Figure 13:
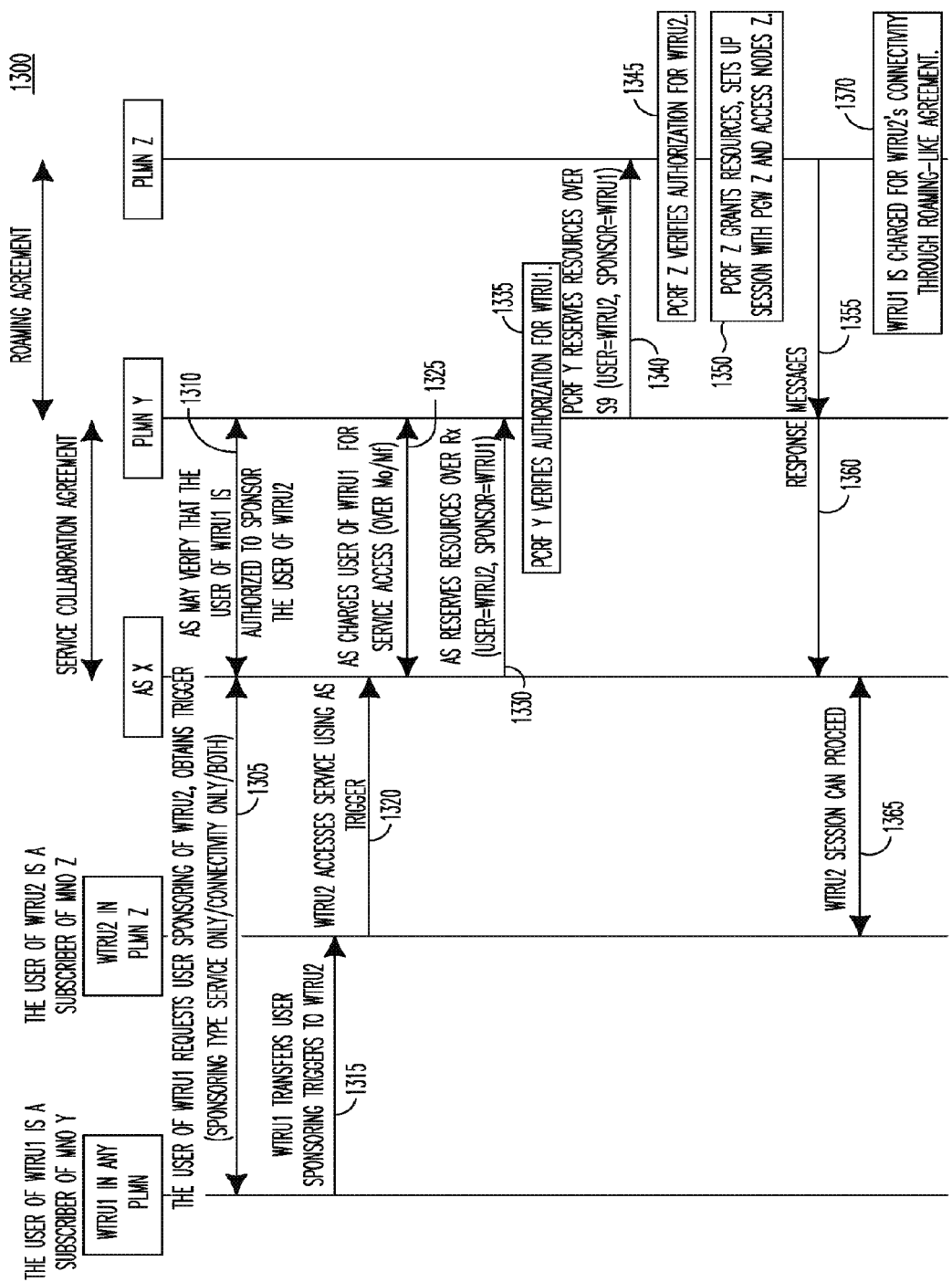
FIG. 13 is a high level message flow diagram of a procedure for a non-roaming collaborative case with different MNOs.

FIG. 13 shows a high level message flow diagram of a procedure 1300 for a non-roaming collaborative case with different MNOs. Although not shown in FIG. 13, each PLMN (Y and Z) may include a corresponding PCRF (Y and Z) and access nodes (Y and Z). AS X may use its service collaboration with PLMN Y to charge WTRU1 for service and to reserve network resources on PLMN Z. Alternatively, AP X may have a business relationship agreement with MNO Z. When WTRU1 sponsors WTRU2 for connectivity, AS X may use Rx to reserve directly network resources on MNO Z through PCRF Z. In this case, prior to this step, AP X may verify WTRU1 authorization to sponsor WTRU2 by accessing WTRU1's subscriber profile over Mh.

As shown in FIG. 13, WTRU1 may request user sponsoring of WTRU2, and obtain a trigger, (at least one of a service sponsoring type service or a connectivity sponsoring type), (1305). The AS may verify that the user of WTRU1 is authorized to sponsor the user of WTRU2(1310). WTRU1 may transfer user sponsoring triggers to WTRU2(1315). WTRU2 may access a service using an AS trigger (1320). The AS may charge the user of WTRU1 for service access (over Mo/Mf), (1325). The AS may reserve resources over Rx, (where the user is WTRU2, and the sponsor is WTRU1), (1330). The PCRF Y may verify authorization for WTRU1(1335). The PCRF Y may reserve a resource over S9 (the user is WTRU2, the sponsor is WTRU1), (1340). The PCRF Z may verify authorization for WTRU2(1345). The PCRF Z may grant resources, set up a session with PGW Z and access nodes Z (1350). PLMN Z may then send a response to PLMN Y (1355), which may then send a response to AS X (1360). WTRU2's session may proceed (1365). WTRU1 may be charged for WTRU2's connectivity through a roaming-like agreement (1370).

Figure 14:
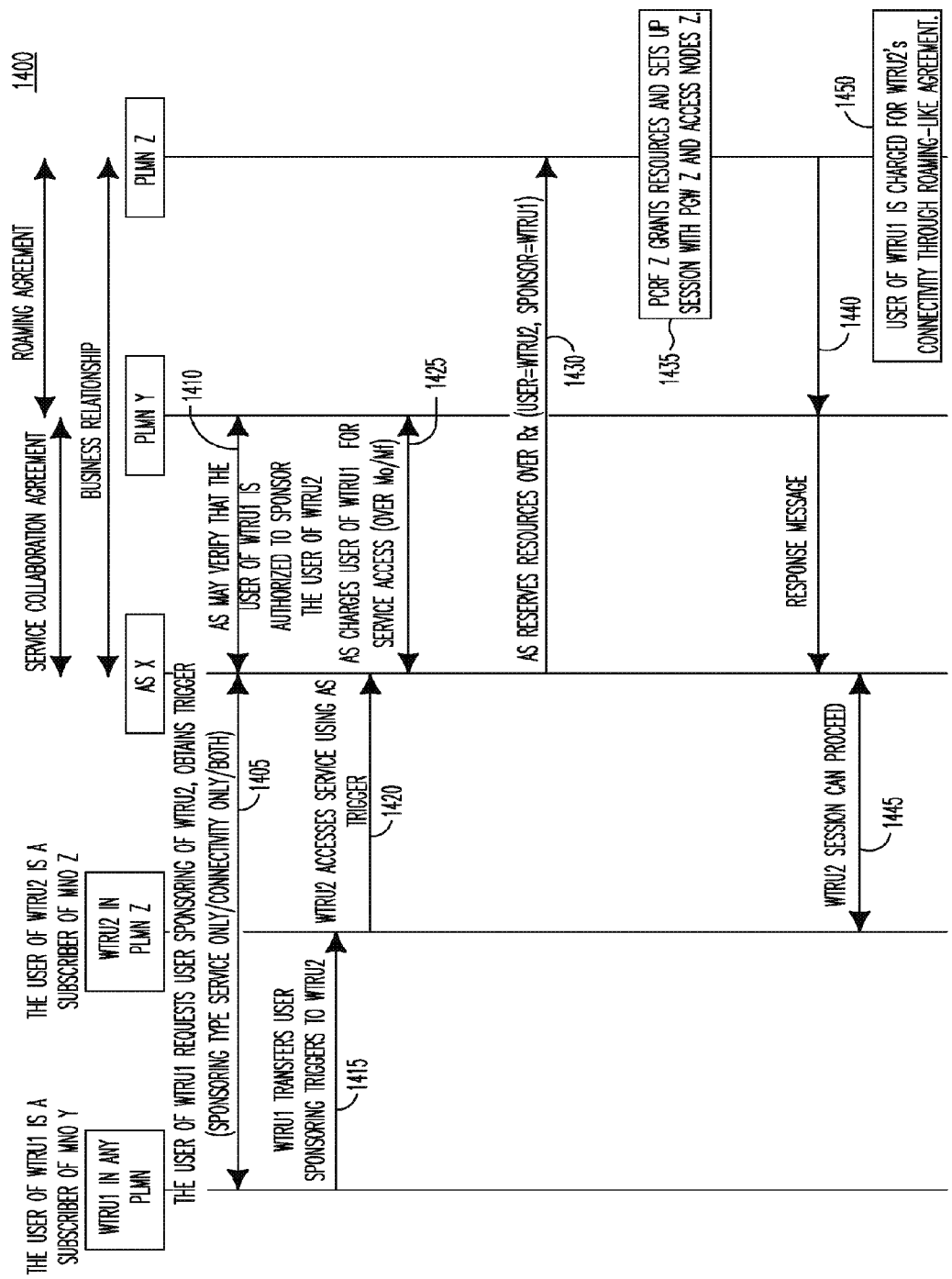
FIG. 14 is a high level message flow diagram of a procedure for a non-roaming collaborative case with different MNOs.

FIG. 14 shows a high level message flow diagram of a procedure 1400 for a non-roaming collaborative case with different MNOs. Although not shown in FIG. 14, each PLMN (Y and Z) may include a corresponding PCRF (Y and Z) and access nodes (Y and Z). AS X may use its service collaboration with PLMN Y to charge WTRU1 for service and its business relationship with PLMN Z to reserve network resources on PLMN Z.

As shown in FIG. 14, WTRU1 may request user sponsoring of WTRU2, and obtain a trigger, (at least one of a service sponsoring type service or a connectivity sponsoring type), (1405). The AS may verify that the user of WTRU1 is authorized to sponsor the user of WTRU2(1410). WTRU1 may transfer user sponsoring triggers to WTRU2(1415). WTRU2 may access a service using an AS trigger (1420). The AS may charge the user of WTRU1 for service access (over Mo/Mf), (1425). The AS may reserve resources over Rx, (where the user is WTRU2, and the sponsor is WTRU1), (1430). The PCRF Z may grant resources and set up a session with PGW Z and access nodes Z (1435). The PLMN Z may send a response message to AS X (1440). WTRU2's session may proceed (1445). WTRU1 may be charged for WTRU2's connectivity through a roaming-like agreement (1450).

WTRU2 may roam in a network W. The mechanisms are similar to the non-roaming case, primarily differing in that PCRF Z may use S9 to reserve network resources in PLMN W. WTRU1 may be charged for WTRU2's connectivity through a roaming-like agreement as well as in the non-roaming case, but in this case it is an agreement between MNO W and MNO Y. When receiving a user sponsored request with WTRU1 as a sponsor, PCRF W may verify that such an agreement exists or else reject the sponsored request.

Figure 15:
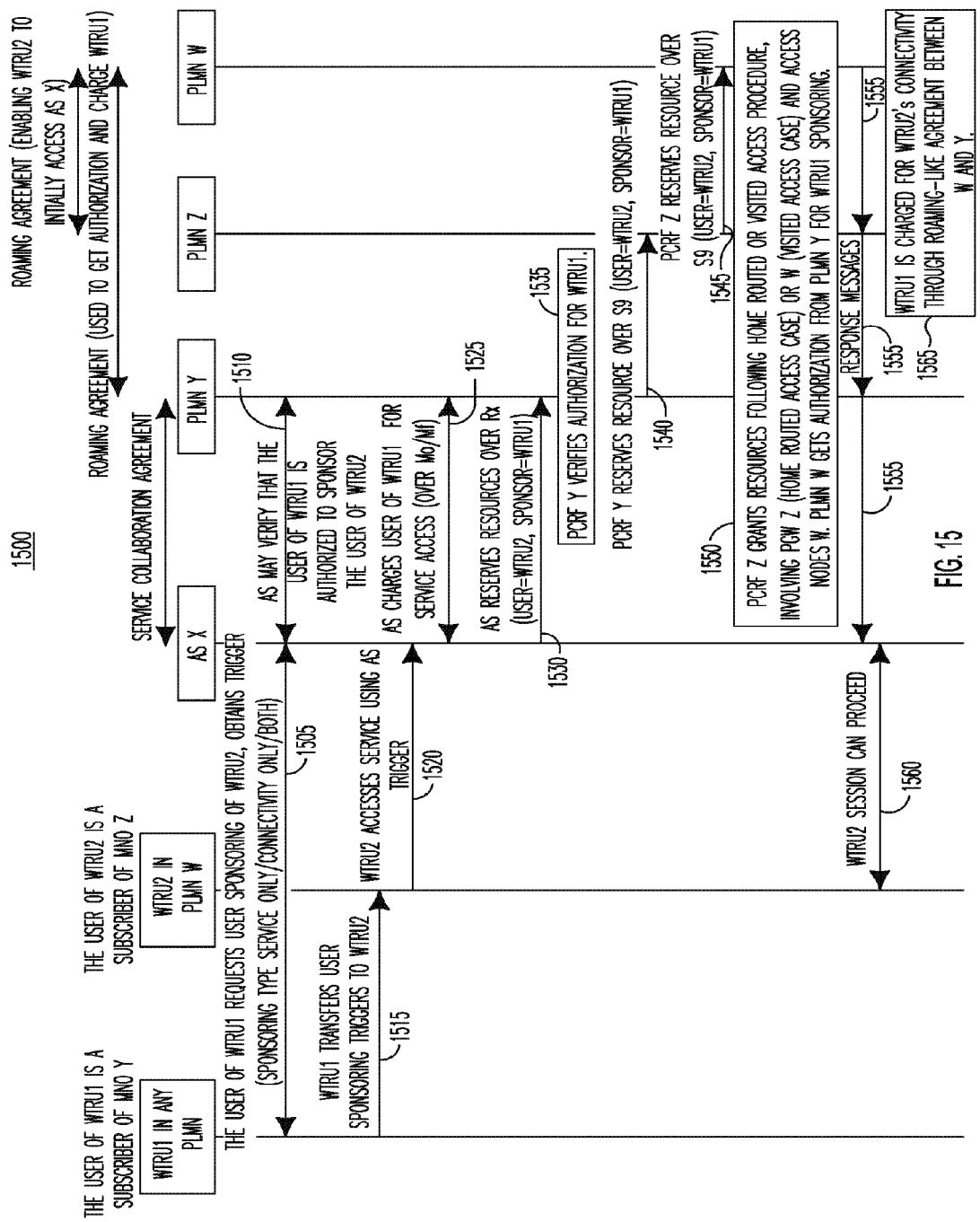
FIG. 15 is a high level message flow diagram of a procedure for a roaming collaborative case with different MNOs.

FIG. 15 shows a high level message flow diagram of a procedure 1500 for a roaming collaborative case with different MNOs. Although not shown in FIG. 15, each PLMN (W, Y and Z) may include a corresponding PCRF (W, Y and Z) and access nodes (W, Y and Z). As shown in FIG. 15, WTRU1 may request user sponsoring of WTRU2, and obtain a trigger, (at least one of a service sponsoring type service or a connectivity sponsoring type), (1505). The AS may verify that the user of WTRU1 is authorized to sponsor the user of WTRU2 (1510). WTRU1 may transfer user sponsoring triggers to WTRU2(1515). WTRU2 may access a service using an AS trigger (1520). The AS may charge the user of WTRU1 for service access (over Mo/Mf), (1525). The AS may reserve resources over Rx, (where the user is WTRU2, and the sponsor is WTRU1), (1530). The PCRF Y may verify authorization for WTRU1(1535). The PCRF Y may reserve a resource over S9 (the user is WTRU2, the sponsor is WTRU1), (1540). The PCRF Z may reserve a resource over S9 (the user is WTRU2, the sponsor is WTRU1), (1545). PCRF Z and W may grant resources following home routed or visited access procedure, involving PGW Z (home routed access case) or PGW W (visited access case) and access nodes W (1550). PLMN W may receive authorization from PLMN Y for WTRU1's user sponsoring. Response messages 1555 may be cascaded back, from PLMN W to PLMN Z to PLMN Y to AS X. WTRU2's session may proceed (1560). WTRU1 may be charged for WTRU2's connectivity through a roaming-like agreement between W and Y (1565).

Figure 16:
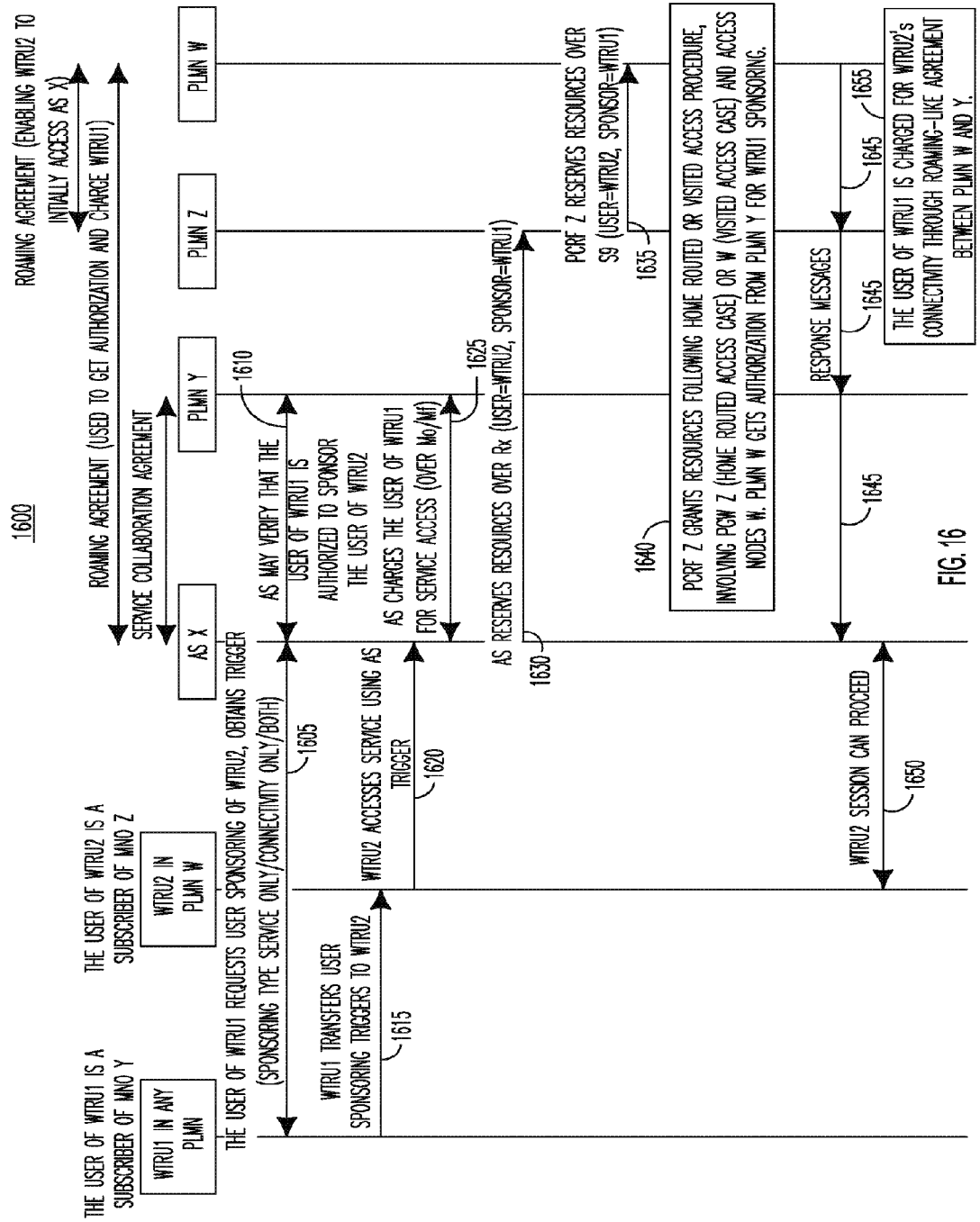
FIG. 16 is a high level message flow diagram of a procedure for a roaming collaborative case with different MNOs.

FIG. 16 shows a high level message flow diagram of a procedure 1600 for a roaming collaborative case with different MNOs. Although not shown in FIG. 16, each PLMN (W, Y and Z) may include a corresponding PCRF (W, Y and Z) and access nodes (W, Y and Z). Unlike the scenario shown by FIG. 15, in this scenario a business relationship may exist between AS X and PLMN Z, enabling AX X to directly interact with PLMN Z to request network resources. As shown in FIG. 16, WTRU1 may request user sponsoring of WTRU2, and obtain a trigger, (at least one of a service sponsoring type service or a connectivity sponsoring type), (1605). The AS may verify that the user of WTRU1 is authorized to sponsor the user of WTRU2(1610). WTRU1 may transfer user sponsoring triggers to WTRU2(1615). WTRU2 may access a service using an AS trigger (1620). The AS may charge the user of WTRU1 for service access (over Mo/Mf), (1625). The AS may reserve resources over Rx, (where the user is WTRU2, and the sponsor is WTRU1), (1630). The PCRF Z may reserve a resource over S9, (the user is WTRU2, the sponsor is WTRU1), (1635). PCRF Z and PCRF W may grant resources following home routed or visited access procedure, involving PGW Z (home routed access case) or PGW W (visited access case) and access nodes W (1640). PLMN W may receive authorization from PLMN Y for WTRU1's user sponsoring. Response messages may be cascaded back, from W to Z to AS X (1645). WTRU2's session may proceed (1650). The user of WTRU1 may be charged for WTRU2's connectivity through a roaming-like agreement between W and Y (1655).

AP X may not have a service collaboration with WTRU1's MNO Y. WTRU1 may initiate an application session with the AP X using its current access plan with MNO Y. When needed, WTRU1 may request preferential traffic handling by MNO Y for the session. WTRU1 may confirm (or not) the preferential traffic handling after a preview period. When confirmed, WTRU1 may later be billed for the preferential traffic handling.

Depending on the situation, there may or may not be a business agreement between the AP and the MNO.

When there is a business agreement, there may not be a service collaboration. Therefore, MNO Y may not be able to bill WTRU1 on behalf of AP X. Nevertheless, AP X may still reserve network resources, (e.g., through Rx), because it may have a business agreement with MNO Y. Instead of using Mo/Mf to charge WTRU1, AP X may charge WTRU1 through other mechanisms, (e.g., through a credit card or monthly statement from the AP X). Even if there is no service cooperation agreement, MNO Y may still support user sponsoring of connectivity over the Rx, (e.g., WTRU1 may be charged by MNO Y for network resource usage by WTRU2).

When there is no business agreement, a user may obtain preferential traffic handling. A preview feature may be developed to make it possible for any user to request preferential traffic handling. The user-sponsoring method may completely bypass this feature through the utilization of a special purpose AS, (a user sponsoring AS), which may make it possible to reuse the procedures already developed in the collaborative case, since the user sponsoring AS may have such a collaboration with MNO Y.

In the non-collaborative case, with the same MNO, and no business agreement, in a non-roaming situation, WTRU1 and WTRU2 may both be subscribers of the same MNO Y. MNO Y may not have an agreement with AP X. When WTRU1 initiates the sponsoring of WTRU2's session, WTRU1 may 1) sponsor only the service, 2) sponsor the priority handling by MNO Y, or 3) sponsor both the service and the priority handling by MNO Y.

In cases 1) and 3), service/content sponsoring may be purchased like any digital good from AP X. This process is application specific; in one example (among other possible scenarios) WTRU1 performs the purchase on AP X's portal, and is provided with a hyperlink that may be sent by email to WTRU2. AP X may charge WTRU1(e.g. using WTRU1's credit card or other means).

In cases 2) and 3) there may be a user sponsoring AS. This AS is responsible to handle user sponsoring requests for data connectivity. The user sponsoring AS may, for example, be deployed as a dedicated AS, deployed by MNO Y or a third party with a service collaboration agreement with MNO Y. WTRU1 may send a user sponsoring request to the user sponsoring AS. This request may mention a time of expiration, maximum time or cost, and the like, as well as WTRU2's identity. WTRU1 may obtain a trigger such as a URL from the AS. Alternatively, the AP may provide WTRU1 ahead of time with sponsoring triggers which may be used to sponsor a (to-be-determined) user. WTRU1 may provide the trigger to WTRU2. WTRU2 may then request preferential traffic handling to the user sponsoring AS, including the trigger as well as session information such as traffic filters. The user sponsoring AS may then set up the session preferential traffic handling on behalf of WTRU2, using Rx to PCRF. The user sponsoring AS is an AS operated by the MNO or by an AP collaborating with the MNO.

Figure 17:
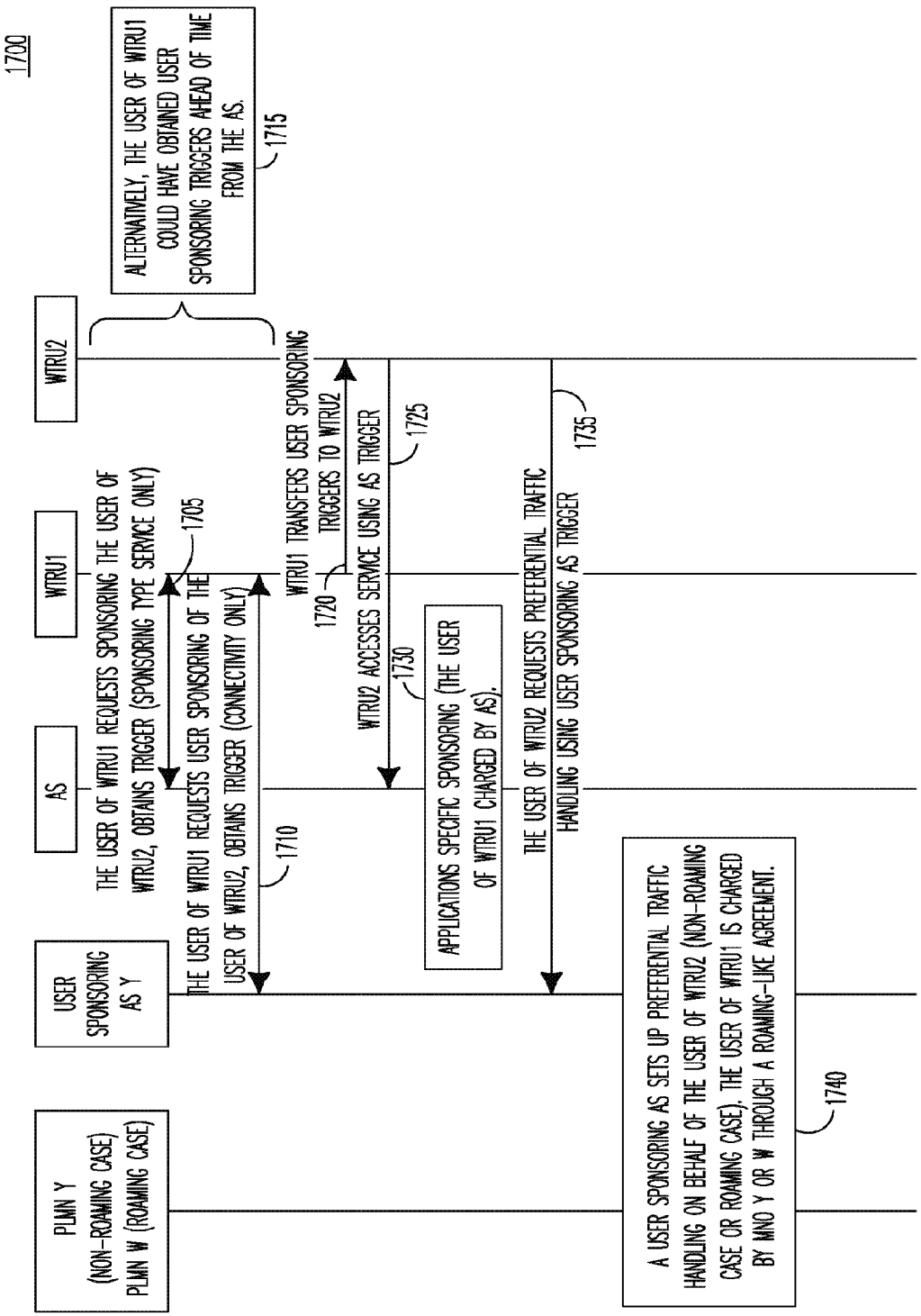
FIG. 17 is a high level message flow diagram of a procedure for a non-collaborative situation involving the same MNO and no business agreement.

FIG. 17 shows a shows a high level message flow diagram of a procedure 1700 for a non-collaborative case, with the same MNO and no business agreement for both the non-roaming case (WTRU2 in MNO Z) and the roaming case (WTRU2 in MNO W).

In the non-collaborative case, with the same MNO and no business agreement and a roaming situation, WTRU2, who is like WTRU1 a subscriber of MNO Y, is roaming in MNO W. Assuming that MNO W has a roaming agreement with MNO Y to provide preferential traffic handling for users at an extra cost to the user, in cases 1) and 3) mentioned above, service/content sponsoring may be performed by the AP without involving the MNO. For user sponsoring of data connectivity, i.e., cases 2) and 3) above, WTRU1 may sponsors WTRU2's preferential traffic handling through the user sponsoring AS Y. This variant is similar to the non-roaming variant above; with the user sponsoring AS Y now setting preferential traffic handling since WTRU2 is roaming as illustrated in FIG. 17.

As shown in FIG. 17, the user of WTRU1 may request user sponsoring of the user of WTRU2, and may obtain a trigger (sponsoring type service), (1705). The user of WTRU1 may request user sponsoring of WTRU2, and obtain a trigger (connectivity only), (1710). Alternatively, WTRU1 may have obtained user sponsoring triggers ahead of time from the AS (1715). WTRU1 may transfer user sponsoring triggers to WTRU2(1720). WTRU2 may access service using an AS trigger (1725). Application specific sponsoring may be implemented, (user of WTRU1 charged by the AS), (1730). The user of WTRU2 may request preferential traffic handling using a user sponsoring AS trigger (1735). The user sponsoring AS may set up preferential traffic handling on behalf of the user of WTRU for either the non-roaming case or roaming case (1740). The user of WTRU1 may be charged by MNO Y or W through a roaming-like agreement.

Figure 18:
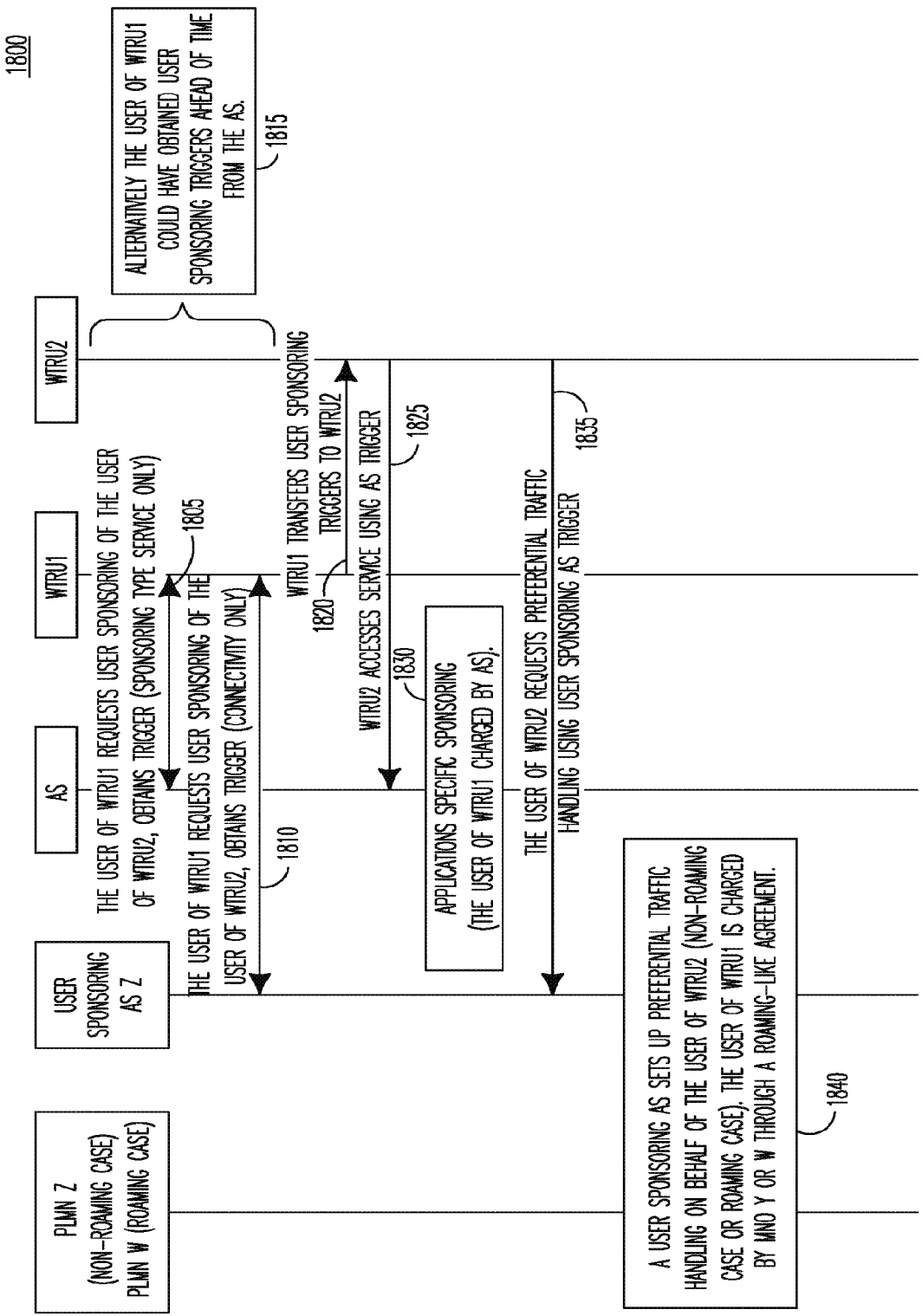
FIG. 18 is a high level message flow diagram of a procedure for a non-collaborative situation involving a different MNO and no business agreement.

FIG. 18 shows a high level message flow diagram of a procedure 1800 for a non-collaborative situation involving a different MNO. WTRU2 may be a subscriber of MNO Z, (while WTRU1 may be a subscriber of MNO Y). In a first sub-case, there may be a business agreement between AP and MNO Y. In a second sub-case, there may not be such a business agreement.

In the case where there is a business agreement, there may not be any service collaboration. Therefore, MNO Y may not be able to bill WTRU1 on behalf of AP X. Nevertheless, AP X may still reserve network resources (e.g., through the Rx interface). AP X may be able to sponsor WTRU2 on behalf of WTRU1. Instead of using Mo/Mf to charge WTRU1, AP X may charge WTRU1 through other mechanisms, (e.g., through a credit card or monthly statement from the AP X).

In a non-roaming situation, the user sponsoring AS used may be deployed by (or cooperating with) MNO Z instead of MNO Y. MNO Z may have a roaming agreement with MNO Y to provide preferential traffic handling for users typically at an extra cost to the use.

As shown in FIG. 18, the user of WTRU1 may request user sponsoring of the user of WTRU2, and may obtain a trigger (sponsoring type service), (1805). The user of WTRU1 may request user sponsoring of WTRU2, and obtain a trigger (connectivity only), (1810). Alternatively, WTRU1 may have obtained user sponsoring triggers ahead of time from the AS (1815). WTRU1 may transfer user sponsoring triggers to WTRU2(1820). WTRU2 may access service using an AS trigger (1825). Application specific sponsoring may be implemented, (user of WTRU1 charged by the AS), (1830). The user of WTRU2 may request preferential traffic handling using a user sponsoring AS trigger (1835). The user sponsoring AS may set up preferential traffic handling on behalf of the user of WTRU for either the non-roaming case or roaming case (1840). The user of WTRU1 may be charged by MNO Z through a roaming-like agreement, or W through a roaming-like agreement.

WTRU2, who is subscriber of MNO Z, may be roaming in MNO W. If MNO W has a roaming agreement with MNO Y to provide preferential traffic handling for users at an extra cost to the user, (i.e., the roaming agreement may exist between the MNO where WTRU2 is roaming and WTRU1's MNO), service/content sponsoring may be performed by the AP without involving the MNO. For user sponsoring of data connectivity, WTRU1 may sponsor WTRU2's preferential traffic handling through the user sponsoring AS Z. This variant is similar to the non-roaming variant above. The user sponsoring AS Z may now be used to set preferential traffic handling, since WTRU2 is roaming.

WTRU1 may be a subscriber of MNO Y and WTRU2 may not be a subscriber of an MNO, (e.g., ISDN access network subscriber). Either AP X may have a service collaboration agreement with MNO Y, or AP X does not have such agreement.

In the situation where there is a collaborative case, a charging event message over Rx, supporting start/stop and one-time events may be used. A direct Mo/Mf interface between AP and MNO may be used as well. WTRU1's bill may mention that this particular charge was actually WTRU2's sponsored session. Alternatively, WTRU1's bill may regroup all charges for sponsored events in a single merged item, rather than one item per sponsored identity (WTRU2, Carol, etc.). By enhancing Mo/Mf signaling with an additional Attribute-Value Pair (AVP) and using this new AVP may in ACR messages (Mf), CCR messages (Mo) or in other Mo/Mf messages. Since WTRU2 is not a subscriber of an MNO, the charging message should not use WTRU2's User-Name; instead, the User-Name AVP of these messages should be WTRU1's Network Address Identifier (NAI). To distinguish between regular charging and user sponsored related charging, a new AVP named "user-sponsoring" is either: an enumerated AVP holding either NOT_USER_SPONSORED (0), which the default value when this AVP is not present, and USER_SPONSORED (1), which indicates that the current message relates to a user sponsored session or an UTF8String AVP holding the identity of the sponsored user, such as: an application specific ID (e.g. a username temporarily allocated for this particular sponsored session), an email address, a user name provided by WTRU1 as part of the process, and meaningful for WTRU1 only (e.g. WTRU1 mentions "WTRU2" as the recipient; this string is used only to remind WTRU1 of the actual recipient), or an IP address.

Figure 19:
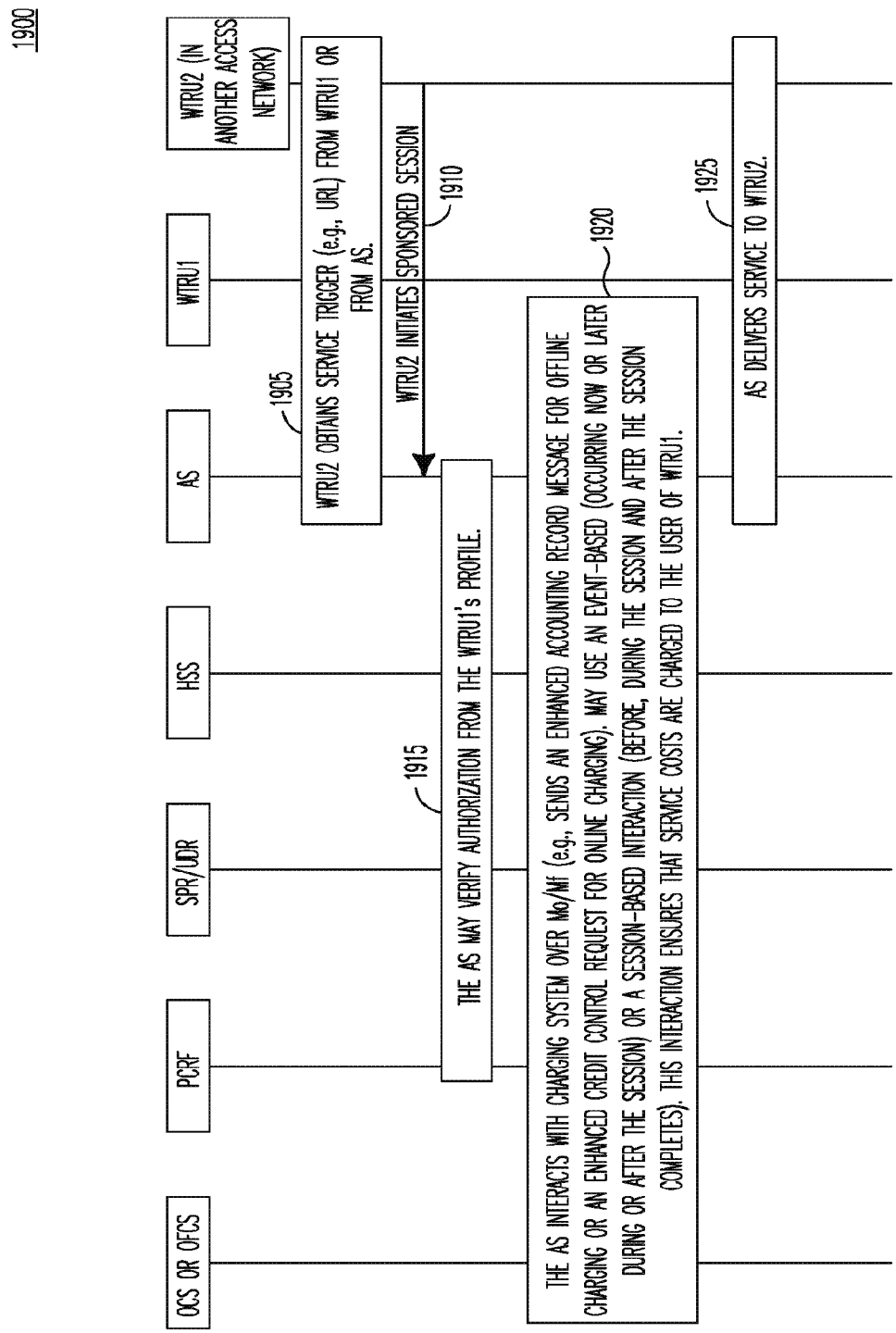
FIG. 19 is a high level message flow diagram of a procedure wherein charging messages are enhanced to include an information element (IE) used to identify the recipient of a sponsored event.

FIG. 19 shows a high level message flow diagram of a procedure 1900, (following architecture choice where AS has access to Mo/Mf reference points), where the charging messages sent by the AS to the CN, (typically ACR over Mf or CCR over Mo), are enhanced to include a new IE identifying the recipient of the sponsored event.

As shown in FIG. 19, WTRU2(in another access network) may obtain a service trigger (e.g., a URL) from WTRU1 or from the AS (1905). WTRU2 may initiate a sponsored session (1910). The AS may verify authorization from WTRU1's profile (1915). The AS may interact with a charging system over Mo/Mf, (e.g., send an enhanced accounting record message for offline charging or enhanced credit control request for online charging), (1920). The AS may use an event-based interaction, (occurring now or later during or after the session), or a session-based interaction, (before, during the session and after the session completes). This interaction may ensure that service costs are charged to the user of WTRU1. The AS may deliver service to WTRU2, (1925).

In a non-collaborative case, AP X cannot enable WTRU2's data connectivity sponsoring on behalf of WTRU1 because WTRU2's data connectivity is not under the control of MNO Y. AP X has no service agreement with MNO Y; therefore AP X cannot charge WTRU1 for service/content access through MNO Y, using Mo, Mf or any other interface. Any service/content sponsoring may be performed by the AS (e.g. internally to AS if the application is managing charging using a credit card service).

WTRU1 may transfer credit from its account to WTRU2's account. WTRU2 may be a subscriber of the same MNO or a different MNO than WTRU1. WTRU2 may then spend the credit with any service or data connectivity, (with or without limitations set by WTRU1 during the transfer). WTRU1 issues a command requesting credit transfer from her account to WTRU2's account, possibly adding restriction on usage. Later, when WTRU2 is charged through the MNO charging system, the charging system may check if the usage conditions are fulfilled, and in this case, the credit provided by WTRU1 is used. Otherwise, WTRU2 may be charged normally.

FIGS. 20A and 20B, taken together, is a high level message flow diagram of a procedure 2000 for the user of WTRU1 transferring credit to the user of WTRU2. A new credit transfer supporting AS (CTS-AS) may be used. CTS-AS may accept requests for credit transfer, and then interact with the charging systems to perform the operation. The CTS-AS may be implemented as a non-IMS AS with a service collaboration with MNO Y (and MNO Z to support cross-MNO credit transfer). The initial credit transfer message (from WTRU1 to CTS-AS) may therefore be implemented as an application layer message such as XML over HTTP. In the case where the CTS-AS uses Mo/Mf to interconnect with the charging system of the PLMNs, CTS-AS may use these interfaces to charge WTRU1(or reserve charging units), as well as to grant/cancel user-sponsor credit to WTRU2. Grant/cancel user-sponsor credit messages may be new messages over Mo/Mf or they may be enabled by adding new information elements in existing messages over Mo/Mf. Example of enhancements to existing Mo/Mf (as well as Ro/Rf) messages AVP to enable Grant/cancel user-sponsor credit messages include sponsor identity may be conveyed as described above, the existing Request-Action AVP may be extended with new types, such as USER_SPONSORING_GRANT, USER_SPONSORING_GRANT_CANCELLATION, and additional grant information (including credit amount and conditions) may be conveyed using a new AVP, such as the following:

```
  Grant-Information :: = < AVP Header: (AVP-number-to-be-
    determined)>
*  [ Application-Service-Provider-Identity ] (existing AVP, to
    set allowed service(s))
  [ Multiple-Services-Credit-Control ] (existing AVP, to set
    granted or used amount)
  [ Stop-time ] (existing AVP, to send the time limit of the
    grant, if any)
  [ Grant-ID ] (new AVP, e.g. an integer or a string, set by the
    charging system and unique within this charging system,
    used to correlate messages)
```

Multiple-Services-Credit-Control AVP is of type grouped. For example, the included AVP "Requested-Service-Unit" may be used to hold user sponsored granted amount (in grant request), "Used-Service-Units" may be used to hold actually used amount (in cancellation response).

The CTS-AS may charge WTRU1 using the offline or online charging system (depending on WTRU1's subscriber profile, which CTS-AS may access through its service collaboration with MNO Y. CTS-AS may for example use event based charging in both cases. In this case the "reserve amount" message is actually a charge for the full amount. If there is a time limit to the grant, CTS-AS may refund WTRU1 for the unused part.

The charging nodes (e.g. OCS; e.g. CDF function) are enhanced to support user-sponsoring and maintain a set of related information elements: sponsored user ID, sponsor ID, conditions, and credit amount. This information may be used upon reception of charging messages (e.g. ACR or CCR messages) and if there is a match, consume the sponsored credit instead of charging the account.

As shown in FIG. 20A, WTRU1 may request a credit transfer to WTRU2 (which may be associated with a condition), (2005). An amount of credit may be reserved in WTRU1's account (2010). A grant user-sponsored credit may be sent to WTRU2, (which may be associated with conditions), (2015). The charging node may associate sponsored credit with WTRU1's condition, (and WTRU1's ID for billing formation), (2020). WTRU2 may use network resources and/or consume services provided by the AP with a service collaboration with PDN Z (2025). PDN Z node (e.g., PCRF) or AS X may charge the user of WTRU2(2030). The charging node may compare charging information, (e.g., application name), with the WTRU1 user's conditions (2035). If there is a match, the WTRU1 user's credit may be used. If this is not enough, the WTRU2 user's regular credit may be used and, for the rest, if there is no match, the WTRU2's regular credit may be used.

As shown in FIG. 20B, the WTRU2 user may be billed later based on charging system information (2040). The WTRU2 user's bill may mention WTRU1's user sponsored credit as a specific item, including the WTRU1's user identity and conditions. On a condition that the WTRU1's user set a time limit to the user sponsored credit transfer (2045), in the case where WTRU1 included a maximum time period, at this point the time period may expire for this particular sponsoring (2050). User-sponsored credit to the WTRU2 user may be canceled (2055). A response may indicates how much of the WTRU1's user credit was actually used (2060). The WTRU1's user may be charged for the given amount, and the rest of the reserved credit may be released (2065).

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A method of user sponsoring by wireless transmit/receive units, WTRUs, the method comprising:
   a first WTRU receiving a service trigger including a hyperlink and a token from an application server, AS, and providing the service trigger to a second WTRU;
   the second WTRU initiating a sponsored session with the AS using the hyperlink; and
   the AS sending a request to a network to provide traffic handling needed to deliver content to the second WTRU based on the token on a condition that the hyperlink is active, wherein a user of the first WTRU is charged for the traffic handling.

2. The method of claim 1 further comprising:
   the AS establishing a direct communication link with a charging system including an online charging function, OCF, and a charging data function, CDF.

3. The method of claim 1 further comprising:
   configuring user sponsoring data in a user profile associated with the first WTRU; and
   the first WTRU obtaining authorization from the second WTRU.

4. The method of claim 1 wherein the token is embedded.

5. The method of claim 1 wherein the service trigger is associated with a uniform resource locator, URL, including a token.

6. The method of claim 1 further comprising the first WTRU obtaining sponsorship tokens.

7. The method of claim 1 wherein a subscriber profile of the first WTRU resides on an application server, AS.

8. The method of claim 1 wherein a subscriber profile of the first WTRU resides on a home subscriber server, HSS.

9. The method of claim 1 wherein a subscriber profile of the first WTRU resides on a subscriber profile repository, SPR.

10. The method of claim 1 wherein a subscriber profile of the first WTRU resides on a user data repository, UDR.

11. The method of claim 1 further comprising:
    the first WTRU requesting the AS to transfer a credit to the second WTRU.

12. An application server, AS, comprising:
    a transmitter configured to transmit a service trigger including a hyperlink and a token to a first wireless transmit/receive unit, WTRU, that sponsors a second WTRU; and
    the transmitter further configured to transmit a request to a network to provide traffic handling needed to deliver content to the second WTRU based on the token on a condition that the hyperlink is activated, wherein a user of the first WTRU is charged for the traffic handling via a charging system including an online charging function, OCF, and a charging data function, CDF.

13. A first wireless transmit/receive unit, WTRU, comprising:
    a receiver configured to receive a service trigger including a hyperlink and a token from an application server, AS; and
    a transmitter configured to forward at least the hyperlink to a second WTRU such that the second WTRU may initiate a sponsored session with the AS using the hyperlink, and based on the token a user of the first WTRU is charged via a charging system for a service and traffic handling provided to the second WTRU, the charging system including an online charging function, OCF, and a charging data function, CDF.

14. The first WTRU of claim 13 wherein the token is embedded.

* * * * *